US011987355B2

(12) United States Patent
White

(10) Patent No.: US 11,987,355 B2
(45) Date of Patent: May 21, 2024

(54) METHOD AND FLEXIBLE APPARATUS PERMITTING ADVANCED RADAR SIGNAL PROCESSING, TRACKING, AND CLASSIFICATION/IDENTIFICATION DESIGN AND EVALUATION USING SINGLE UNMANNED AIR SURVEILLANCE (UAS) DEVICE

(71) Applicant: Raytheon Company, Waltham, MA (US)

(72) Inventor: Brian W. White, Frisco, TX (US)

(73) Assignee: Raytheon Company, Tewksbury, MA (US)

( * ) Notice: Subject to any disclaimer, the term of this patent is extended or adjusted under 35 U.S.C. 154(b) by 177 days.

(21) Appl. No.: 17/343,175

(22) Filed: Jun. 9, 2021

(65) Prior Publication Data

US 2022/0396356 A1    Dec. 15, 2022

(51) Int. Cl.
*B64C 39/02*     (2023.01)
*B64D 3/02*      (2006.01)
(Continued)

(52) U.S. Cl.
CPC .............. *B64C 39/024* (2013.01); *B64D 3/02* (2013.01); *F41J 2/00* (2013.01); *G05D 1/104* (2013.01);
(Continued)

(58) Field of Classification Search
None
See application file for complete search history.

(56) References Cited

U.S. PATENT DOCUMENTS 3,906,499 A    9/1975    Redman
6,989,525 B2    1/2006    Howard
(Continued)

FOREIGN PATENT DOCUMENTS

BE    1024834 B1    7/2018
CA    2954985 A1    4/2016
(Continued)

OTHER PUBLICATIONS

Guvenc, et al., "Detection, Localization, and Tracking of Unauthorized UAS and Jammers," IEEE, Sep. 2017; 10 Pages (IDS document) (Year: 2017).*
(Continued)

*Primary Examiner* — Tuan C To
*Assistant Examiner* — David Ruben Pedersen

(57) ABSTRACT

An assembly is configured for connection to an unmanned aerial vehicle (UAV) and comprises a plurality of emulator devices each configured for attachment to the UAV and a plurality of first connection tethers each configured to operably couple a respective one of the plurality of emulator devices to the UAV at a respective spacing from the UAV. The emulator devices each comprise an emulation component configured to provide, to a target detection system, a characteristic associated with a respective type of airborne object. The plurality of respective first connection tethers each comprises material that does not substantially reflect RF energy. During flight of the UAV, when the assembly is connected, each respective emulator device maintains the respective spacing from the UAV and emulates the characteristic to the target detection system, such that the assembly emulates, to the target detection system, a plurality of airborne objects.

20 Claims, 28 Drawing Sheets

(51) Int. Cl.
  *F41J 2/00*    (2006.01)
  *G05D 1/00*    (2006.01)
  *B64U 10/10*   (2023.01)
  *B64U 30/20*   (2023.01)
  *B64U 101/30*  (2023.01)

(52) U.S. Cl.
  CPC .......... *G05D 1/1064* (2019.05); *B64U 10/10* (2023.01); *B64U 30/20* (2023.01); *B64U 2101/30* (2023.01); *B64U 2201/102* (2023.01); *B64U 2201/20* (2023.01)

(56) References Cited

U.S. PATENT DOCUMENTS

| | | | |
|---|---|---|---|
| 9,816,783 | B1 | 11/2017 | Means et al. |
| 10,705,187 | B1 * | 7/2020 | Hebert ................. F41J 2/00 |
| 10,895,444 | B1 | 1/2021 | Browy |
| 2016/0362173 | A1 | 12/2016 | Marion et al. |
| 2020/0385115 | A1 * | 12/2020 | Piasecki ............... B64C 39/024 |

FOREIGN PATENT DOCUMENTS

| | | | | |
|---|---|---|---|---|
| CN | 109489491 | A | 3/2019 | |
| CN | 109612340 | A | 4/2019 | |
| CN | 110114631 | A | 8/2019 | |
| CN | 110304192 | A | 10/2019 | |
| CN | 112414209 | A | 2/2021 | |
| DE | 102019117801 | A1 | 1/2021 | |
| EP | 0469027 | B1 | 10/1995 | |
| EP | 1574809 | B1 | 9/2005 | |
| EP | 3699543 | A1 | 8/2020 | |
| GB | 2561252 | A | 10/2018 | |
| GB | 2588283 | A * | 4/2021 | ............. B64C 39/00 |
| IL | 178910 | A | 4/2008 | |
| RU | 2579994 | C2 | 4/2016 | |
| RU | 2608338 | C1 | 1/2017 | |
| RU | 2615988 | C1 | 4/2017 | |
| RU | 2660518 | C1 | 7/2018 | |
| RU | 2691274 | C1 | 6/2019 | |
| RU | 2711115 | C1 | 1/2020 | |
| WO | WO 2018/146430 | A2 | 8/2018 | |
| WO | WO-2020122777 | A1 | 6/2020 | |
| WO | WO-2020245064 | A2 | 12/2020 | |
| WO | WO2021/001089 | A1 | 1/2021 | |
| WO | WO 2021/001089 | A1 | 1/2021 | |
| WO | WO2021/048516 | A1 | 3/2021 | |

OTHER PUBLICATIONS

Coluccia, et al. "Detection and Classification of Multirotor Drones in Radar Sensor Networks: A Review," Sensors, Jul. 27, 2020; 22 pages.

Guvenc, et al., "Detection, Localization, and Tracking of Unauthorized UAS and Jammers," IEEE, Sep. 2017; 10 Pages.

Michel, "Amazon's Drone Patents," Center for the Study of the Drone, Sep. 2017; 22 Pages.

Wilson, et al., "Small Unmanned Aerial System Adversary Capabilities," Homeland Security Operational Analysis Center, 2020, 147 Pages.

Li, et al., "Radar Signatures of Small Consumer Drones," IEEE International Symposium on Antennas and Propagation/USNC-URSI National Radio Science Meeting, Jun. 2016; 23 Pages.

Paonessa et al., "UAV-Mounted Corner Reflector for In-Situ Radar Verification and Calibration;" 2018 IEEE Conference on Antenna Measurements & Applications (CAMA); Sep. 3, 2018; 4 Pages.

PCT International Search Report and Written Opinion dated Nov. 16, 2022 for International Application No. PCT/US2022/011746; 15 Pages.

\* cited by examiner

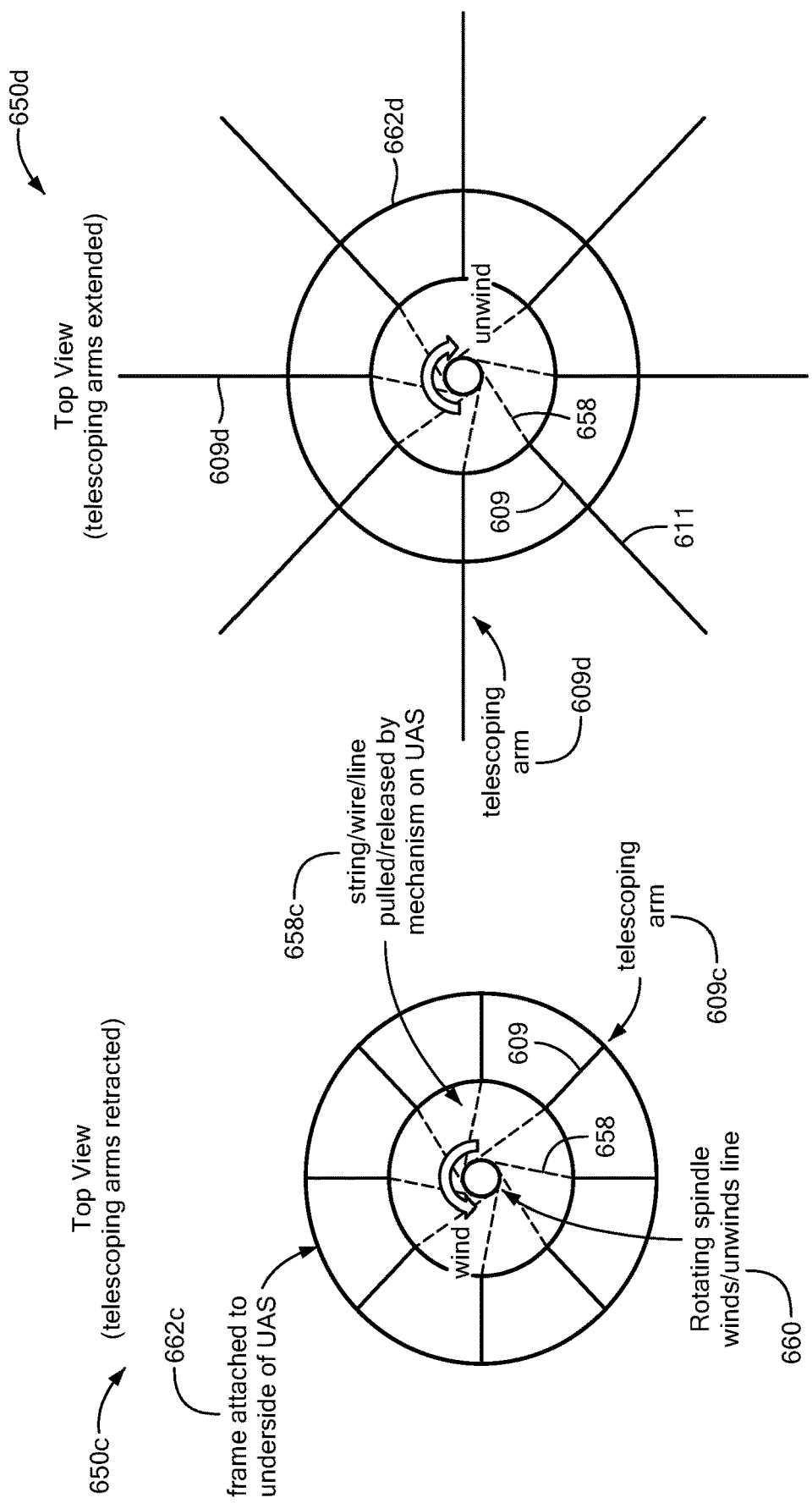

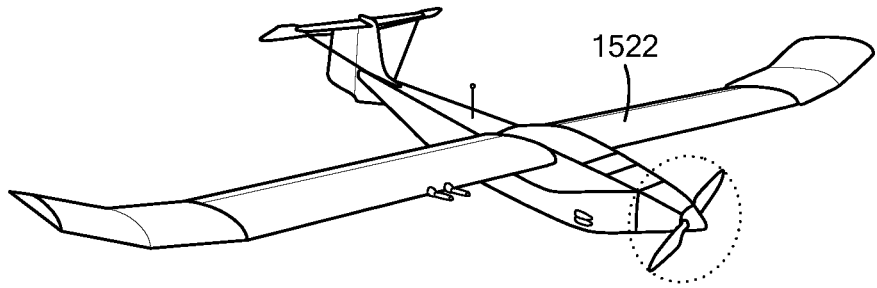
*FIG. 15A_1*
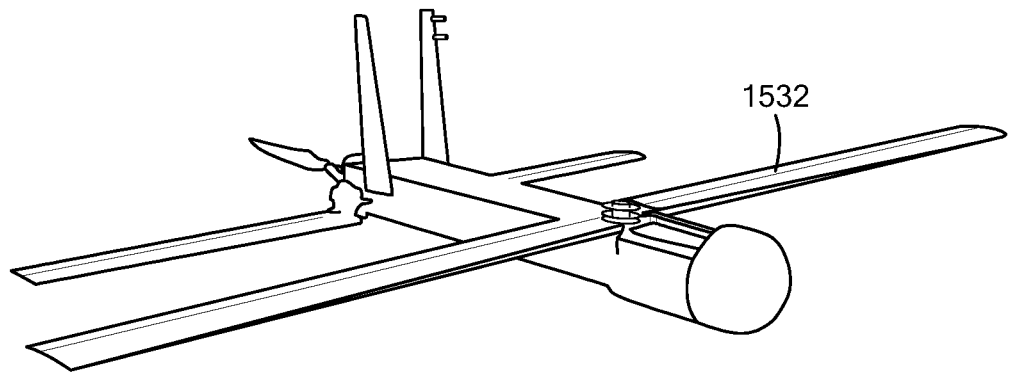
*FIG. 15A_2*
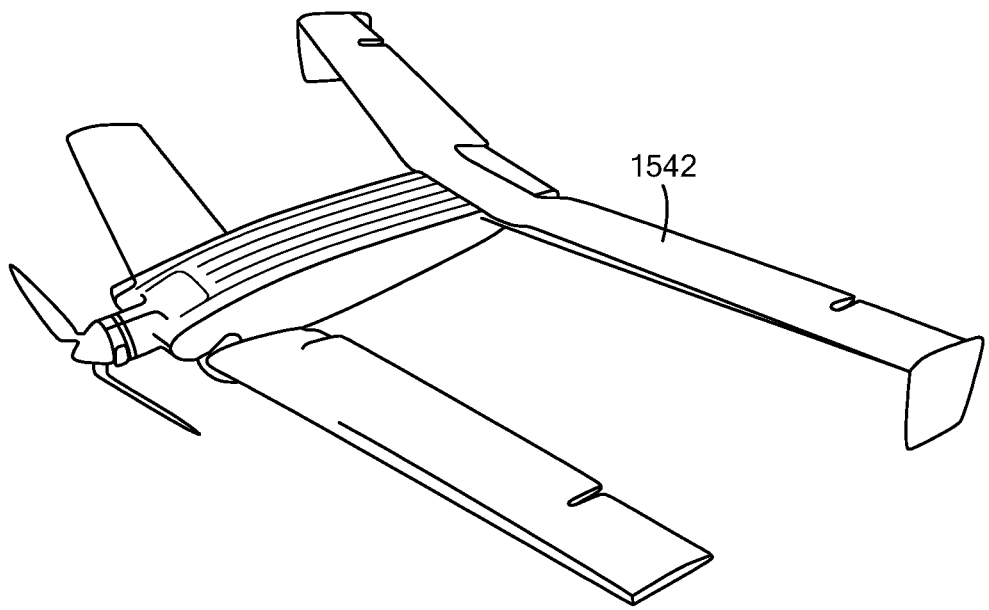
*FIG. 15A_3*

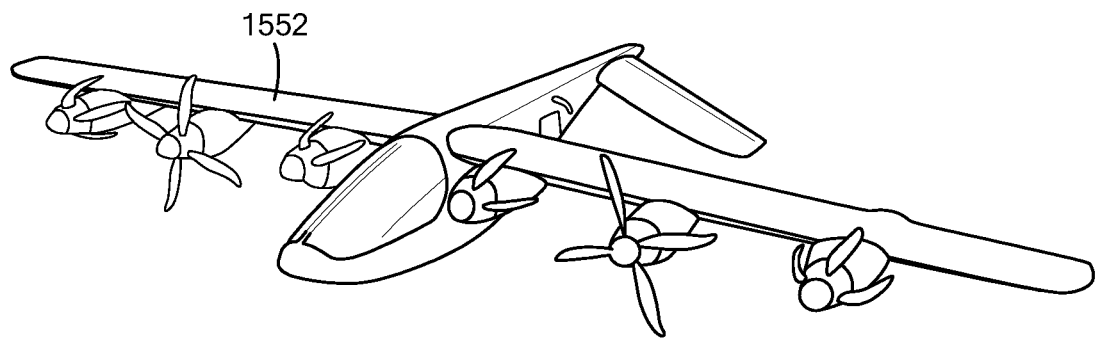
FIG. 15A_4
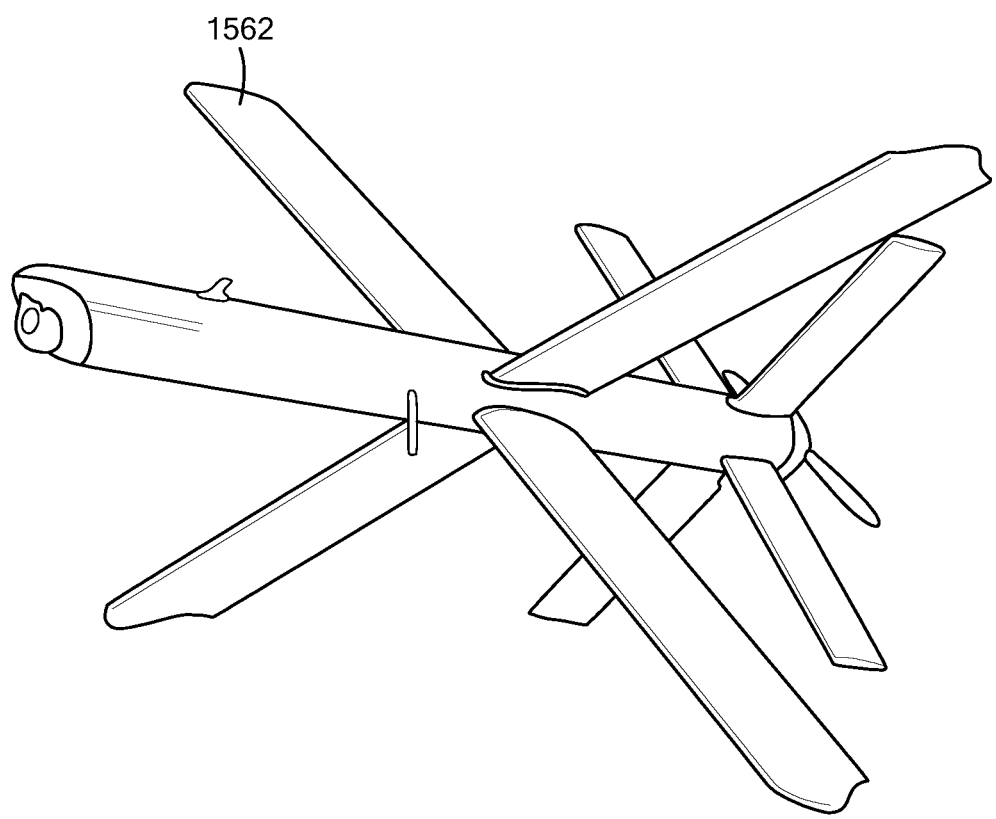
FIG. 15A_5

METHOD AND FLEXIBLE APPARATUS PERMITTING ADVANCED RADAR SIGNAL PROCESSING, TRACKING, AND CLASSIFICATION/IDENTIFICATION DESIGN AND EVALUATION USING SINGLE UNMANNED AIR SURVEILLANCE (UAS) DEVICE

FIELD

Embodiments of the disclosure generally relate to devices, systems, and methods for operating a device such as a radio controlled vehicle, drone, unmanned aerial vehicle (UAV), unmanned controllable airborne devices, remotely piloted aircraft system (RPAS), and/or any other airborne component of an unmanned aerial surveillance device (UAS) (collectively—"drones"). More particularly, the disclosure describes embodiments relating to devices, systems, and methods for coupling one or attachments to a drone so that, during flight, the attachments, together with the drone, enable the single drone device to emulate one or more behavior characteristics of a grouping of drone devices, or other objects, especially to target detection systems.

BACKGROUND

Devices such as drones, radio controlled vehicles, unmanned aerial vehicles (UAV), unmanned controllable airborne devices, and/or any other airborne component of an unmanned aerial system (UAS) (collectively—"UAVs") have become more popular because of their many uses and applications in fields such as recreation, commercial operations, delivery and pick up, performing scientific/technical sensing and testing, observation and mapping, surveillance, photography, etc., especially in environments that can be inconvenient, hostile, remote, and/or difficult or dangerous for humans to access. UAVs come in a variety of shapes and sizes and include devices such as remote-controlled drones, airplanes, and helicopters.

Drones also are being used to augment or replace manned processes in many applications. Military and government entities are purchasing and using drones in many applications, and since the advancement of drone technology has matured in recent years, there are even types of drones readily available at nominal costs for purchase by private individuals.

While UAVs have been used for a variety of entertainment, commercial, and military purposes, UAVs can be used for more nefarious purposes. Thus, UAVs are readily available to be used by private individuals and government entities, bringing on additional concerns for armed services, law enforcement and security personnel where drones can be used for hostile, unwanted or illegal activity. For example, one or more UAVs carrying contraband can be used by an individual to fly over a prison and deliver the contraband within the prison walls. UAVs can be flown into private areas, carry explosives, or deliver contraband to personnel located in the private areas. UAVs can be flown into air space that then prevents manned airplanes or even missiles and other airborne weapons, from flying a desired course.

Governmental agencies have recognized that UAVs also can pose threats to infrastructures such as subways, airports, sport gatherings, soft targets, military sites, power generating sites, and other locations. This is because UAVs provide an easy and inexpensive way for delivering threat payloads, such as radiological agents, plastic explosives or dynamite, nerve agents, or toxic biological agents like anthrax. These types of threats are expected to increase in number as the technical capabilities and commercial availability of UAVs improve. Further, groupings of UAVs (including so-called "swarms" of UAVs) under the control of a single attacker or a group of attackers can exponentially increase the odds of a successful attack against a location.

SUMMARY

The following presents a simplified summary in order to provide a basic understanding of one or more aspects of the embodiments described herein. This summary is not an extensive overview of all of the possible embodiments and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

Because of the many potentially concerning uses of UAVs, detection, tracking, and identification of UAVs, especially groupings or swarms of UAVs, is of great importance to various sensors and target detection systems, including radars. It is important that radars and other sensors can not only identify and track a single UAV or a single type of any kind of airborne object (e.g., a bird, or other biological/avian/animal object, a balloon, chaff and/or jamming devices) but are also able to identify multiple of such objects (e.g., multiple UAVs within a swarm, a flock of birds, a swarm of insects, cluster of chaff particles, a grouping of airborne objects emitting signals, etc.), and/or able to distinguish between types of clusters, such as a cluster of man-made vs. biological targets. One way to help improve the ability of detection systems such as radars to detect, identify, and track UAVs (especially clusters or groups of UAVs) is to provide a way to simulate how a group of UAVs and/or similar confusers appears to the detection system, to help enable evaluation of detection system capabilities against such threats.

It can be useful to provide a way to emulate one or more behavior characteristics (e.g., radar cross section (RCS), heat signature, physical appearance, etc.) of a grouping of any kind of objects, whether natural/biological, man-made, or a hybrid of the two, including both passive objects and active objects (objects that are themselves emitting signals, such as RF signals). The emulation, advantageously, can provide a way for the target detection system to detect, track, and/or identify groups of airborne objects, especially UAVs but not limited to UAVs, by providing identifying common characteristics (e.g., patterns of RCS or heat signatures, or patterns of radar returns associated with the motion of winged birds and/or insects, for example) that are associated with groupings of objects. In addition, by being able to emulate object groupings with varying spacings (including dynamically varying spacings), it is possible to evaluate the performance of various target detection systems more fully against many different types of potential scenarios and types of passive and/or active airborne objects.

In one embodiment, an assembly is provided, the assembly configured for connection to a single unmanned aerial vehicle (UAV), the assembly comprising a plurality of emulator devices and a plurality of first connection tethers. Each of the plurality of emulator devices is configured for attachment to the single UAV, each respective emulator device comprising a first emulation component, the first emulation component configured to provide, to a target detection system, a first characteristic associated with a respective type of airborne object. The plurality of respective first connection tethers are each configured to operably couple a respective one of the plurality of emulator devices to the single UAV at a respective spacing from the single UAV, each respective first connection tether formed such that at least a portion of each respective connection tether comprises a respective material that is configured so that it does not substantially reflect RF energy. Each of the plurality of respective first connection tethers associated with the plurality of respective emulator devices, is constructed and arranged so that each of the plurality of respective emulator devices maintain at least the respective spacing from the single UAV when the single UAV is in flight. The assembly, when connected to the single UAV, is configured so that each respective emulator device emulates the first characteristic to the target detection system, such that, during flight of the single UAV, the assembly presents, to the target detection system, characteristics emulating a plurality of airborne objects.

In certain embodiments, the airborne object comprises at least one of a drone, unmanned aerial vehicle (UAV), unmanned aerial system (UAS), unmanned aircraft (UA), remotely piloted aircraft (RPA), remotely piloted aircraft systems (RPAS), remotely piloted vehicles (RPV), balloon, airborne weapon, airborne munition, cluster of airborne reflective materials, bird, insect, and bat. In certain embodiments, the target detection system comprises at least one of a radar system, a heat sensor, a light sensor, an infrared sensor, an optical sensor, a Lidar system, and a camera. In certain embodiments, the first characteristic comprises at least one of a radar cross section (RCS), a heat signature, a physical appearance, a shape, a pattern of motion, a proximity to other airborne objects, a reflectivity, a frequency pattern, a sound, an RF transmission pattern, a moving part, and a physical appearance. In certain embodiments, the first emulation component comprises at least one of: an RF scatter source configured to simulate an RF scattering pattern associated with one or more of airborne objects; a passive RF scatterer; an RF calibration source; an RF object surrogate scatterer; a target body surrogate; a source of RF modulation; an RF reflecting element; a visual object surrogate, an RF transmission source; a heat source, and a light source.

In certain embodiments, at least one of the plurality of first connection tethers is configured to be dynamically adjustable so as to vary the respective spacing between the single UAV and a respective emulator device to which the at least one first connection tether is connected.

In certain embodiments, the assembly further comprises at least one second connection tether, the second connection tether configured to connect between two or more of the plurality of emulator devices, wherein the second connection tether is configured to maintain, during flight of the single UAV device, an intra-emulator device spacing between at least two or more of the plurality of emulator devices, wherein at least a portion of the second connection tether comprises a second material that is configured so that it does not substantially reflect RF energy.

In certain embodiments, at least a respective one of the plurality of emulator devices further comprises a second emulation component, the second emulation component configured to provide, to the target detection system, a second characteristic associated with the respective type of airborne object, wherein the second emulation component is operably coupled to first emulation component and wherein the second characteristic is different than the first characteristic. In some embodiments, the second characteristic comprises at least one of an RCS, a heat signature, a physical appearance, a shape, a pattern of motion, a proximity to other airborne objects, a reflectivity, a frequency pattern, a sound, an RF transmission pattern, a moving part, and a physical appearance.

In another aspect, a method is provided for simulating, for a target tracking system, a first behavior characteristic associated with one or more of a plurality of airborne objects. Each of a plurality of respective emulator devices is configured for attachment to a single unmanned aerial vehicle (UAV), each respective emulator device comprising a first emulation component configured to provide, to a target detection system, a first characteristic associated with a respective type of airborne object. A plurality of respective first connection tethers is coupled to each of the plurality of respective emulation devices, each respective first connection tether configured to operably couple a respective one of the plurality of emulator devices to the single UAV at a respective spacing from the single UAV, each respective first connection tether formed such that at least a portion of the each respective connection tether comprises a first material that is configured so that it does not substantially reflect RF energy. the plurality of emulator devices is coupled to the single UAV via the plurality of respective first connection tethers. The single UAV is configured for flight with the plurality of emulator devices attached to the single UAV via the plurality of first connection tethers. The single UAV, with the plurality of UAV emulator devices attached, is flown within range of the target tracking system.

In some embodiments, the airborne object comprises at least one of a drone, unmanned aerial vehicle (UAV), unmanned aerial system (UAS), unmanned aircraft (UA), remotely piloted aircraft (RPA), remotely piloted aircraft systems (RPAS), remotely piloted vehicles (RPV), balloon, airborne weapon, airborne munition, cluster of airborne reflective materials, bird, insect, and bat. In some embodiments of the method, the target detection system comprises at least one of a radar system, a heat sensor, a light sensor, an infrared sensor, an optical sensor, a Lidar system, and a camera.

In some embodiments, the respective spacing between at least one of the respective emulation devices and the UAV, is dynamically adjusted. In some embodiments, the dynamic adjustment of the respective spacing is configured to modify the first characteristic.

In some embodiments, a second emulation component is operably coupled to at least one respective emulator device in the plurality of emulator devices, the second emulation component configured to emulate a second characteristic of the UAV that is different than the first characteristic. In some embodiments, at least one of the first and the second characteristics comprises at least one of: a radar cross section (RCS), a heat signature, a physical appearance, a shape, a pattern of motion, a proximity to other airborne objects, a reflectivity, a frequency pattern, an RF transmission pattern, a moving part, and a physical appearance.

In another aspect, a system is provided, the system comprising an unmanned aerial vehicle (UAV), a plurality of emulator devices, and a plurality of first connection tethers. Each emulator device is operably coupled to the UAV, each respective emulator device comprising a first emulation component configured to provide, to a target detection system, a first characteristic associated with a respective type of airborne object. Each of the plurality of respective first connection tethers is configured to operably couple a respective one of the plurality of emulator devices to the UAV at a respective spacing from the UAV, each respective first connection tether formed such that at least a portion of each respective connection tether comprises a respective material that is configured so that it does not substantially reflect RF energy. Each of the plurality of respective first connection tethers associated with the plurality of respective emulator devices, is constructed and arranged so that each of the plurality of respective emulator devices maintain at least the respective spacing from the UAV when the single UAV is in flight. The assembly, when connected to the UAV, is configured so that each respective emulator device emulates the first characteristic to the target detection system, such that, during flight of the UAV, the assembly presents, to the target detection system, a plurality of first characteristics emulating a plurality of airborne objects.

In certain embodiments, the first characteristic comprises at least one of a radar cross section (RCS), a heat signature, a physical appearance, a shape, a pattern of motion, a proximity to other airborne objects, a reflectivity, a frequency pattern, a sound, an RF transmission pattern, a moving part, and a physical appearance. In certain embodiments, the first emulation component comprises at least one of: an RF scatter source configured to simulate an RF scattering pattern associated with one or more of airborne objects; a passive RF scatterer; an RF calibration source; an RF object surrogate scatterer; a target body surrogate; a source of RF modulation; an RF reflecting element; a visual object surrogate, an RF transmission source; a heat source, and a light source. In certain embodiments, at least one of the plurality of first connection tethers is configured to be dynamically adjustable so as to vary the respective spacing between the UAV and a respective emulator device to which the at least one first connection tether is connected.

Details relating to these and other embodiments are described more fully herein.

BRIEF DESCRIPTION OF THE DRAWINGS

The advantages and aspects of the described embodiments, as well as the embodiments themselves, will be more fully understood in conjunction with the following detailed description and accompanying drawings, in which:

FIG. 6C is a top view of the system of FIG. 6B, showing telescoping arms retracted, in accordance with one embodiment;

FIG. 6D is a top view of the system of FIG. 6B, showing telescoping arms extended, in accordance with one embodiment;

FIGS. 15A_1 through FIG. 15A_5 are illustrations of exemplary fixed wing drones that are a first type of drone usable as part of the UAV swarm simulation system of FIGS. 2-4, in accordance with one embodiment;

The drawings are not to scale, emphasis instead being on illustrating the principles and features of the disclosed embodiments. In addition, in the drawings, like reference numbers indicate like elements.

DETAILED DESCRIPTION

Figure 1:
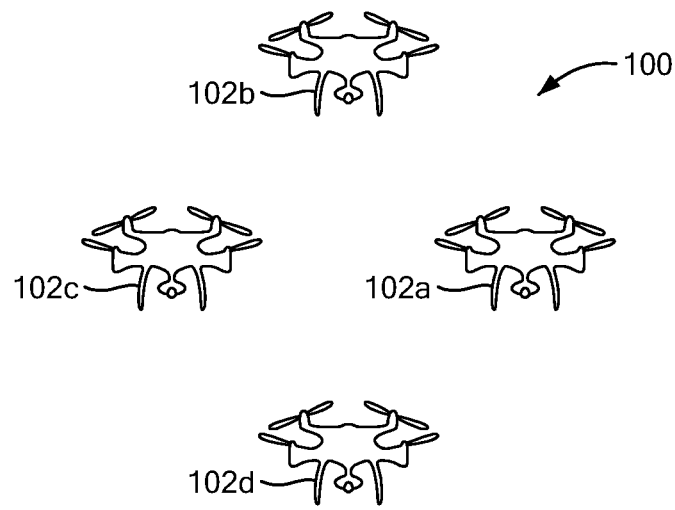
FIG. 1 is an exemplary illustration of a grouping of unmanned aerial vehicles (UAVs)

The following detailed description is provided, in at least some examples, using the specific context of target detection systems (e.g., radar systems) configured to detect, track, monitor, and/or identify targets, such as unmanned aerial vehicles (UAVs). At least some embodiments herein are usable with any systems involved with counter-UAV and counter-UAS (unmanned aerial system) technologies, non-cooperative target recognition (NCTR), automatic target recognition (ATR), UAV classification, advanced signal processing and tracking algorithms, and/or close target tracking. For example, at least some embodiments herein are usable with, could be combined with, and/or can be used as part of the evaluation and test of various types of target detection, radar systems, air traffic control systems, optical sensors, cameras, and/or any systems configured to detect and/or defend against one or more types of airborne objects, including but not limited to UAV/UAS devices and other airborne object (including natural/biological, man-made, and/or hybrids of natural/biological and man-made), as will be understood by those of skill in the art.

It should be understood, however, that the disclosed embodiments are not limited to use with the above-listed exemplary types of systems. The embodiments described herein have numerous applications and are not limited to the exemplary applications described herein. It should be appreciated that such references and examples are made in an effort to promote clarity in the description of the concepts disclosed herein. Such references are not intended as, and should not be construed as, limiting the use or application of the concepts, systems, arrangements, and techniques described herein to use solely with these or any other systems.

The term "drone," as used herein, is intended to include any unmanned aircraft or other device that can fly autonomously or be remotely piloted. It includes, but is not limited to any unmanned aerial vehicle, system, device, aircraft, copter, quadcopter, fixed wing aircraft, rotorcraft, controllable aerial propulsion unit, and the like that is capable of unmanned flight, whether under complete remote control by an entity (human or machine), under automatic control (i.e., autonomously), or semi-autonomously (mix of remote control and automatic control). Drones, as used herein, can include unmanned aircraft systems (UAS), small UAS (sUAS) (classified by the Federal Aviation Association as weighing less than 55 pounds), micro UAS (sUAS that are under 4.4 pounds), unmanned aerial vehicles (UAV), and remotely piloted aircraft systems (RPAS). In some embodiments, UAV is a term used among professionals to refer to a drone for non-recreational purposes. In some embodiments, UAS is a term that includes an unmanned aircraft (UA) together with all of the associated support equipment, control station, data links, telemetry, communications, and navigation equipment, etc., necessary to operate the unmanned aircraft. However, the terms UAV, UAS, and drone appear to be used interchangeably in the art and likewise will be used interchangeably herein.

Drones usable with the embodiments described herein can include drones that become airborne in one or more ways, including but not limited to horizontal take-off and landing (HTOL), vertical take-off and landing (VTOL), launched (e.g., out of a cannon or canister or the like), tiltrotor-style, or any other mechanism configured to provide the necessary lift for both the drone and the one or more emulation devices operably coupled to the drone. This is described further herein.

As is understood in the art, a drone typically comprises a number of components that work together to provide the ability to fly and have its flight directed/controlled in an unmanned manner. These components include, but are not limited to, some or all of the following, as is known in the art:

a remote control usable by an external entity (e.g., a human or computer) to transmit signals to the drone to control its flight and, optionally, to control additional operations a drone and/or its attachments may perform;

a housing, frame, or other structure housing the drone components;

landing gear configured to allow a drone to land;

one or more antennas configured to receive and send information to the remote control and to any onboard drone controllers;

one or more mechanisms for creating lift for the drones, including but not limited to:
  propellers, configured to rotate and push air downward so as to create an area of pressure difference that enables the drone to be pushed up;
  rotors/propellers that push air horizontally (e.g., as with fixed wing aircraft);
  combinations of both horizontal and vertical rotors/propellers (e.g., as is round in certain vertical take-off and landing (VTOL) devices, tiltrotor devices, etc.);

one or more motors (e.g., in some instances an equal number of motors, each coupled to a corresponding propeller, rotating in opposite directions to counteract each other);

one or more sensors, e.g., collision avoidance sensors, obstacle avoidance sensors;

a balance control subsystem (e.g., a 2-axis gimbal system)

a global positioning system (GPS) to pinpoint drone location;

a compass;

a power subsystem, including a battery, configured to provide power to drone components, including the motors and all associated cabling;

one or more on-board controllers configured to control power to the motors, speed of the motors, direction of flight, and/or operation of any optional drone attachments, wherein one or more of the controllers also are in operable communication with other drone components like the sensor, balance control subsystem, GPS, compass, etc.; and one or more optional attachments, such as a camera, a coupling device configured for attaching items (e.g., parcels for drop off/pickup, weather sensors, magnetic/infrared sensors, lights and light emitting diodes (LEDs), tracking devices, etc.).

In the embodiments described herein, one or more of the aforementioned lists of drone components advantageously are included as part of a drone system that is configured to be capable of carrying a payload comprising one or more UAV Emulation Devices (described and defined further herein). As is understood in the art, a drone payload is the weight a drone or unmanned aerial vehicle (UAV) can carry. It is usually counted outside of the weight of the drone itself; however, in some instances, the payload of a drone (UAV) includes all the equipment on board such as: cameras, radars, sensors, GPS, attachments, etc., and excludes other components like batteries, rotors, propellers and constructional parts for the drone. This configuring of the drone to carry a payload comprising one or more emulation devices can include, in certain embodiments, having a combination of a motor and/or propellers configured to be capable of lifting and flying not only the drone and all its components, but also the desired number of attached emulation devices. In certain embodiments, those of skill in the art will appreciate that design of any emulation apparatus or device or system considers weight and aeronautical stability, as appropriate, for a given host UAV device.

So-called "hobby" drones typically can carry a very light additional weight of 200 to 300 grams without negative effect on flight or drone operations. Other popular drones can carry 3 to pounds of weight, and specialized military and/or industrial drones can carry much more significant payloads, even payloads approaching 50-60% of the weight of the drone itself.

As will be described further herein, advantageously, the emulation device of the embodiments described herein, can be extremely lightweight and can be constructed using a minimal number of lightweight components, enabling its use with multiple different types of drones, and enabling longer flight times and more maneuverability, as well. For example, in at least one example embodiment, an exemplary drone (including propeller guards and battery) weighs approximately 650 grams (g.), and an exemplary emulation device (including all attachments to connect it to the drone) weigh approximately 60 g, roughly 9.2% of the weight of the exemplary drone, but these weights and proportions are not limiting. The light weight of the emulation device also can enable it to be used with smaller and/or less expensive drones, as well. Further, the light weight of the emulation devices, as described in certain embodiments herein, can enable multiple emulation devices to be connected to a single UAV device, in an orientation having a fixed, predetermined, and/or dynamically adjustable spacing, to enable the creation of a swarm simulation assembly (UAV SSA), as described further herein.

As used herein, the term "emulation device", "emulator", "simulator", "UAV emulation device," "UAV simulation device" (collectively "emulator devices") are expressly intended to include, at least in some embodiments, a device configured for the emulation/simulation of at least one characteristic of any type of airborne object, of any type, including but not limited to man-made, non-man-made, natural origin, and biological origin, as well as hybrids of man-made and non-man made types. For example, in certain embodiments, the emulator devices are configured to emulate a characteristic such as a behavior, appearance, sensed characteristic (e.g., radar reflection, generated frequency, sound, appearance, reflection/reflectivity, shape etc.), or other feature, of airborne objects such as drones/UAVs, remotely piloted aircraft (RPA), remotely piloted aircraft systems (RPAS), unmanned aircraft (UA), remotely piloted vehicles (RPV), balloons and balloon systems (including remotely piloted), birds, insects, bats, airborne weapons/munitions (e.g., bombs, missiles, rockets), cluster of airborne fibers, strips and/or particles (collectively, "cluster of airborne reflective materials"), even (depending on the size), aircraft.

Further, the emulator devices can include one or more active or passive emulation components, wherein the emulation component includes, but is not limited to, passive radiofrequency (RF) scatterers, RF calibration sources, RF object surrogate scatterers, target body surrogates, sources of RF modulation, RF reflecting elements, visual object surrogates, RF transmission sources (e.g., that produce RF transmission patterns and/or frequency patterns), heat sources, light sources, and other sources configured to generate, provide, or have, a detectable, observable, and/or measurable characteristic that is representative of some characteristic associated with the actual aerial object being emulated. The emulation devices, in certain embodiments, correspond to any device capable of being observed, detected, tracked, and/or identified by any type of sensor, including but not limited to RF sensors/radars, optical sensor (e.g., cameras), motion sensors, LIDAR (light detection and ranging systems, which can produce point clouds and other types of information), light and sound detecting sensors, heat sensors, and/or infrared detecting sensors, The United States Federal Aviation Administration (FAA) and US Department of Defense (DoD) classifies drones by their size, range, and speed. As of this writing, the FAA/DoD have broken up drone classification into five groups (Groups 1-5) based on those attributes. In the FAA/DoD scheme, Table 1 lists the drone classifications and capabilities.

TABLE 1

UAVs Classification according to the US Department of Defense (DoD)

| Category | Size | Maximum Gross Takeoff Weight (MGTW) (lbs.) | Normal Operating Altitude (ft) | Airspeed (knots) |
| --- | --- | --- | --- | --- |
| Group 1 | Small | 0-20 | <1,200 AGL* | <100 |
| Group 2 | Medium | 21-55 | <3,500 | <250 |
| Group 3 | Large | <1320 | <18,000 MSL** | <250 |
| Group 4 | Larger | >1320 | <18,000 MSL | Any airspeed |
| Group 5 | Largest | >1320 | >18,000 | Any airspeed |

*AGL = Above Ground Level
**MSL = Mean Sea Level
Note:
If the UAS has even one characteristic of the next level, it is classified in that level.

In at least some embodiments, a drone having sufficient lift to be usable advantageously with the embodiments described herein are any of the drones in Groups 1-3 in Table 1, especially Groups 1 and 2. Group 1 small drones, in certain embodiments, have at least one dimension greater than 50 cm and no larger than 2 meters. Exemplary Group 1 drones can often weigh between 1 and 15 lbs. The larger Group 1 drones and Group 2 and higher drones can withstand more substantial payloads, including UAVs that are larger and heavier, as will be understood. One of skill in the art will appreciate, however, that the embodiments described herein are readily adaptable to drones of any size. Advantageously, the maximum acceptable weight of attachments to a given UAV, e.g., an emulator device as described herein, is a function of the UAV itself, structural strength of both the UAV and/or the emulator devices, and maximum UAV lift capability (e.g., there is generally an increase in acceptable UAV payload capacity with increase in UAV category in Table 1). In certain embodiments, it can be preferred that an emulator device weigh no more than 5-10% of the weight of the UAV device to which it is attached, but this is not limiting for all embodiments.

The varying sizes and ranges of different drone/UAV models provide unique advantages and disadvantages to each group. As is understood in the art, although the smaller Group 1-3 UAS models can tend to have shorter ranges, the Group 1-3 drones might provide a greater challenge to target detection systems than their larger counterparts. Also, because of the lower cost and easy availability of drones in Groups 1-3, non-state and/or hostile actors might also be more likely to use Group 1-3 drones in taking unwanted action again in both military and non-military environments. For example, Groups 1-3 sized drones can perform functions such as intelligence, surveillance, and reconnaissance (ISR) missions. Further, because some of these drones can carry significant payloads, drones can carry harmful items like ordinance, biological weapons, etc. In addition, drones can be used for target acquisition, to help support artillery strikes and/or military troop maneuvers, and even as decoys. Moreover, because drones do not require runways or conventional launchers (though some can use them), drones are able to take off in virtually any scenario, on land or at sea or even from an aircraft, copter, or even from another drone.

The small size, low cost, easy maneuverability, and varied capabilities of drones, also means that drones can be flown in clusters, groups, and formations more easily than other devices. In some instance, these formations have been used in special types of clusters called "swarms" of drones/UAVs (which also have been termed "distributed collaborative systems" of drones). In at least some embodiments, "swarm" of drones is a flock of multiple unmanned aerial vehicles (UAVs), often small in size, where the "block" can move and act as a group with only limited human intervention (e.g., the drones can be configured to interact with each other independent of or supplementary to, remote control). Some swarms can even fly and operate together to simulate (to a system for tracking targets), the appearance (to the target tracking system, e.g., on a radar screen) of another flying object (e.g., an aircraft, rocket, or missile).

UAVs, both individually and in groups, can have certain behavior characteristics that may or may not be readily seen using target detection systems. Similarly, other airborne objects (both natural and man-made) also can be hard to detect using target detection systems. For example, a UAV by itself may have a certain radar cross section (RCS), and in some instances the RCS can vary based on incident angle of the approaching radio wave, as will be appreciated. As an example, a typical RCS value for UAV could be from −15 to −20 dBsm in the S-band and smaller than −20 dBsm at 30-37 GHz. Often, the ability, of a particular sensor, to determine type and quantity of UAVs can depend on factors such as UAV size and/or UAV spacing. As will be understood, different types of radar sensors may have different capabilities based on power, frequency, resolution, etc. Similarly, other UAV behavior characteristics (e.g., heat signatures, physical appearance) can appear differently on respective types of sensors (e.g., infrared, optical, camera) depending on the size of the UAV, the number of UAVs, the spacing between them, etc. As will be appreciated, UAVs, both individually and in groups/swarms, can be associated with certain patterns on radar screens or other types of sensing user interfaces, or can be associated with certain patterns of received information that can be processed by a computer.

In some instances, the spacing between UAVs helps to determine whether a target tracking system will see a grouping/swarm of UAVs as a single flying object or as a plurality of flying objects. Hence, the ability of the UAV SSA's described herein, to control and adjust spacing of the UAV and the UAV emulator devices, is a key advantage in the art, to help evaluate and test target detection systems vs such groupings/swarms of UAVs/drones.

FIG. 1 is an exemplary illustration of a grouping 100 of unmanned aerial vehicles (UAVs)/drones 102, which can be construed to be such a "swarm" (for clarity, the grouping 100 of FIG. 1 is a smaller sized "swarm" than is possible in the art, but those of skill in the art will appreciate that much larger sized swarms are possible.). The particular type and shape of drone 102 shown in FIG. 1 is exemplary and not limiting, as is the particular shape of the grouping 100. Such swarms 100 of drones have been demonstrated to have applicability in various operations. For example, in late 2016, the US DoD demonstrated a large micro-drone swarm consisting of a flock of 103 Perdix drones launched from three F/A-18 Super Hornets, where the drones demonstrated that they could both fly in formation and conduct collective decision-making without human help. Swarming of drones can be advantageous for offensive missions because the swarm potentially can overwhelm enemy defenses with a large number of potential targets. Furthermore, if a swarm gets dispersed, it makes it even more difficult and costly to provide a defense against the drones. Drones, whether in swarms or not, also can be used as decoys or distractions, to cause a target detection system, a missile system, and/or any other defense system, to focus on the drone (or swarm of drones) instead of another incoming attack by other devices. Swarms of drones also could swarm over an enemy's airfield (or even a commercial airport) to impede and/or prevent aircraft from taking off.

There have been reports of swarms of drones and/or individual drones performing hostile/offensive actions in recent years. For example, the Russian Ministry of Defense reported that in January 2018, a swarm of ten armed drones rigged with explosive devices descended over Hmeimim air base in Syria. In June 2018, a UK pilot indicated a drone was deliberately flown at his PA-31 aircraft as it came in to land at RAF Northolt. Therefore, drones also can pose significant risks to civilian airspace, as well, and the FAA estimates that by 2021 there will be as many as four million drones operated by hobbyists and commercial users.

To help counter the threat of drones, especially swarms of drones, in both military and non-military situations, various types of anti-UAS systems and countermeasures are being developed, including but not limited to systems that physically destroy the drone and/or components within it (e.g., with a laser, with a missile, electromagnetic pulse (EMP), etc.), systems that neutralize the drone (e.g., with jamming signals), and systems that take control of the drone (e.g., with spoofing control signals that the drone(s) use and/or receive). For the best operation of such systems, however, it is helpful and/or important that the one or more drones (and/or swarms of drones) be detected and monitored/tracked, with reasonable accuracy. Various types of target detection systems are now in use to detect, track, and/or monitor drones, including but not limited to radio frequency (RF) analyzing systems (e.g., radar), acoustic sensors (microphones), and optical sensors (e.g., cameras).

It is vital, therefore, that target detection systems and other sensing systems, such as radar systems, are able to be evaluated and tested for their ability to track, detect, and identify drones, especially swarms of drones among other scattering sources (e.g., discriminating drones from biological targets, other man-made targets, and/or other objects that can confuse radar (e.g., chaff). In some embodiments, to evaluate the abilities of a target detection system vs one or more drones (especially swarms of drones), target detection systems need to be able to perform radar signal processing and testing of multiple targets, multiple scatterers, multiple Doppler modulation sources, multiple targets, multiple and varied target spacings, etc. This can be expensive and complicated to implement and test/simulate using multiple actual drones, in a quantity sufficient to simulate the kinds of swarms of drones that might be encountered. It also can be challenging, in some instances, to configure such a swarm with test software. Providing a swarm of drones and flying them at the target detection system is, of course, one way to evaluate and test the ability of a target detection, but that technique can be costly and can require developing swarm coordination software to simulate behavior and flight patterns of the swarm. Flying multiple drones, even for testing, can also be challenging to implement even from an FAA permissions standpoint. The embodiments described herein, however, provide an even more advantageous and low cost way to evaluate the ability target detection systems and sensors to detect, monitor, track, and/or identify, one or more drones, including clusters and/or swarms of drones, using far fewer UAV devices than would be required if there were a 1:1 drone device correspondence between an actual drone swarm being simulated and a test swarm to simulate that actual swarm.

Accordingly, in at least some embodiments described herein, systems, methods, and devices are provided enabling the test, evaluation, calibration, etc., of target detection systems, against a grouping of multiple closely spaced drones, using just a single UAV/drone, to which one or more (advantageously, multiple), lightweight, inexpensive, UAV/drone/object emulation devices, are coupled and, advantageously, in certain embodiments, controllably and/or adjustably spaced. The arrangements provided in at least some embodiments described herein are flexible, economical, and lightweight, enabling ready deployment in the field with little to no added software or training needed, to help evaluate virtually any type of target detection system against the threat of multiple drones/objects, or other sources to be emulated, in a grouping.

Figure 2:
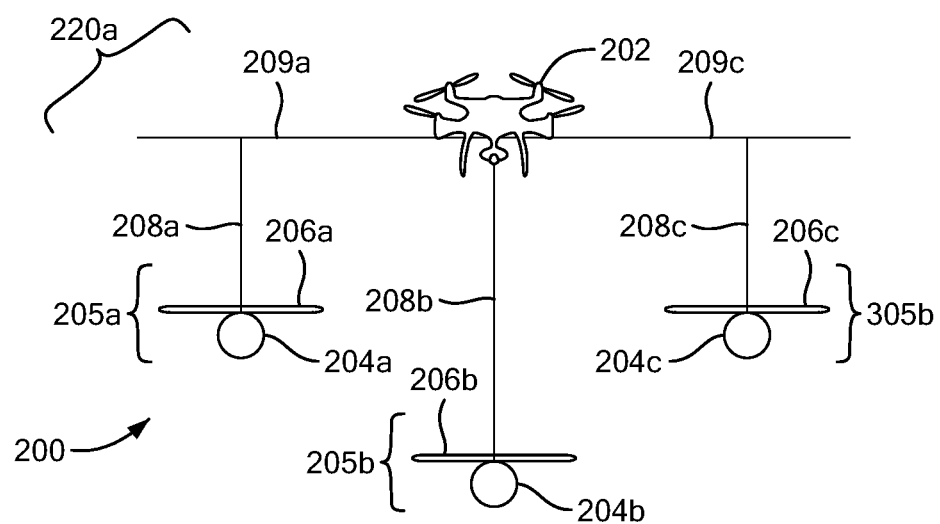
FIG. 2 is an illustration of a first system for simulating the grouping of FIG. 1, in accordance with one embodiment.
Figure 4:
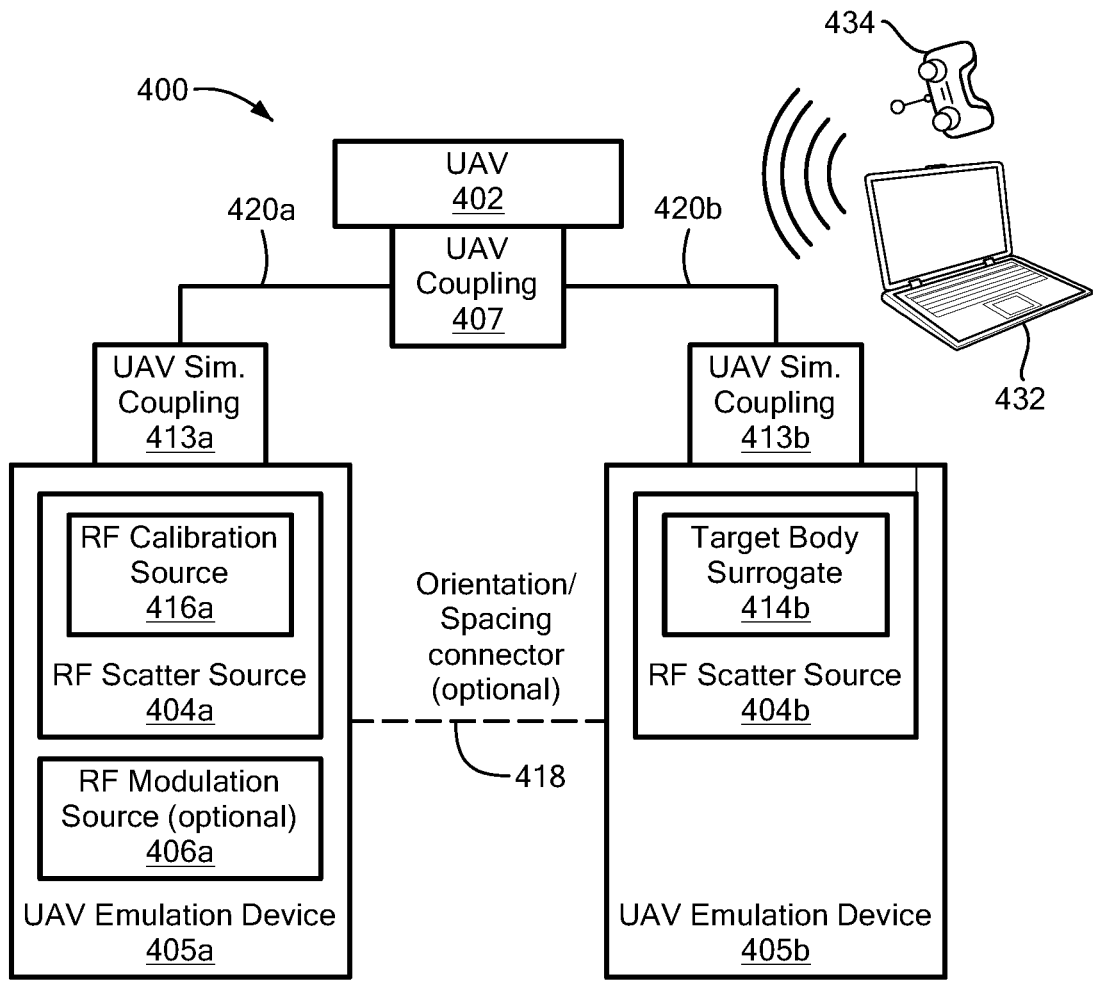
FIG. 4 is a block diagram of a system for simulating a grouping comprising a plurality of UAVs, or other objects in accordance with an embodiment.
Figure 5:
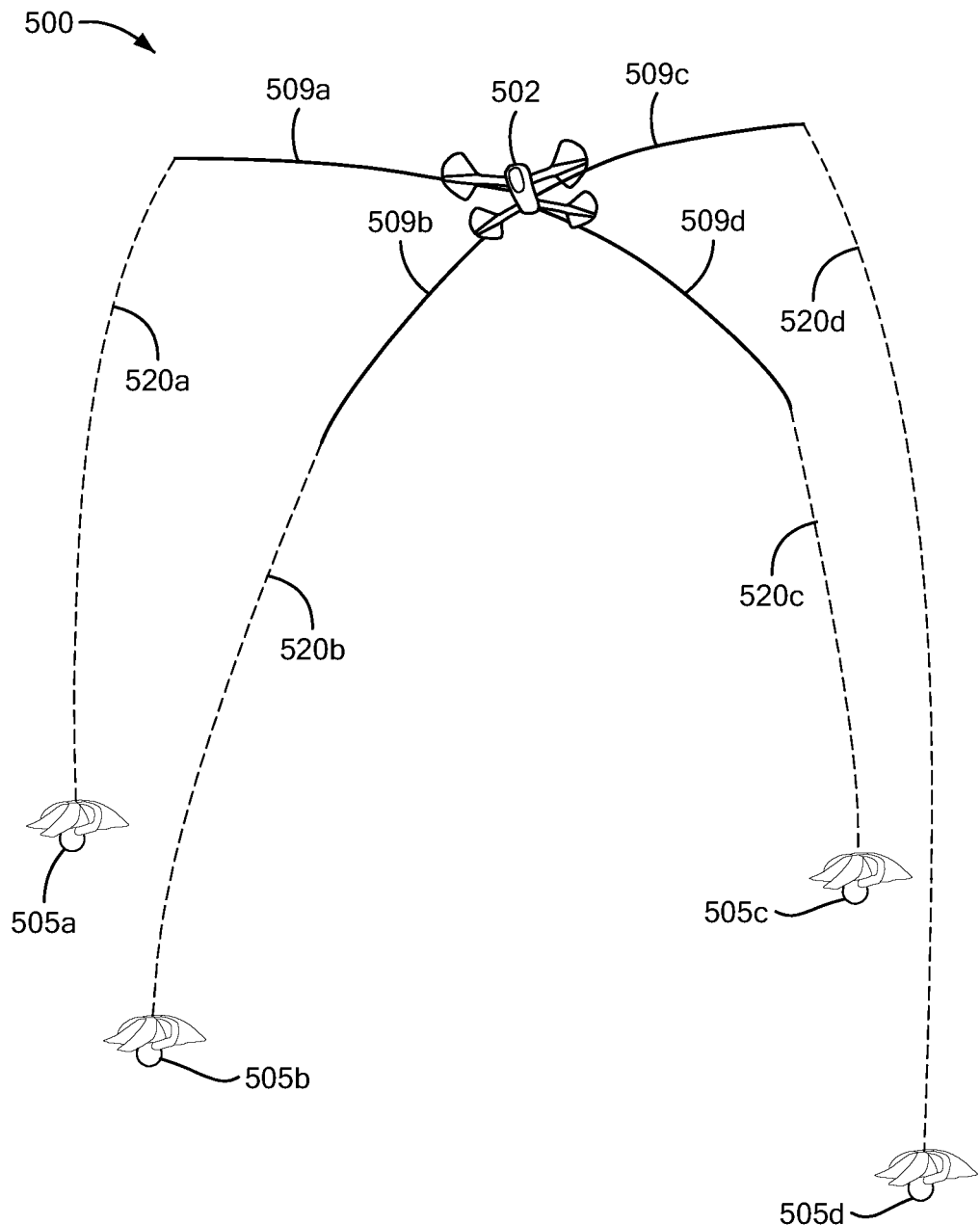
FIG. 5 is an illustrative example of the system of FIG. 2, during flight, in accordance with one embodiment.

FIG. 2 is an illustration of a first system for simulating the grouping of FIG. 1, in accordance with one embodiment, and FIG. 5 is an illustrative example of the system 200 of FIG. 2 during an exemplary test flight 500, in accordance with one embodiment. Referring to FIGS. 2 and 5, the first system 200 is configured to enable the test, evaluation, calibration, etc., of any type of target detection system (and advantageously, a radar system), against a simulated grouping of multiple spaced drones or other objects (including, in certain embodiments, closely spaced drones), by using just a single drone/UAV 202/502, to which one or more (advantageously, multiple), lightweight, inexpensive, emulation devices 205a-205c/505a-505d, are coupled. Each respective emulation device 205/505 (described further in FIGS. 4 and 7-17B herein) is made using an RF scatter source 204 operably coupled to an optional RF modulation source 206, wherein the UAV device 202/502 is then coupled to each respective emulation device 205/505 using a respective connector 220/520. In the embodiments of FIGS. 2 and 5, the respective connector 220/520 comprises a type of tether having a first thicker portion 209/509, connected at the UAV 202/502 end, and a second thinner portion 208/508, connected to the emulation device 205/505. At least a portion of the respective tether is made using a material that is configured so that it does not substantially reflect RF energy and/or radar waves (e.g., the material is invisible or transparent to radio frequency waves or other types of radar waves or absorbs radar waves). The connector 220 (described further herein) advantageously is made using one or more materials that do not substantially reflect RF energy. For example, materials that do not substantially reflect RF energy can include materials that are substantially invisible or transparent to RF energy and/or radar, or which absorb RF energy such as twine, rope, cord (e.g., polyester, plastic, cotton, hemp), wood and wood products, plastic, fiberglass, etc., polymer-based radar absorbing materials (RAM), carbon fibers, etc . . . .

Figure 3:
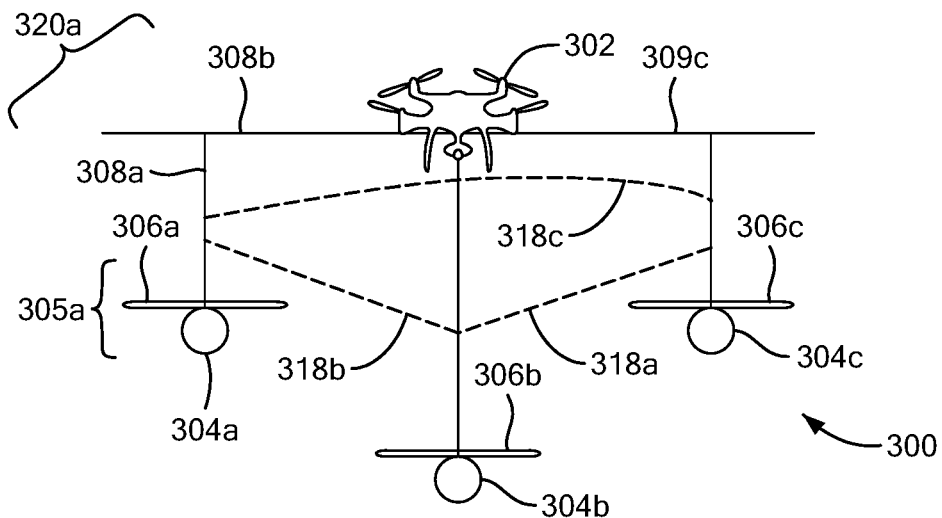
FIG. 3 is an illustration of a second system for simulating the grouping of FIG. 1, in accordance with one embodiment.
Figure 6A:
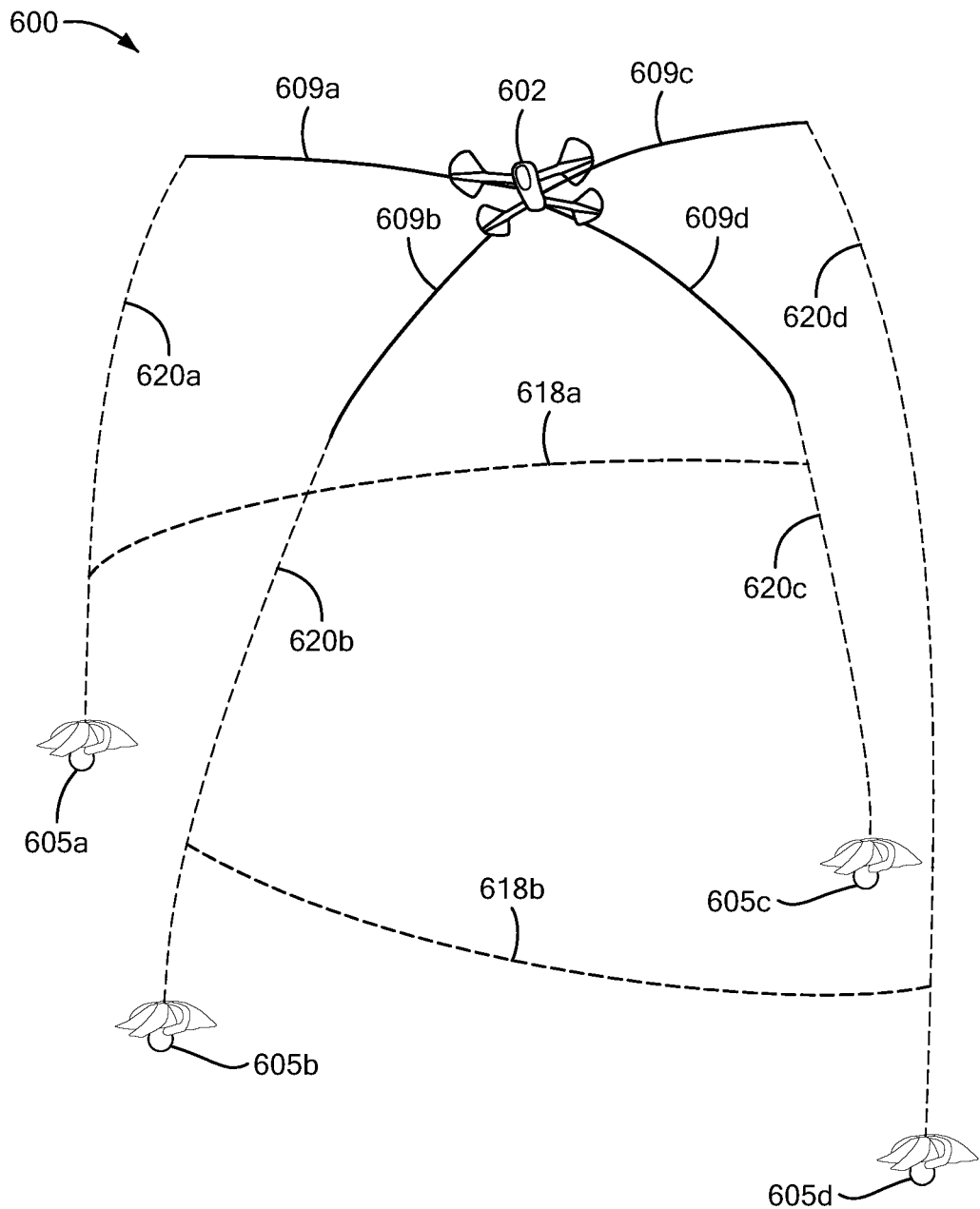
FIG. 6A is an illustrative example of a system similar to the system of FIG. 3, during flight, in accordance with one embodiment.

FIG. 3 is an illustration of a second system 300 for simulating the grouping of FIG. 1, in accordance with one embodiment, and FIG. 6A is an illustrative example of a system similar to the system 300 of FIG. 3, during flight 600, in accordance with one embodiment. The second system of FIGS. 3 and 6A is substantially similar to the first system 100 (with similarly numbered components, except beginning with the reference numbers "3" and "6" instead of "2" and "5"), except that the second system 300 includes second connections 318a-318c/618a/618b that are configured between one or more of the first connections 320/520 between the UAV 302/602 and the respective emulation devices 305/505. The additional connections 318/618, which are optional, are also made from a radar-invisible/radar transparent/radar absorbing material and are configured to further maintain a spacing (e.g., a predetermined spacing) between the UAV emulators 305/505 during flight.

The UAV emulator devices described herein (i.e., the UAV emulator devices 205/305/505/605 of FIGS. 2, 3, 5, and 6, as well as the UAV emulator device 405 of FIG. 4, described further below) are lightweight, inexpensive, passive devices that are configured to emulate one or more behavior characteristics of a UAV/drone/object. For example in an embodiment where the behavior characteristic is a characteristic that is apparent to RF energy (e.g., a radar), the UAV emulator device 405 is configured to emulate the radar cross section and other RF characteristics of an actual UAV/drone/object, by providing at least one and optionally two functional features:

one or more RF scatter sources, each respective RF scatter source is configured to emulate a first behavior characteristic by simulating a scattering pattern associated with a given UAV, such as by having a radar cross section that advantageously is known or can be determined readily to correspond to that desired to be emulated (e.g., an RF scatter source having a known radar cross section, such as an RF calibration source, or an RF scatter source having a radar cross section that is configured to emulate or at least represent the radar cross section of a UAV/drone/object); and optionally, one or more an RF modulation sources, each respective RF modulation source configured to emulate one or more parts moving at or in the target to be detected, e.g. configured to emulate, optionally, a second behavior characteristic, wherein the second behavior characteristic can be the same type of behavior characteristic as the first behavior characteristic that the RF scatterer emulates, and/or can be further radar cross section or radar characteristic, a heat signature, a physical appearance, etc. In certain embodiments, the RF modulation source is configured to emulate rotor blades or propeller blades of the UAV, such that the RF modulation source can emulate features such as Jet Engine Modulation (JEM) and/or micro-Doppler radar signatures, heat signatures, etc. Although the RF modulation source is not required for all embodiments of the emulation device, it can be advantageous for at least some embodiments, because the RF modulation source can be used to help emulate the Doppler modulated signal returns that appear in sum-power maps. As those of skill in the art will appreciate, this can be used in some advanced signal processing techniques, e.g., to help to test algorithms and other processes, running at a target detection system, which seek to determine if returns might be coming from a swarm of drones vs. another target or plurality of targets, such as a flock of birds (the radar returns for which will not have the same motions as that of rotating propeller blades).

In certain embodiments, the emulation device can include additional features to help emulate additional behavior characteristics and/or physical features of a UAV/drone/object. In certain embodiments, the[ ] emulation devices can simulate/emulate virtually any airborne object (natural/biological, manmade, etc.) that a radar or sensor can encounter during operation. This can help, in certain embodiments, to evaluate the ability of a radar or other sensor to discriminate the features of UAVs from other airborne objects, so that the radar or sensor potentially can determine which objects are UAVs and which are other airborne objects. For example, the emulation device can include a battery or motor configured to generate a heat signature that emulate that of an actual UAV. In certain embodiments, the emulation device can comprise a target body surrogate that is configured to emulate the actual physical appearance of an actual UAV or an actual other airborne object, e.g., to sensors that are responsive to physical appearance, wing movement, etc., such as optical sensors and/or cameras.

In accordance with at least some embodiments herein, the UAV emulator devices are able to emulate one or more key characteristics of a UAV, to a device that is attempting to detect, identify, track, monitor, and/or counter, the UAV. For example, in certain embodiments, the emulator device is configured to emulate a characteristic such as a radar signature (or other characteristics applicable to a given sensor, such as a heat signature or physical appearance) of one or more actual UAV devices (advantageously, multiple UAV devices flying at the same time and spaced apart from each other), or other airborne objects, but without requiring all of the components and added weight, along with control software, and possible human control that would be required if an multiple actual UAVs were being used and flown, or the complexity in coordinating, controlling, and/or configuring other airborne objects (some of which, like biological/natural airborne objects, may not be able to be readily or easily configured/controlled for testing). Thus, for example, in accordance with at least some embodiments, one actual UAV can be flown, with one or more emulation devices tethered to it, so emulate or simulate, to target detection systems and other sensors configured for sensing/detecting UAVs/objects, a situation where a plurality of UAVs is being flown or where a plurality of airborne objects is present.

In certain embodiments, for example, sensors such as optical and/or infrared sensors can be configured to sense/detect UAVs/object and emulation devices operably coupled to the UAVs, if the emulation devices are configured for the particular use case of sensor. In one embodiment, RF sensor requirements for the part of the emulation device acting as an RF scatter source (e.g., a target surrogate) might have to be tailored or configured to be workable with a given sensor. For example, an optical sensor like a camera, in certain embodiments, may require a more realistic target body surrogates, for each being emulated, as compared to a radar that configured to look for a radar cross section. Similarly, in certain embodiments, an IR sensor might require that the emulation device include an element configured to generate a heat signature for each UAV being emulated, such as an actual battery or motor.

To enable the UAV emulation device to emulate the behavior of an actual UAV to whatever is detecting/sensing the UAV emulation device, in certain embodiments, this can be accomplished by coupling or tethering the UAV emulator device to an actual UAV, advantageously at a predetermined or defined distance that can be maintained during flight, and then flying the actual UAV, which is towing along the UAV emulator, and using a target detection system (e.g., a radar) or other sensors used to detect/track drones), to attempt to detect, monitor, track, and/or identify, both the UAV and any one or more emulation devices it is towing/pulling. The arrangement of UAV device coupled to emulation devices, especially the particulars of the spacing in all three dimensions, can help to configure, control, and adjust spacings between the UAV and emulation devices, as well as between emulation devices, not just vertically but also horizontally, front to back, etc., so as to simulate virtually any three directional arrangement or pattern of UAVs or other objects. In at least some embodiments (see, e.g., FIGS. 6B-6H herein), the adjustment of the spacings can even be done "on the fly," e.g., during flight, as needed, to help evaluate the capabilities and/or resolution of the target detection system and/or sensors that are attempting to detect, track, and/or monitor one or more UAVs. This is shown and described further herein in connection with FIGS. 6B-6H, described further herein. For example, the entity controlling a given UAV flying with the attached emulation devices, can make the spacing between the UAV and emulation devices, smaller and smaller (or larger and larger) to help evaluate the ability of the target detection system to determine how many and what type of UAVs are in a grouping of UAVs. It can be advantageous, in certain embodiments, to provide dynamic spacing between a UAV and an emulation device (as discussed below in connection with FIGS. 6B-6H). For example, dynamic spacing can provide a reduced footprint (of the UAV emulator device assembly, including both when it is attached to a UAV and when it is not attached) during storage. The dynamic spacing also can provide a reduced footprint of the UAV plus emulator assembly, during takeoff, which can reduce the drag and other air resistance during takeoff; then, when the UAV plus attached emulator assembly is in flight, the UAV emulator assembly can be extended and/or unfolded (as described further below) to provide spacing that is configured to emulate a grouping of UAVs. Another advantage is that adjustment of spacing between the UAV and the emulator assembly can happen dynamically, during flight (e.g., as described further herein in connection with FIG. 18), to observe and test the performance of a sensor or target tracking system that is monitoring the UAV plus emulator assembly.

Figure 6B:
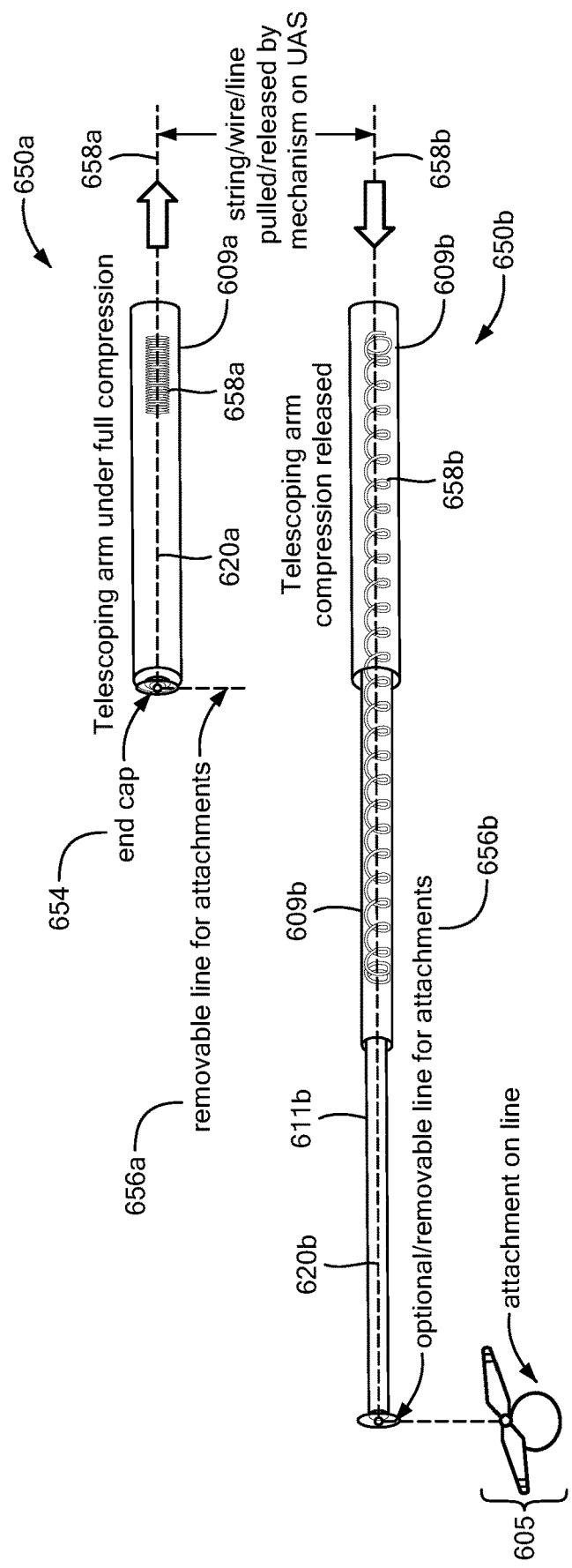
FIG. 6B is a first illustrative example of a system similar to that of FIG. 4, configured for dynamic adjustment with at least one telescoping arm, in accordance with one embodiment.

FIG. 6B is a first illustrative example of a system similar to that of FIG. 4, configured for dynamic adjustment with at least one telescoping arm 609, in accordance with one embodiment. Referring to the top view 650a, the telescoping arm 609a is shown under full compression, wherein a spring loaded connection 620g is formed into a coil 658a within the arm 609a, held in place by an end cap 654. In certain embodiments, the end cap 654 is configured to permit a removable line 656a for attachments (e.g., the emulator device 605) to be attached thereto. The outer portion 656a of the connecting line 620g runs through the telescoping arm 609a, coming out the other side as a UAS/UAV connecting portion 658a that is configured to be controlled by a mechanism (not shown, but can be a motor or other well-understood means) on the UAS/UAV. The connecting line 620 can thus be pulled or released by the mechanism of the UAS/UAV, to release or pull the line out and back in, so as to control the distance that the emulation device 605 is from the UAV (not visible in FIG. 6B). In certain embodiments, this can operate similar to how a fishing line or kite string can be rolled out or reeled back in, as will be well-understood. Use of an electric or other type of motor with a spindle, for actuation, is of course, merely exemplary, and not limiting; many other methods are usable.

In the bottom view 650b of FIG. 6B, the telescoping arm 609b is shown with the compression released, such that the spring portion 658b is decompressed when the compression is released, thereby releasing the extended portion 611b which holds therein the extended connection 620h, to which the UAV emulator device 605 is attached.

FIG. 6C is a top view 650c of the system of FIG. 6B, looking down from the UAV device to which it is attached (not shown) showing telescoping arms 609 retracted, in accordance with one embodiment. In this example embodiment, a frame 662c (not visible in FIG. 6B) is provided to help maintain a spacing between UAV emulator devices 605 (not visible in this view). The frame 662c need not have any particular shape (the substantially circular shape of FIG. 6C is illustrative but not limiting—other shapes such as square, rectangular, diamond, etc., are of course usable), and the frame 662, in certain embodiments, can be substantially flexible and compressible and could even itself be made of a material similar to the material of the connection line 620. Advantageously the frame 662 (as well as other components that connect between the UAV and the UAV emulator device 605) are all made from material that does not reflect radar energy (e.g., material that is transparent to RF energy or which absorbs RF energy). The rotating spindle 660 is operably coupled to a mechanism in the UAV (e.g., a motor) that controls the extension and release of the connection line 620 that runs through telescoping arms 609, where FIG. 6C shows the counterclockwise direction for "winding" the line 658, but this is not limiting.

The frame depicted in certain views of FIG. 6C-6H is but one example of a type of frame, and many different materials, compressible and not, can be usable in various embodiments. Further, there are many different ways to cause motion of a line or leg besides a motor as will be appreciated (e.g., pneumatic, hydraulic, or other means. Further, the embodiments showing telescoping or folding arms are merely illustrative and not limiting. Those of skill in the art will appreciate that there can be many different ways to accomplish dynamic separation of the emulation devices.

FIG. 6D is a top view 650d of the system of FIG. 6B, showing telescoping arms 609 extended, in accordance with one embodiment. As can be seen, the extended portion 611 is visible and, in this embodiment, extends beyond the frame 662d (but this is not limiting). FIG. 650d shows the clockwise direction for unwinding/extending the line 658, but this is not limiting.

Figure 6F:
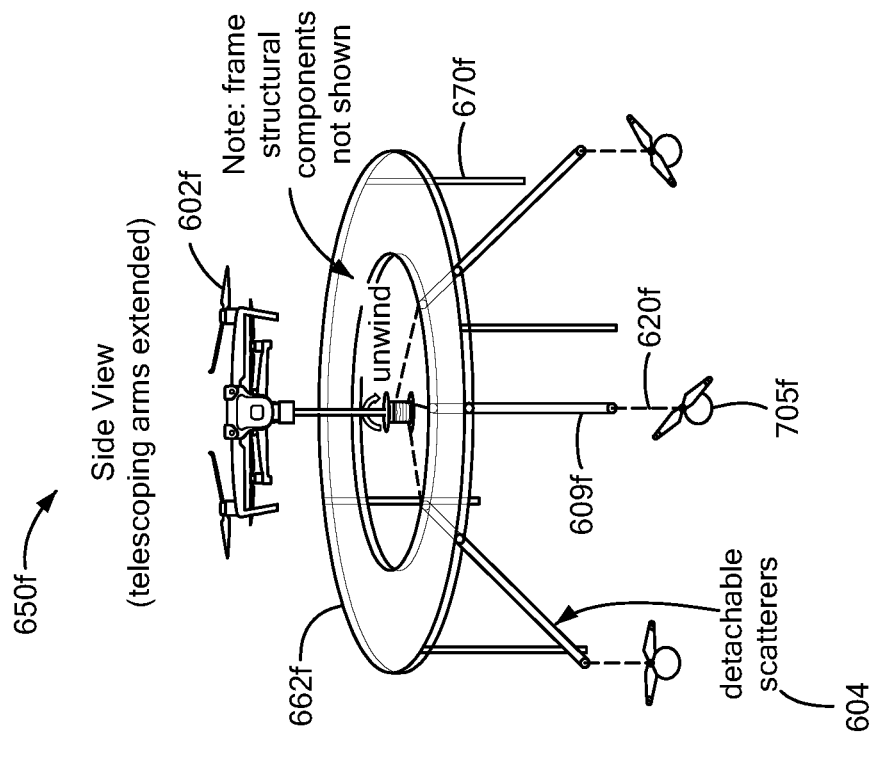
FIG. 6F is a side view of the system of FIGS. 6B and 6D, showing telescoping arms extended, in accordance with one embodiment.
Figure 6E:
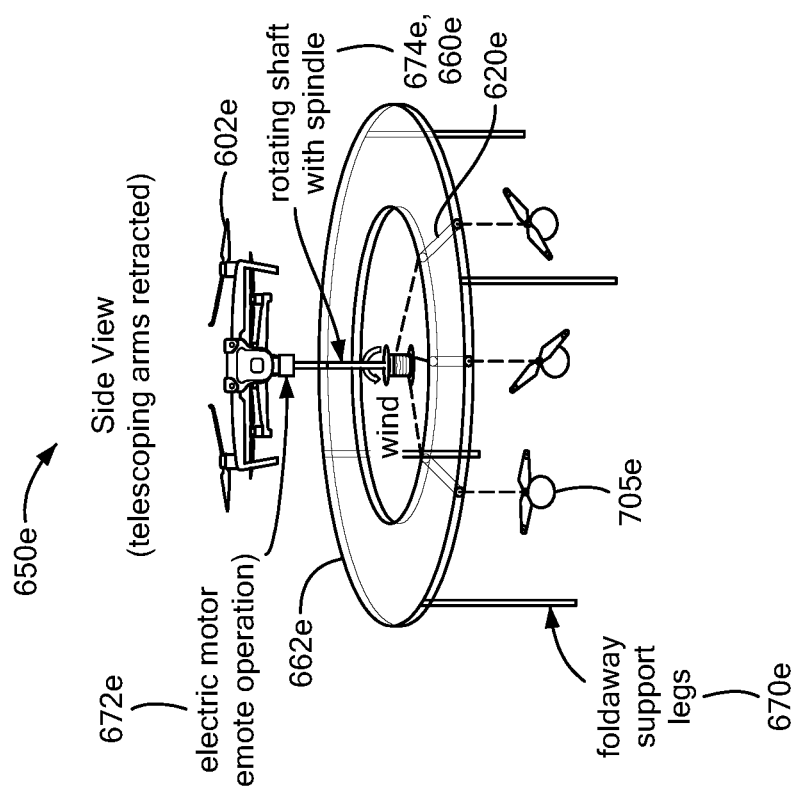
FIG. 6E is a side view of the system of FIGS. 6B and 6C, showing telescoping arms retracted, in accordance with one embodiment.
Figure 6H:
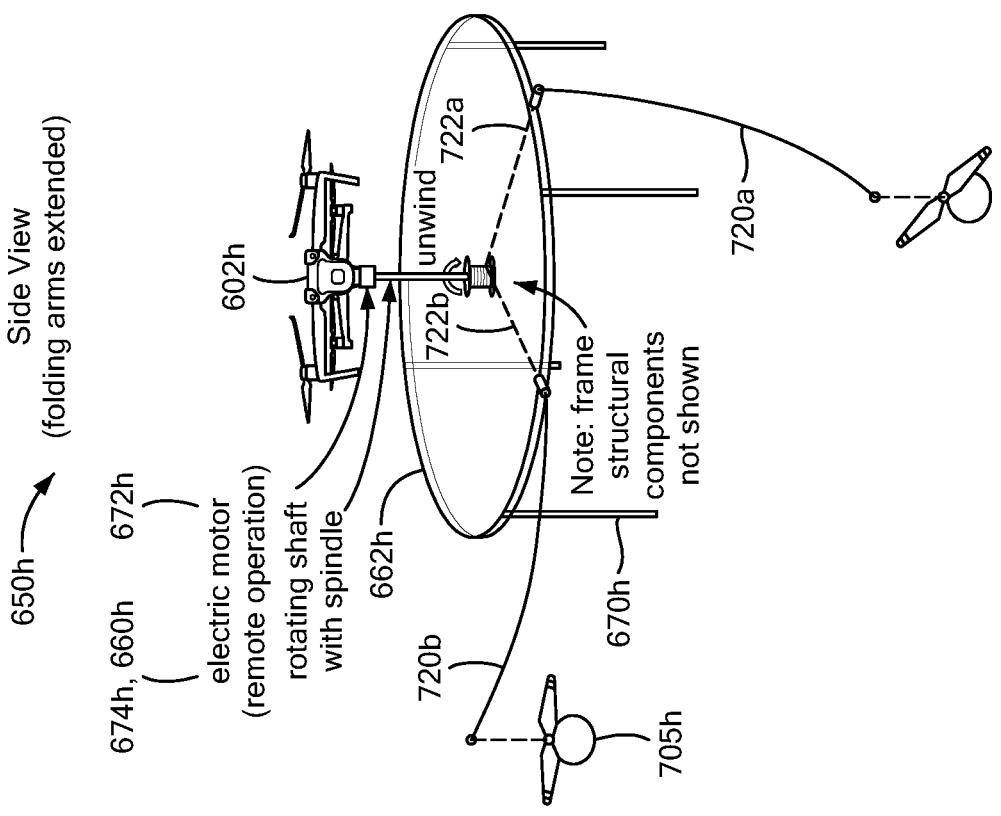
FIG. 6H is a side view of the system of FIG. 6G, showing folding arms extended.
Figure 6G:
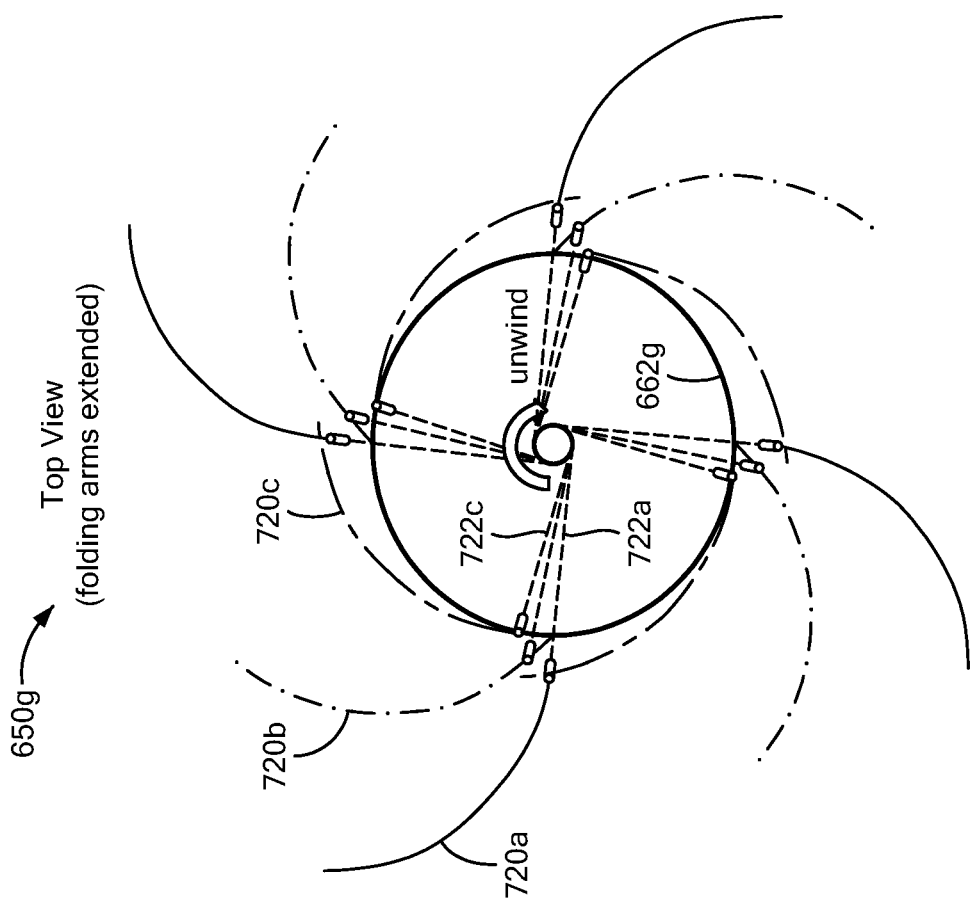
FIG. 6G is a top view of a second illustrative example of a system similar to that of FIG. 4, configured for dynamic adjustment with at least one folding arm, in accordance with one embodiment.

FIG. 6E is a side view 650e of the system of FIGS. 6B and 6C, showing telescoping arms 609 retracted, in accordance with one embodiment. In the example embodiment of FIG. 6e, the connection to the UAV 602e, can be seen, including a remote controllable electric motor 672e operably coupled to a rotating shaft 674e with a spindle 660e. In this embodiment, the frame 662e includes a plurality of foldaway support legs 670e, to provide support to the assembly before takeoff and also to help prevent entanglement with anything on the surface from which the emulator assembly is being launched. FIG. 6F is a side view 650f of the system of FIGS. 6B and 6D, showing telescoping arms 609f extended to extend the distance of connector 620f between the UAV emulator device 705f and the UAV 602f, in accordance with one embodiment;

FIG. 6G is a top view 650g of a second illustrative example of a system similar to that of FIG. 4, configured for dynamic adjustment with at least one folding arm, in accordance with one embodiment. FIG. 6H is a side view 650h of the system of FIG. 6G, showing folding arms extended. In certain embodiments, the system of FIG. 6G has horizontally folding/unfolding legs 670 such that when stowed (e.g., during flight), they are efficiently nested within the support structure 662. Referring to FIGS. 6G and 6H, the view of FIG. 6G is looking down from the UAV (not visible in FIG. 6G but is visible in FIG. 6H). The embodiment of FIGS. 6G, 6H differ from those shown in FIGS. 6B-6F in that there are folding arms 722 to which the connecting lines 720 are attached, and the folding arms 722 can be extended horizontally during flight. For example, referring to FIG. 6G, the varying positions of a folding arm during unfolding are shown for 4 different arms (e.g., for one arm, the three positions are shown as 720a, 720b, and 720c). The arms (as shown with the three positional views 720a, 720b, and 720c) unfold along a horizontal arc from the pivot point at the center while the main "arm" portion 722 remains a fixed length. This also means that the location of each "arm" tip (and dangling scatterers (emulators) will move relative to the host UAV body orientation, in certain embodiments. In comparison, in some embodiments, a telescoping arm, as in FIGS. 6B and 6C, simply extends along a given radial relative to a body. In the embodiments of FIGS. 6G and 6H, this rotating arm embodiment extends the scatterers (i.e., the emulators) from the body of the host UAV to which they are attached but does so while rotating them in azimuth angle around the host UAV body as the arms fold/unfold).

In FIG. 650G, the emulation devices 705 are not shown, for clarity, but it will be understood that they would be disposed at the end of each line 720). As can be seen, during motion of the UAV to which the assembly of 650g is attached, the arrangement of the emulation devices 705 changes relative to the direction of motion of the UAV (not shown).

For example, in certain embodiments that include a UAV emulator device having both an RF calibration source and an RF modulation source, during flight of the entire assembly that includes the UAV and that emulation device, the RF scatter source of the emulation device helps to simulate/emulate the radar cross section associated with the "body" of a drone/UAV, and the optional RF modulation source coupled to the RF scatter source helps to simulate/emulate the motion of the propellers of a UAV. In certain further embodiments, the RF modulation source coupled to the RF scatter source can be configured to emulate the motion of the motor(s) of the UAV (or other motion of a given object). For example, in one embodiment, the RF modulation source comprises a substantially lightweight motor and rotor/propeller configuration attached to a battery and/or to solar panels, which is a configuration that allows the rotor to spin regardless of the motion of the piloted system. In certain embodiments, the RF modulation source used is configured to helps the target detection system to further differentiate the UAV and/or the emulator devices, from other radar artifacts (e.g., birds).

In certain embodiments, when the emulator device, as described herein, is caused to be airborne by being pulled/ towed/flown around by an actual UAV, while maintaining a distance from the actual UAV, the motion of the actual UAV through the air (along with natural causes such as wind) can enable the optional RF modulation source (which is part of some emulation devices in at least some embodiments) to have enough of a rotation such that, coupled with the scattering arising from the RF scatter source, a sensor or a target detection system (e.g., a radar) will "see" the radar returns of the assembly of the RF scatter source and the RF modulation source, together, to be substantially similar, or at least representative, in terms of radar cross section and radar returns, as that of an actual UAV or other object being emulated. Thus, the size, motion, and movement of multiple actual UAVs/objects, flying together in a cluster or swarm, can be simulated for a target detection system or other sensor, in certain embodiments, for the purposes of evaluating target detection performance of the target detection system or other sensors, by connecting multiple emulator devices to an actual UAV, and flying the assembly of UAV plus emulators, and using the target detection system/sensors to track and monitor the movement of the UAV/emulator assembly. Another further advantage of the arrangements described herein is that it can be simpler to get permission and clearance to fly a single UAV (i.e., the single UAV device in the assembly), where the single UAV is coupled to one or more emulator assemblies, for purposes of testing/evaluation, vs getting permission and clearance to fly multiple UAVs.

It is expected that the assembly of the UAV and emulator devices (which in some embodiments herein is referred to as a "swarm simulator assembly" or "UAV SSA") can have multiple military, commercial, and/or recreational/hobby applications even beyond just testing and evaluation of target detection and sensing systems, as will be appreciated by those of skill in the art. For example, by coupling one or more lightweight lights and/or light emitting diodes (LED)s, or even reflectors, to each of the emulator devices (e.g., on the propeller blades of an emulator device, if the device includes them), it can be possible to create a lower cost version of the so-called "drone fireworks" or other lighted drone displays and/or drone light shows, but without requiring the flying of quite as many drones in a controlled formation. It is envisioned that many different types of recreational objects, lights, etc., could be operably coupled to the drone emulator assemblies (similar to what can be coupled to a drone itself), assuming that weight distribution, inertial forces, payload, and other stability concerns for the UAV that is carrying the emulator assembly, are considers. In certain embodiments, it may be possible, as well to put firework rockets and sparklers mounted along different radii on a spinning ring structure under the UAV (e.g., possibly coupled to an emulator device), such that once lit, the ring would spin and produce a light show suspended under the drone or could display messages, etc.

These and other advantages and features are explained and illustrated further herein.

FIG. 4 is a block diagram of a system 400 for simulating a grouping comprising a plurality of UAVs/drones, in accordance with an embodiment. FIG. 4 corresponds to a general block diagram of the systems shown in full or in part FIGS. 2-20. Referring to FIGS. 2-4, the UAV/drone 202/302/402, corresponds to virtually any type of drone described above, which has the capability of carrying the emulation devices 205/305/405. In certain embodiments, the drone 202/302/402 is a Group 1-3 type of drone, as noted above. Referring briefly to FIGS. 15A-1 through 15A 5D, FIGS. 15A_1 is a general example of a fixed wing UAV 1502a_1, and FIGS. 15A-2 through FIG. 15A_5 are illustrations of exemplary fixed wing UAV 1502a_2 through 1502a_5, respectively, which each have folding wings, enabling the respective UAV to be stored in a compressed position and/or launched from a compressed position. Any of the drones of FIG. 15A_1 through FIG. 15A-5 can correspond to a first type of drone 1502 usable as part of the UAV swarm simulation system of FIGS. 2-4, in accordance with one embodiment. FIG. 15B is an illustration of a second type of drone 1502b, usable as part of the swarm simulation system of FIGS. 2-4, in accordance with one embodiment, FIG. 15C is an illustration of a third type of drone 1502c, usable as part of the swarm simulation system of FIGS. 2-4, in accordance with one embodiment, and FIG. 15D is an illustration of a fourth type of drone usable as part of the swarm simulation system of FIGS. 2-4, in accordance with one embodiment. In certain embodiments, the drones 1502a_2 through 1502a_5 of FIG. 15A_1 through FIG. 15A-4, respectively are UAVs with folding wings that are somewhat similar to various products currently available from various manufacturers.

As will be understood, the exemplary fixed wing UAVs 1502 of FIGS. 15A_1 through 15A-5 can be launched via one or more of various take off mechanisms, including VTOL, canister launch, rail launch, air launch, runway, catapult, throwing into air, etc., as is known in the art. Referring to FIGS. 15B through 15C, the drones 1502c, 1502b, and 1502c are illustrative examples of so-called "quadcopter" drones having four rotors. FIG. 15D is an illustration of a fourth type of drone 1502d usable as part of the UAV swam simulation system of FIGS. 2-4, in accordance with one embodiment, where the drone 1502d is configured for vertical take-off and landing (VTOL). UAVs similar to the drone 1502d of FIG. 15D are available from various companies, including Aerovironment of Simi Valley, California. The examples of types of drones in FIGS. 15A-1_1 through 15D are illustrative and not limiting.

Referring again to FIGS. 2-4, at least one (but advantageously multiple) emulation devices 205/305/405 (also referred to herein as "emulation devices", "UAV/object emulation devices" and "emulators") is operably coupled to the UAV device 202/302/402 via a respective connector 220/320/420. FIG. 4 includes two exemplary embodiments of emulation devices, 405a, and 405b, but these embodiments are illustrative and not limiting. Referring for simplicity now to just FIG. 4, the emulation/object device 405a includes one or more emulation components. In the example of FIG. 4, the emulation device 405a includes two emulation components: a first emulation component (RF scatter source 404a) and a second, optional emulation component (the optional RF modulation source 406a), whereas the emulation device 405b includes just one emulation component, the RF scatter source 404b. In addition, the emulation device 405a includes an RF calibration source 416a as its RF scatter source 404a, whereas the emulation device 405b includes a target body surrogate 414b, as its RF scatter source 404b. One of skill in the art will appreciate that additional combinations are possible. For example, in one embodiment, an emulation device could comprise two emulation components, such as both an RF calibration source and an RF modulation source (e.g., as shown in FIGS. 2 and 3). In one embodiment, an emulation device could include a first emulation component corresponding to a target body surrogate as its RF scatter source and can include a second emulation component corresponding to an RF modulation source. In yet another embodiment, an emulation device can include just one emulation component, such as an RF calibration source but no second emulation components (e.g., no RF modulation source). Those of skill in the art will appreciate, as well, that emulation devices could, if desired, include multiple RF modulations sources, as well. In accordance with at least some embodiments, an emulation device 405 also can be configured to include multiples of any one type of emulation component, such as multiple RF modulation sources (e.g., multiple motors, propellers, and/or rotors) attached to another modulation component, such as an RF scatter source, which could be a target body surrogate, e.g., to emulate a quadcopter type of UAV. In further embodiments, for a modulation component made using an RF scatter source 404 that is made using a target body surrogate of a VTOL type of UAV, the additional modulation component (e.g., an RF modulation source 406) can include both vertically and horizontally mounted motors, rotors, and/or propellers.

Referring to FIG. 4 generally, the RF scatter source 404 is configured to emulate the RF scattering pattern of the body of a UAV device, to a target detection system (e.g., a radar) that receives radar returns from the RF scatter source 404. Depending on the type of aerial object and/or UAV device being emulated, the RF scatter source can be either a target body surrogate 414b or an RF calibration source 416. Each emulation device 405a, 405b is coupled to the UAV 402 via a respective connection 420a, 420b (described further herein), and depending on the configuration, additional lightweight connecting pieces and adapters, such as a UAV coupling 407 and UAV simulator couplings 413a, 413b, also can be used. In certain embodiments, the connections 420 and/or couplings 407, 413 are configured to be as "invisible" to the sensing/detecting system (e.g., a radar) as possible, so that the connection or coupling substantially emulates what a sensing/detection system would "observe" in an actual UAV swarm scenario: e.g., observing what appears to be multiple nearby UAVs, not necessarily also observing multiple nearby mechanical linkages (e.g., the connections and couplings). In certain embodiments, the connections 420 and/or couplings 407, 413 are configured to be RF absorbent such that only energy from other parts of the emulation device is returned.

In certain embodiments, an additional connection in the form of an orientation/spacing connection (e.g., connector 418) is provided between two or more emulation devices 405. The connection 420 and orientation/spacing connection 418 advantageously are lightweight and substantially transparent or invisible to radar (or are configured to absorb radar energy), as described further herein. The connection 4420 and orientation/spacing connection 418 also are advantageously configured to help to maintain a spacing and separation between the UAV 402 and the emulation devices 405a, 405b, and/or between the emulation devices 405a, 405b themselves. As described further herein, in at least some embodiments, the spacings can be adjustable, in multiple dimensions (e.g., three or even four dimensions, as further explained in FIGS. 6B-6H) by adjusting the length and/or arrangement of the connection 420a and/or orientation/spacing connector 418. In at least some embodiments, the spacing adjustment is dynamic and/or automatic, including "on the fly," as further explained herein in connection with FIGS. 6B-6H.

The system 400 of FIG. 4 also is in operable communication, preferably wirelessly, with a remote source of control signals to the "host" UAV device 402 (i.e., the device to which the emulator device(s) are connected). The remote control can be accomplished by any means known in the art or later developed, including but not limited to a remote controller 424 and/or a computer 432, as is understood in the art (FIG. 21, discussed further herein, further describes the exemplary computer 432). Although not shown in FIG. 4, the remote controller 424 and/or the computer 432 also can be operably coupled to other devices (including other UAV assemblies 400) and/or computer networks, target detection systems, etc.

Figure 11:
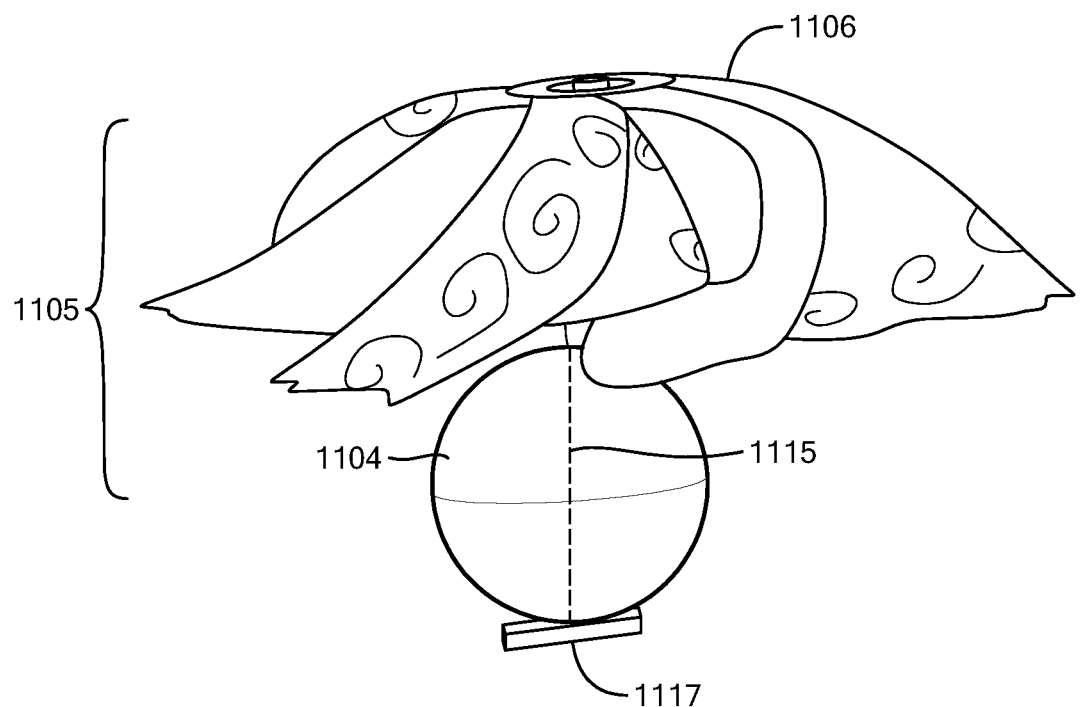
FIG. 11 is an illustrative example of a first emulation device, in accordance with one embodiment.
Figure 12A:
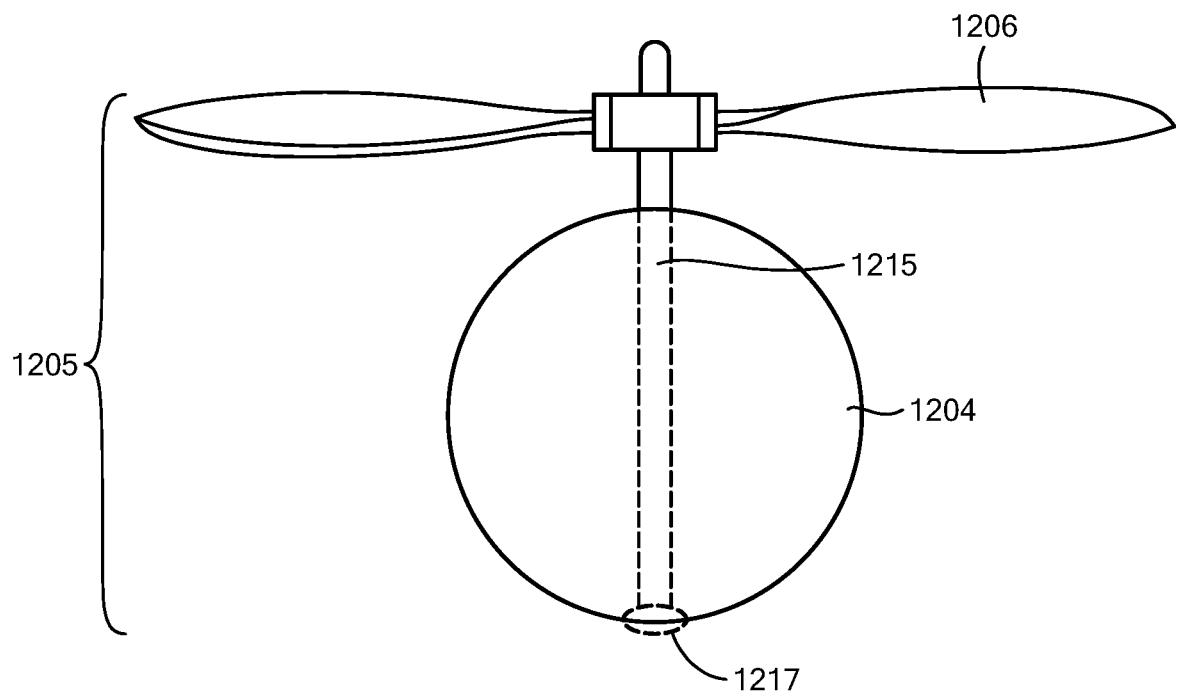
FIGS. 12A and 12B are first and second illustrative examples of first and second emulation devices, respectively, with and without a modulation component, respectively, in accordance with one embodiment.
Figure 12B:
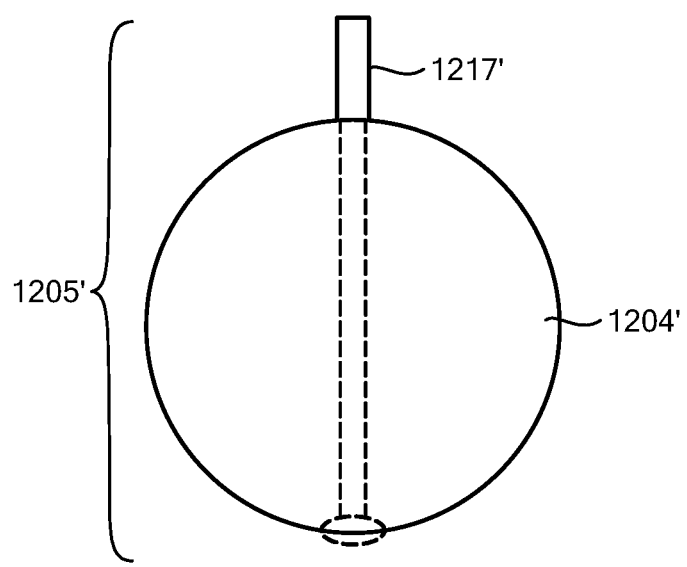
Figure 13A:
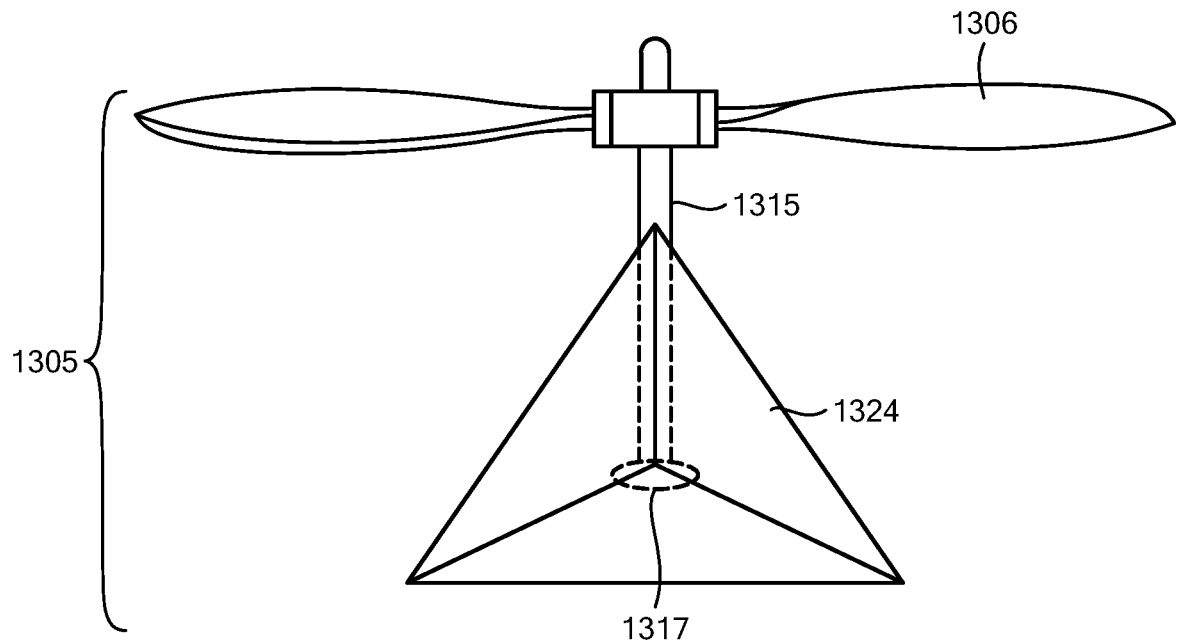
FIGS. 13A and 13B are first and second illustrative examples of a third emulation device, with and without a modulation component, respectively, in accordance with one embodiment.
Figure 13B:
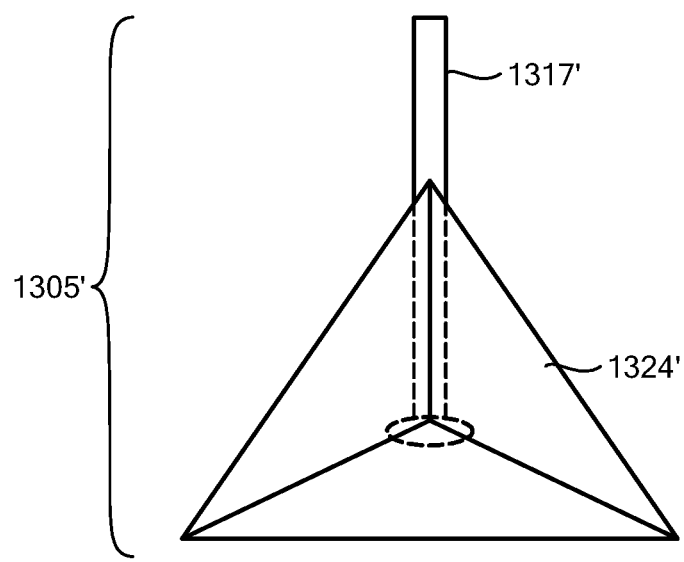
Figure 14:
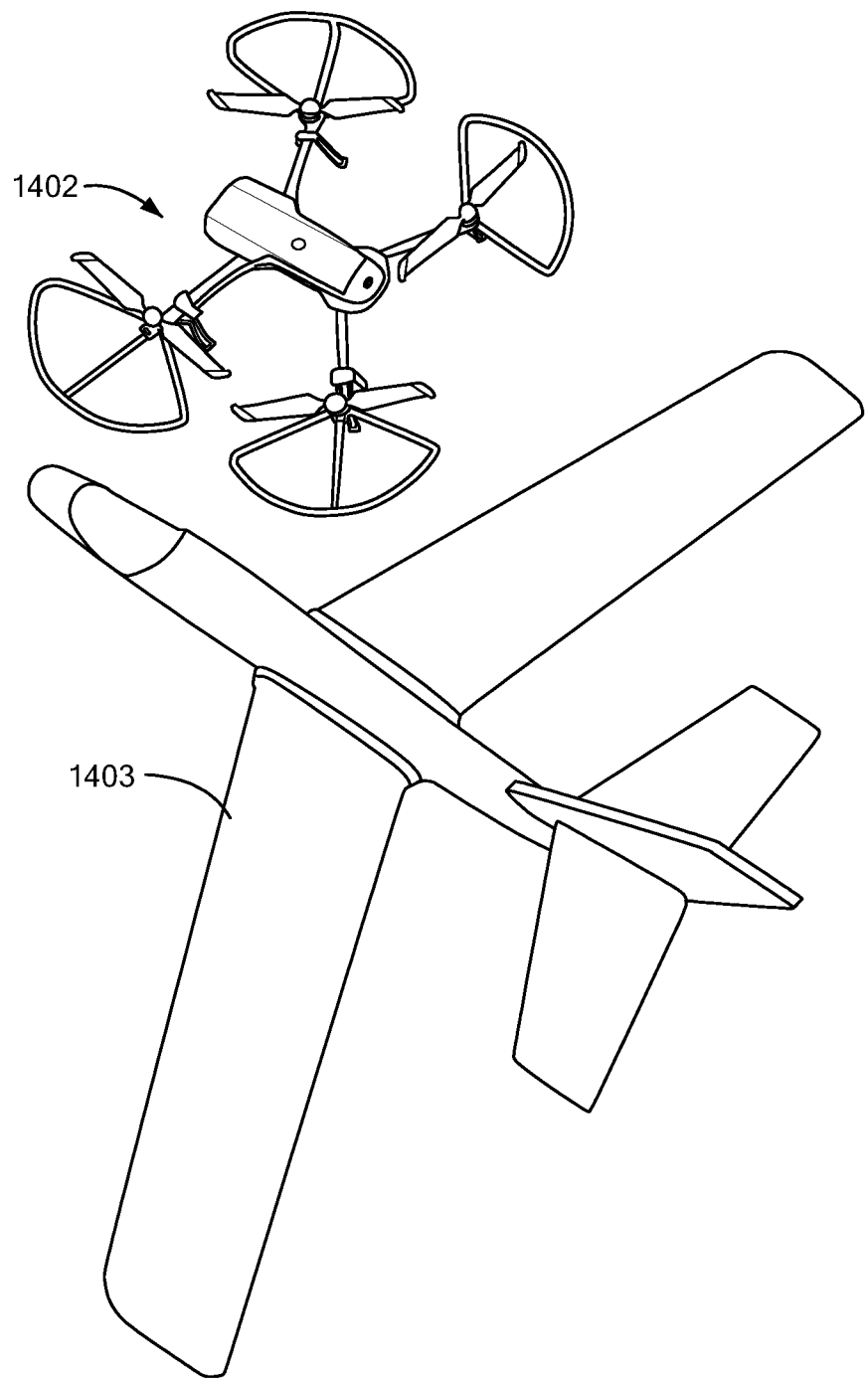
FIG. 14 is an illustration of first and second UAV body surrogates that are usable as part of radio frequency (RF) scatter sources that are part of an emulation device, in accordance with one embodiment.
Figure 15B:
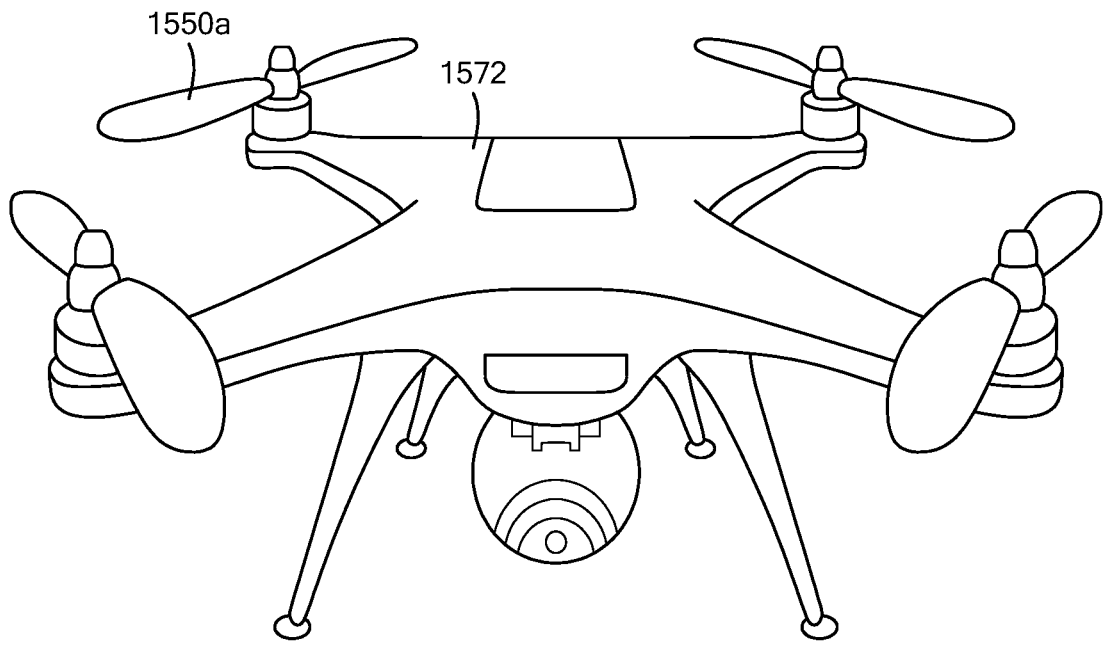
FIG. 15B is an illustration of a second type of drone usable as part of the UAV swarm simulation system of FIGS. 2-4, in accordance with one embodiment.
Figure 15C:
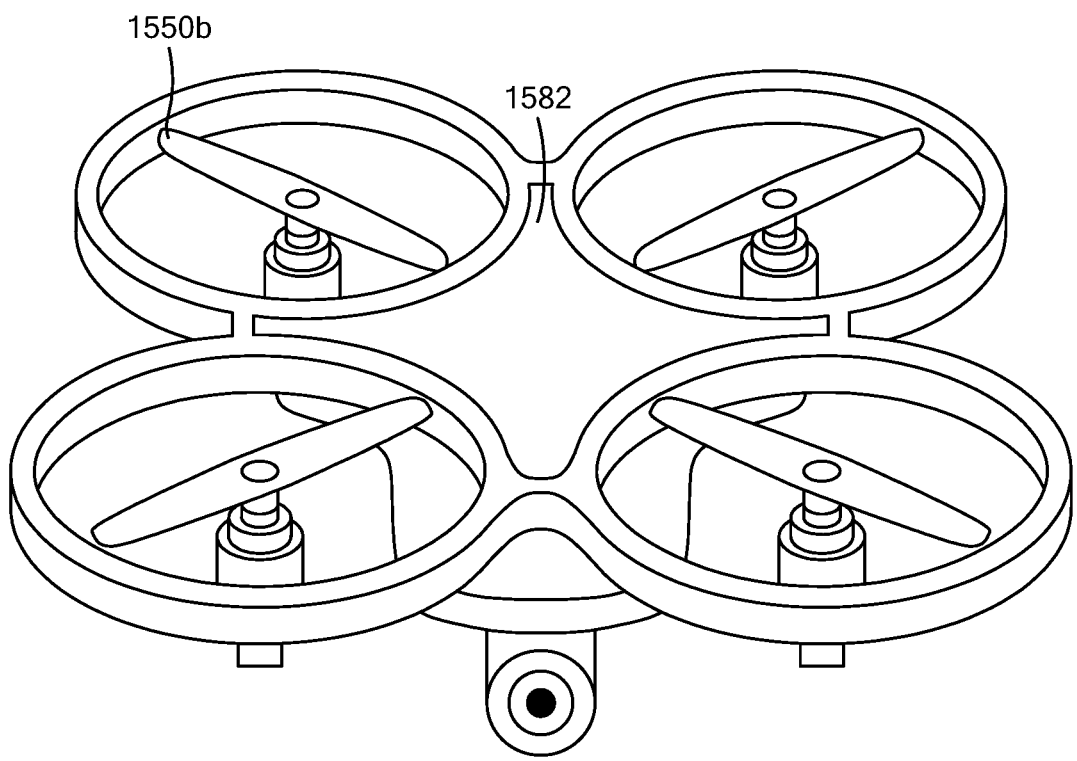
FIG. 15C is an illustration of a third type of drone usable as part of the UAV swarm simulation system of FIGS. 2-4, in accordance with one embodiment.
Figure 15D:
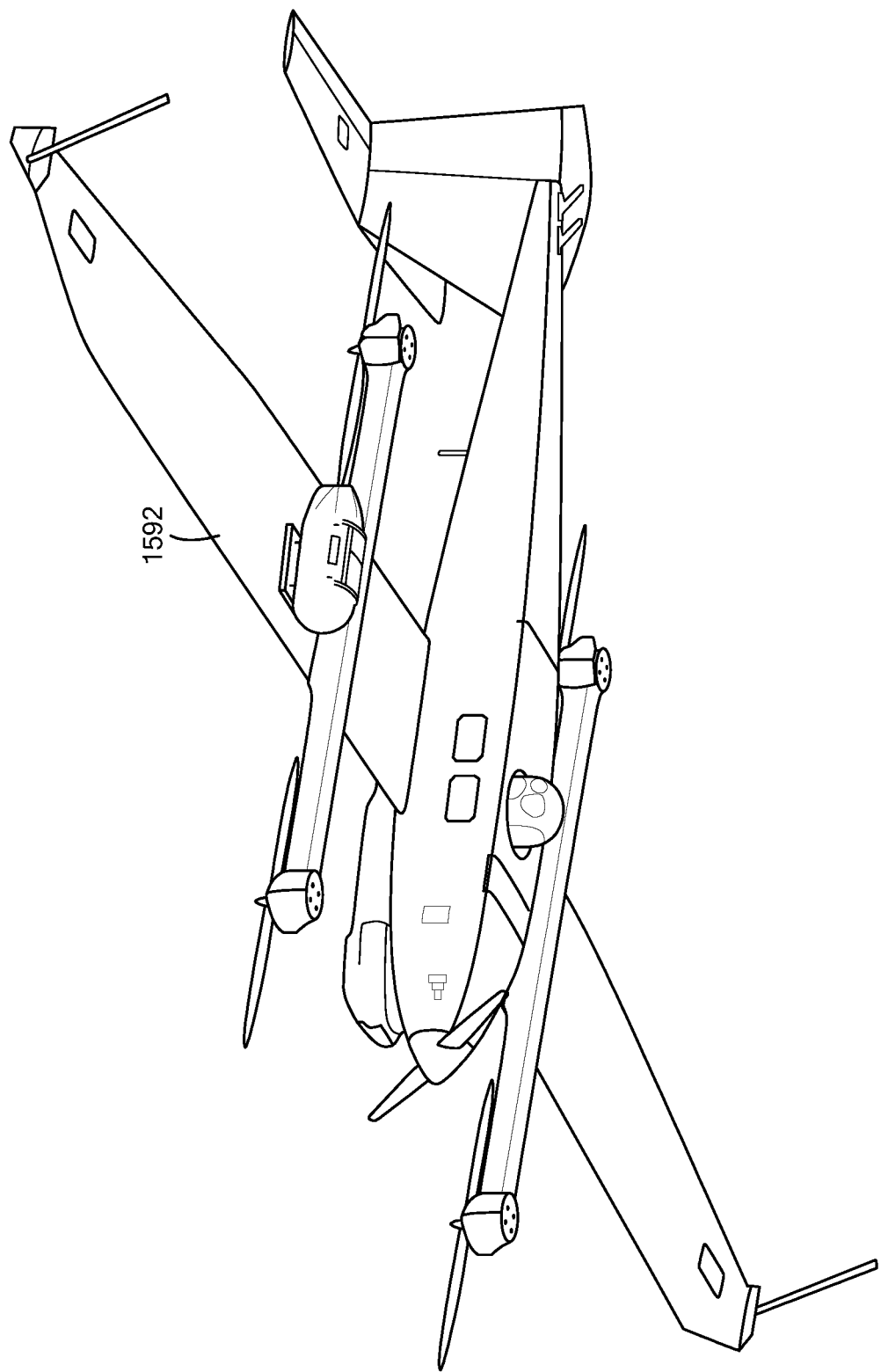
FIG. 15D is an illustration of a fourth type of drone usable as part of the swam simulation system of FIGS. 2-4, in accordance with one embodiment.
Figure 16A:
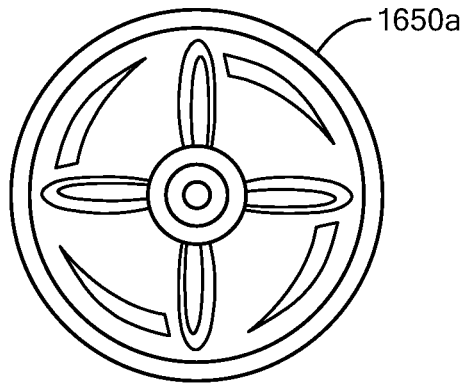
FIGS. 16A through 16F are illustrative examples of devices usable to emulate propeller motion and serve as optional RF modulation sources for an emulation device, in accordance with one embodiment.
Figure 16B:
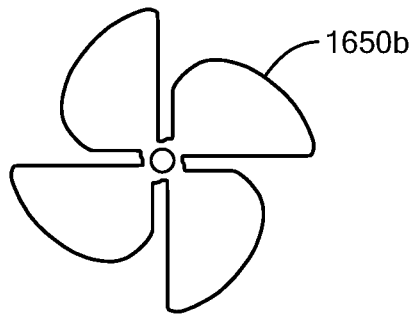
Figure 16C:
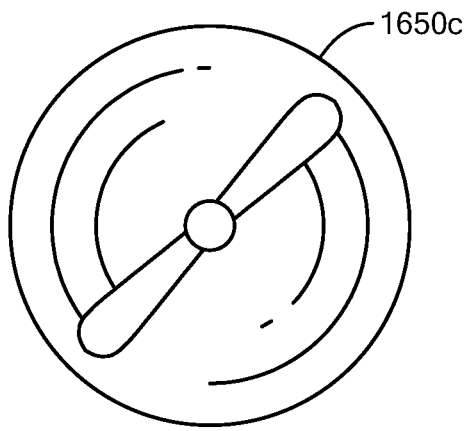
Figure 16D:
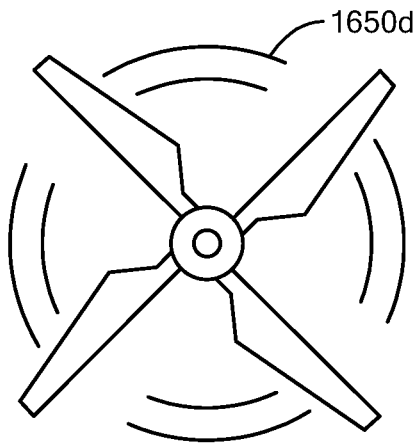
Figure 16E:
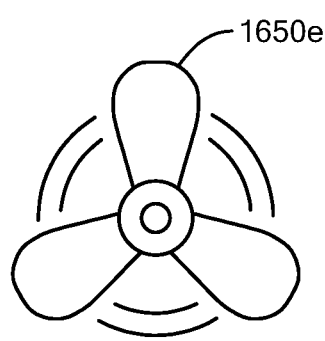
Figure 16F:
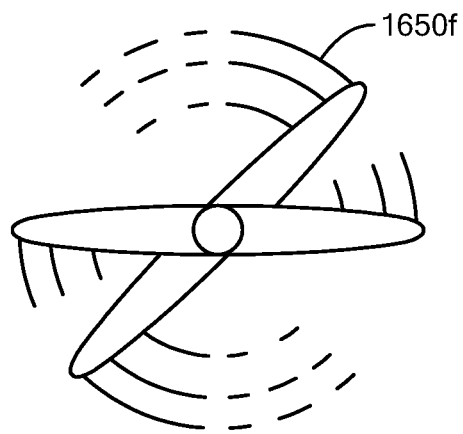

Reference is now made briefly to FIGS. 11-14. FIG. 11 is an illustrative example of a first emulation device 1105, in accordance with one embodiment. FIGS. 12A and 12B are first and second illustrative examples of a first (1205) and a second (1205') emulation device, with and without a modulation component, respectively, in accordance with one embodiment. FIGS. 13A and 13B are first and second illustrative examples of a third emulation device, with (1305) and without (1305') a modulation component, respectively, in accordance with one embodiment. FIG. 14 is an illustration of first and second UAV body surrogates 1402, 1403, respectively, that are usable as part of radio frequency (RF) scatter sources that are part of an emulation device, in accordance with one embodiment.

Referring to FIG. 11, the exemplary emulation device 1105 is made from two emulation components: an RF calibration source 1104 operably coupled to an optional RF modulation source 1106 via a connector 1117, where the RF modulation source 1106 rotates about a shaft 1115 (not visible in FIG. 11 but shown via the dashed lines) disposed within the RF modulation source 1106. Advantageously, the RF modulation source 1106, which in FIG. 11 is an object with a known radar cross section, such a radar calibration sphere. As is known in the art, a radar calibration sphere can be a hollow sphere, is made from a lightweight conductive material (e.g., a lightweight metal such as aluminum or a lightweight object coated with metallic paint) that is able to reflect radiofrequency (RF) waves. The aspect-independence of a sphere (no matter from which direction the sphere is illuminated, it will have the same monostatic RCS) generally allows for a more accurate and repeatable calibration of a radar than using a nonspherical calibration artifact. In addition, the RCS for scattering spheres is well-known and can be calculated fairly easily using far field approximations.

The embodiments of FIGS. 12A and 12B also each uses a respective calibration sphere 1204, 1204'. However, the emulation device 1205 of FIG. 12A uses a slightly different RF modulation source 1206, as described further below, whereas the emulation device 1205' of FIG. 12B does not include an RF modulation source. It is noted that the emulation device of at least some embodiments is not limited to be used only with spherical RF calibration sources but can be used with virtually any kind of desired RF calibration source. For example, referring to FIGS. 13A and 13B, the emulation devices 1305, 1305' of these embodiments each uses a respective trihedral corner reflector 1324, 1324', as its respective RF calibration source. As is known, due to the geometry of the trihedral corner reflector shape, trihedral corner reflectors can, in certain embodiments, offer the highest possible RCS of any object per unit volume and can also offer an extremely wide RCS pattern. Those of skill in the art will appreciate that many other shapes and designs can be used as an RF calibration source 414 (FIG. 4).

In FIGS. 12B and 13B, because the respective calibration sources are not coupled to RF modulation sources, the respective mounting points 1217', 1317' are not the shafts about which the RF modulation source rotates, but instead can be any suitable coupling. In certain embodiments, the couplings should be lightweight and ideally, also RF absorbent, such that, when the emulation device is being used, the energy that is being returned is only that from the calibration source and not other sources. As will be appreciated, to maximize accuracy of RF calibration experimentation, especially when target body surrogates are used as an emulation component such as the RF scatter source 404, it is advantageous if the couplings and connections are RF absorbent.

In another embodiment, as an alternate to the RF calibration source 416 (FIG. 4) as an emulation component, a "realistic" target body surrogate 414, advantageously having a substantially similar shape to the UAV being emulated, can be used. FIG. 14 includes an illustrative example of a quadcopter UAS body surrogate 1402 (left side of image) and a lightweight fixed wing UAS body surrogate 1403 (right side of image). These body surrogates, in certain embodiments, can offer to the target detection system what can be the closest possible radar cross section to the actual UAV being emulated. Advantageously, in at least some embodiments, the target body surrogates are made out of the same or similar materials that the actual UAV they are emulating is made from, and have as close a shape as possible, which can, in certain embodiments, help to determine how a target sensing device like a radar would observe a swarm of identical and/or "nearly" identical UAVs. As will be understood, for the emulation device, the target body surrogates have a much lighter weight (and are thus easier to be coupled to the UAV), because the target body surrogates are not required to contain the internal equipment, components, etc., of an actual drone. Depending on the type of testing that takes place, in some embodiments, it may be desirable to try and determine how well a UAV can be substantially "invisible" to radar (e.g., based on shape, based on use of or coating with RF absorbing material, etc.), so the RF scatterers (e.g., target body surrogates) in such embodiments can be made of similar materials and have similar shapes, to best emulate the behavior of the "radar invisible" UAV.

As is understood, the radar signature of an actual UAV can tend to be dominated by its non-plastic portions, such as its motors, battery pack, and possibly its frame material (e.g., carbon-fiber frame) as well as the motion of its propellers, so advantageously the target body surrogate 414, in certain embodiments, could include features that could emulate one or more of these other drone features, while still keeping the drone weigh as light as possible. In addition, although not depicted in the figures, those of skill in the art will appreciate that additional types of reflectors and other features can be added to a target body surrogate 414, if desired, to further add to the features that might be detected and tracked by a sensor or target detection system.

Referring again to FIGS. 2-4 and 11-13, the emulation device 405 (FIG. 4), in certain embodiments, optionally also includes one or more additional (second) emulation components, such as an RF modulation source 406 (FIG. 4), which is configured to emulate the motion of the propeller(s) of the UAV, as noted above. The optional additional emulation component, such as the aforementioned RF modulation source 406, can be made using any type of structure that is capable of motion (either active motion or passive motion). For example, in certain embodiments, the optional RF modulation source 406 has "passive" motion (e.g., when moved in air or when wind or other air currents hit it, which can induce a rotation, or where the motion of the UAV emulator device itself induces motion/rotation by its own movement, etc.), to cause movement or rotation that can cause resultant RF signal returns (from RF that impinges on the moving modulation source) to be modulated in a manner similar to what a target detection system (e.g., a radar) sees whenever it tries to track a UAV, helicopter, airplane with propeller, or any sort of aerial device having that type of motion. In certain embodiments, the optional RF modulation source 406 is configured to be actively rotated, e.g., by a motor or other known mechanism. As is known, the rotation of the propeller modulates a high frequency or radio frequency wave; this parasitic modulation is particularly strong when the dimensions of the propeller are of the same order as the wavelength. FIGS. 16A through 16F are illustrative examples of various styles of propeller devices 1650 usable to emulate propeller motion and serve as the optional RF modulation sources 416 for an emulation device 405, in accordance with at least some embodiments. The examples of FIG. 16 are exemplary and not limiting.

Figure 7A:
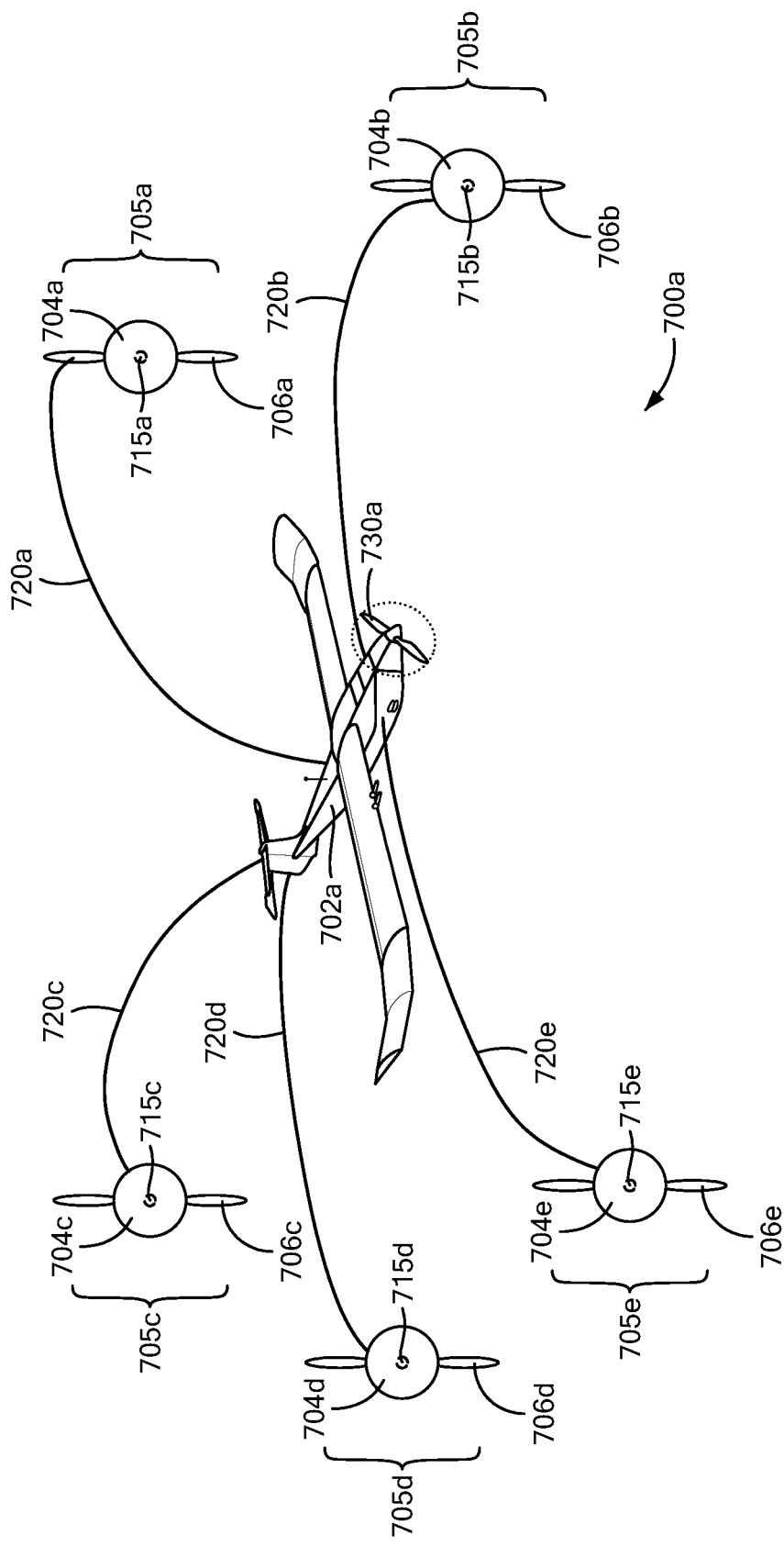
FIGS. 7A-7C are illustrations of a third, fourth, and fifth systems, respectively, each respective system configured to emulate a grouping of objects/UAVs (or other scattering sources), in accordance with one embodiment.

In addition, when two or more emulation components are used, their orientation and arrangement is very flexible. For example, referring to FIGS. 2-4, the orientation between the RF calibration source 404 and the optional RF modulation source 406 is very flexible and is not limited by the illustrations in the Figures herein. Although the examples of FIGS. 11-13 (and the illustrations of FIGS. 2, 3, 5, 6A-6H, 9A, 9B, and 10) show an emulation device 205/305/505/ 605/905/1005 having its RF modulation source at the "top" of the emulation device, with the RF calibration source at the "bottom," this disclosure is not so limited. Many different arrangements and orientations are possible. Consider, briefly, FIG. 7A, which is an illustration of a third system 700 configured to emulate a grouping of UAVs, in accordance with one embodiment. In FIG. 7A, the UAV device 702 is a fixed wing type of drone (e.g., similar to example fixed wing UAV of FIG. 15A_1) having a front propeller 730 and the emulation devices 705 are configured to be connected so that the respective RF modulation source 706 is oriented to a rear side of the RF calibration source 704, to help to emulate the cross section of the UAV device 702. In certain embodiments, to better emulate a cluster of fixed wing UAVs flying as a group, the spacing between a UAV and the emulator devices would have to be increased beyond what is shown in FIG. 7A (which is not to scale) and, advantageously, each emulator device would further include a target surrogate body that includes an extended body with wings for each UAV surrogate to achieve most-representative RF sensor observations. FIG. 7C is a related example of this.

In particular, in certain embodiments that attempt to emulate a cluster or swarm of fixed-wing UAV devices 702 the emulation devices 705 advantageously would generally move in the direction in which the fixed wing UAV device 702 it is pointed (unless large cross-winds), and, advantageously, the RF modulation devices 706 (e.g., propeller modulation devices), advantageously are oriented/facing the same direction as the fixed wing UAV device 702, for the entire grouping of UAV devices and emulation devices to be "flying" together as a "swarm".

This is shown, for example, in the embodiment of FIG. 7C, which shows an actual UAV 702 and a plurality of UAV emulator devices 705A-705E, where each UAV emulator device 705 is configured to be a target body surrogate type of UAV emulator device 705 and is oriented in the same way as the actual UAV 702 (the actual spacing in practice of the connectors 720 can vary and is not drawn to scale in FIG. 7C; rather, FIG. 7C is showing the principles of this embodiment). As will be appreciated, the type and arrangement of connectors 720 can help to ensure the appropriate arrangement and spacing in such embodiments. In addition, as will be appreciated, the particular shape of the RF scatterer 704 being used can have an impact on how a target sensing device views the emulation device 705. For example, RF scatterers 704 having a spherical shape (e.g., as shown in FIG. 7A) have a similar radar cross section (RCS) from any aspect angle. It is known that certain UAVs, especially fixed wing UAVs, can be designed to have UAVs where RCS varies as a function of aspect angle (e.g., looking at bottom of wings and fuselage as a UAV flies overhead produces a different RCS as compared with viewing nose-on directly approaching radar sensor). In certain embodiments, the RF scatterer 704 can be configured to have additional elements to attempt to simulate RCS at various angles.

Figure 7B:
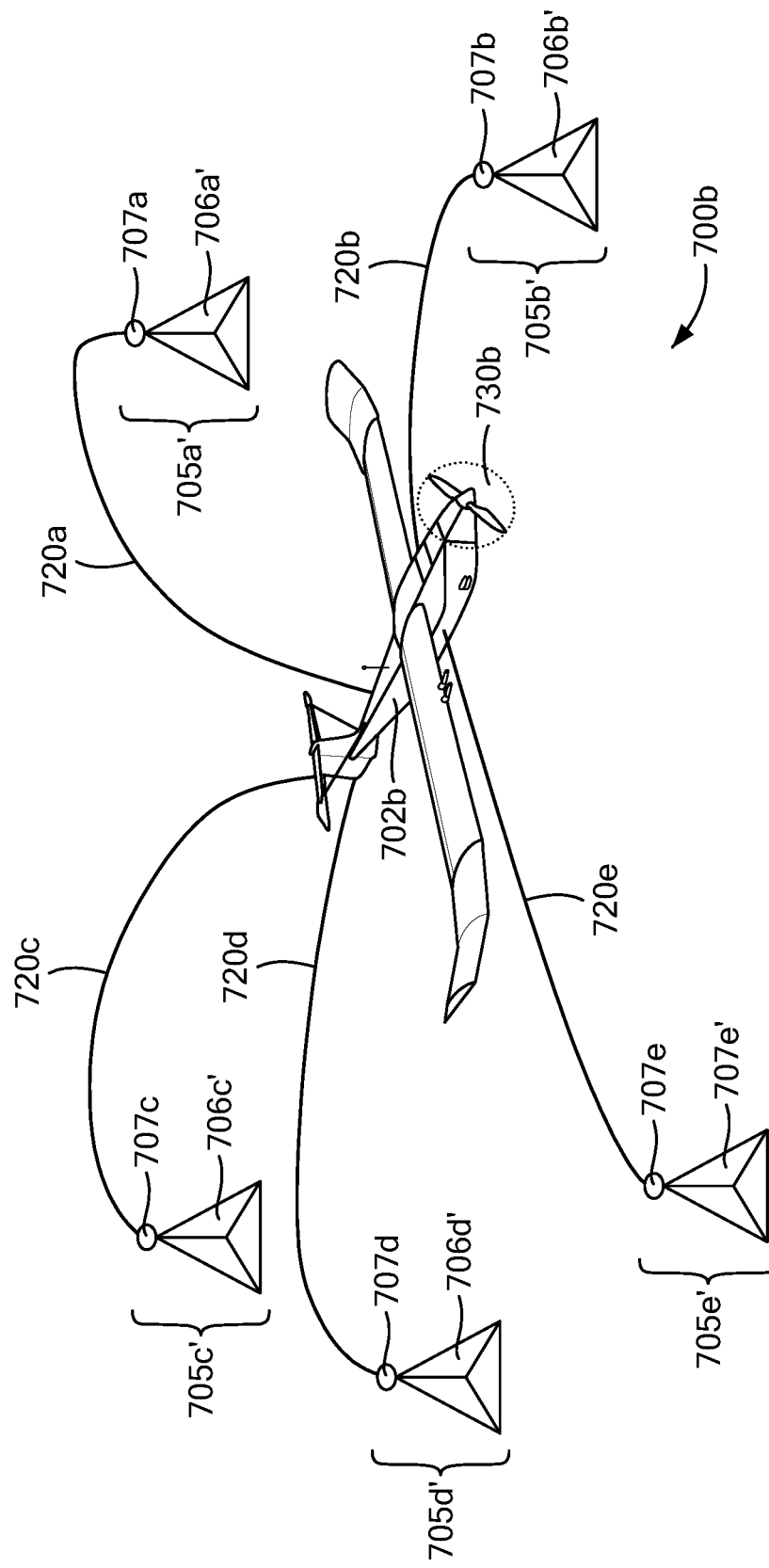
Figure 7C:
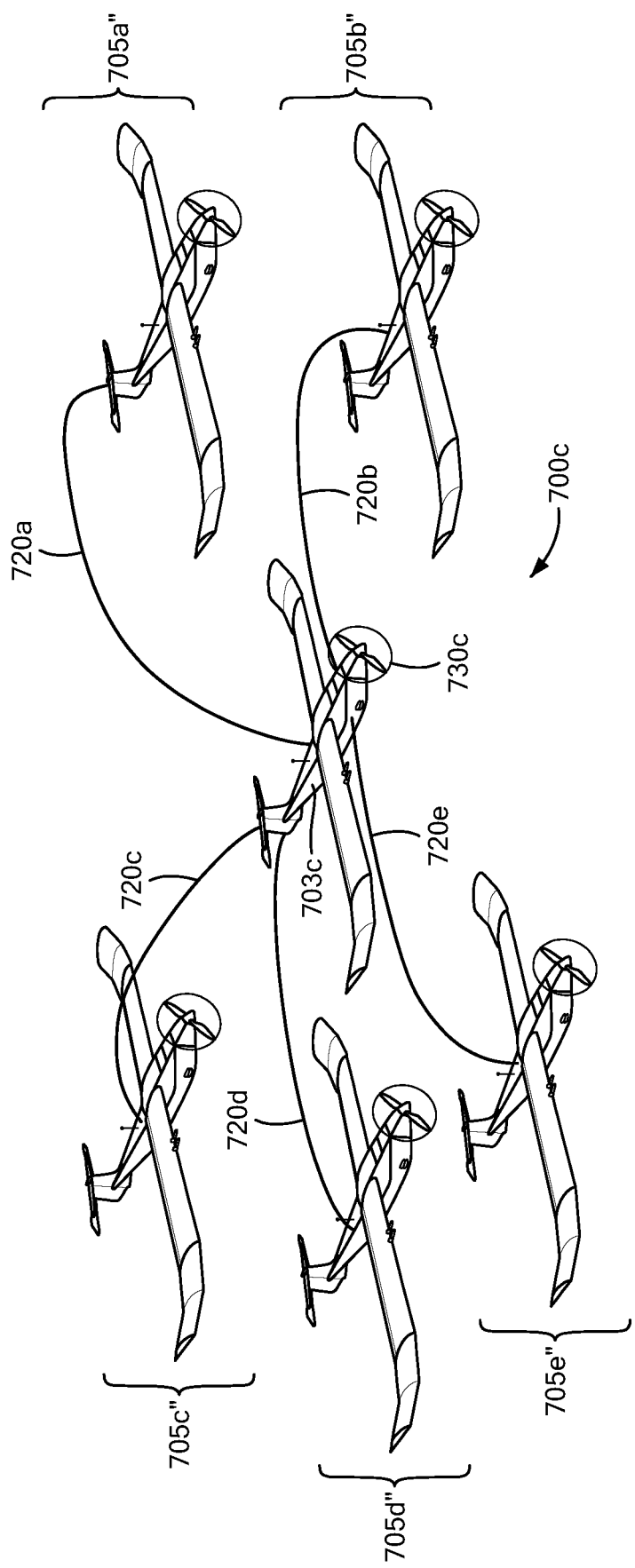

FIG. 7B is an illustration of a fourth system 700' also configured to emulate a grouping of objects (which could be UAVs, birds, insects, bats, or any other desired flying object be it man made, biological, or a hybrid), wherein the system uses as emulation devices 705', a respective plurality of trihedral corner reflectors (e.g., as shown in FIG. 13B, shown elsewhere herein). Many other possible shapes and reflector patterns for the emulation device 705 are possible Depending on the type of object being emulated, it will be appreciated that the spacing shown in FIGS. 7A-7C (and all the other figures herein) is not drawn to scale, and the emulation devices 705 could actually be replaced by one or more target body surrogates, as shown in FIG. 7C. Although not shown specifically in FIGS. 7A-7C, it is possible to couple to the 702 being emulated, multiple different types of emulation devices (that is, the emulation devices 705 need not all be the same type or style).

Figure 17A:
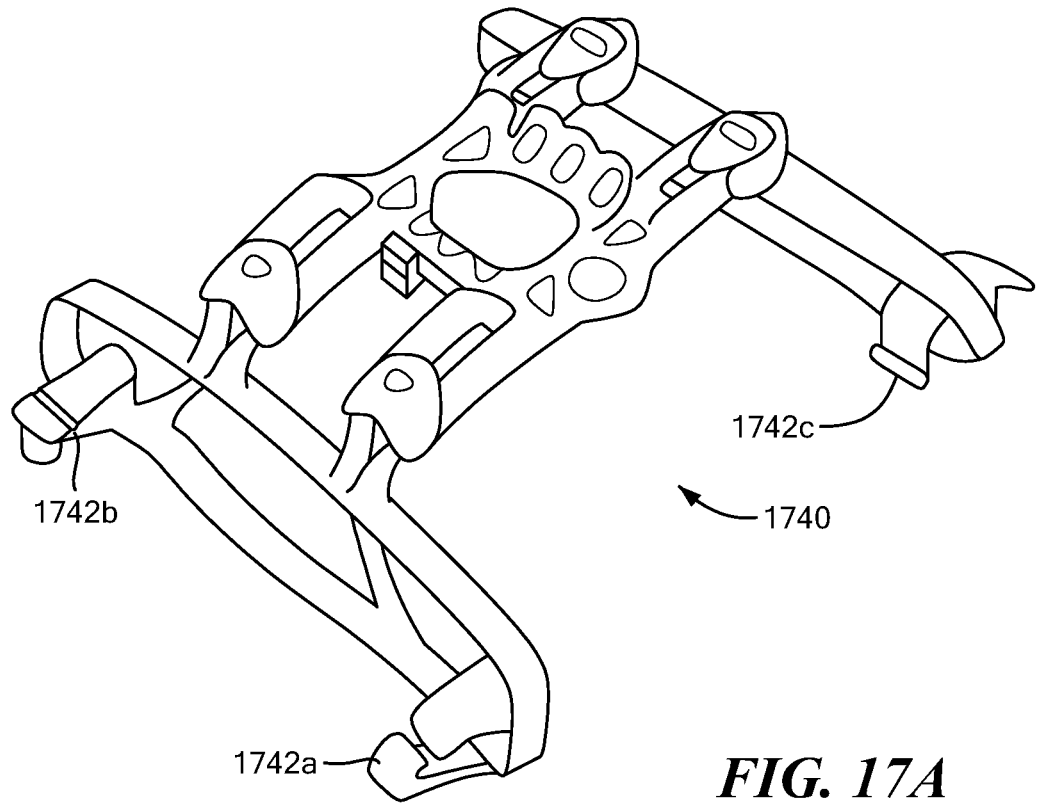
FIG. 17A is an illustrative example of a mounting device usable to attach one or more emulation devices to an exemplary UAV, in accordance with one embodiment.
Figure 17B:
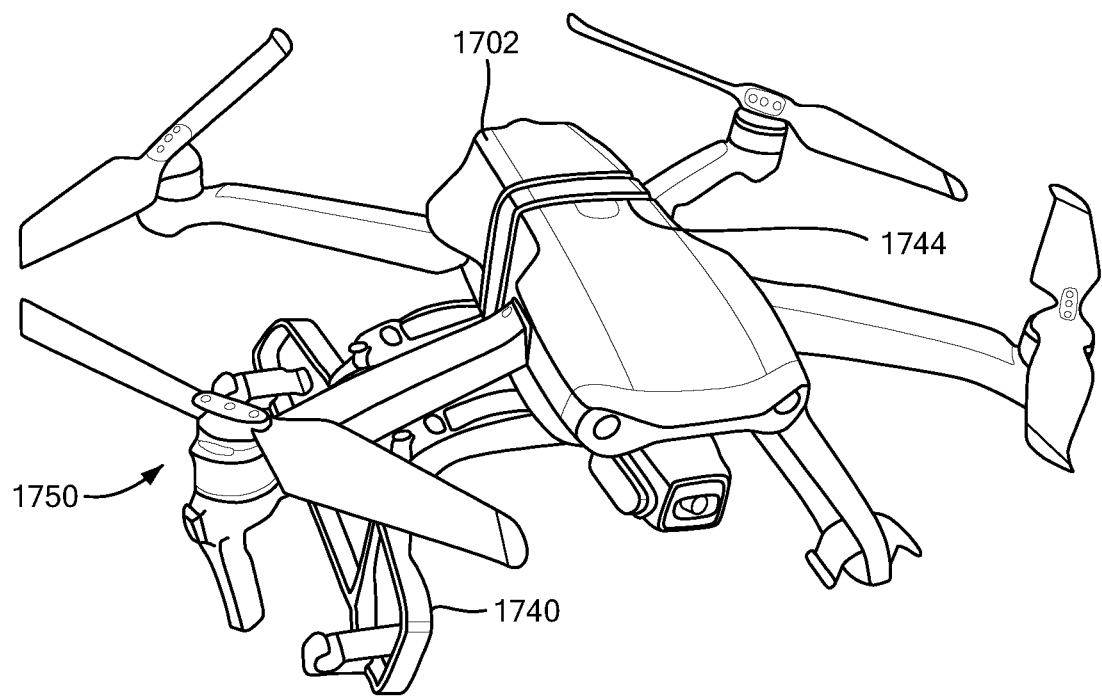
FIG. 17B is an illustration showing the mounting device of FIG. 17A coupled to one side of an exemplary UAV, in accordance with one embodiment.

Referring again to FIG. 4, the drone 402 has mounted to it a conventional UAV coupling mechanism 407, to enable the emulation devices 405 to be coupled to the drone 402 via the connector 420b (optionally, the body of the drone 402 may have built in coupling attachments to attach items to the drone). As an illustrative example of the type of coupling that is usable as a UAV coupling mechanism 407, reference is made briefly to FIGS. 17A and 17B. FIG. 17A is an illustrative example of a mounting device 1740 usable to attach one or more emulation devices to an exemplary UAV, in accordance with one embodiment. As can be seen in the illustration of FIG. 17A, the mounting device 1740 has four attachment points (only three are visible in FIG. 17A), 1742a, 1742b, and 1742c. These attachment points as shown in FIG. 17A correspond to hook type of closures through which a string or other type of tether can be attached, but that is not limiting. FIG. 17B is an illustration 1750 showing the mounting device 1740 of FIG. 17A coupled to one side of an exemplary UAV 1702, in accordance with one embodiment. In FIG. 17B, a pair of straps 1744 go around the UAV 1702 and into holes in the mounting device 1740, to help secure the mounting device 1740 to the UAV 1702, but this is not, of course limiting. The mounting device 1740 can be attached to the UAV via virtually any type of mechanism, including but not limited to screws, nails, adhesives, etc. The particular shape and arrangement of the mounting device 1740 is not, of course, limiting. Advantageously, the mounting device 1740 is configured to couple to the UAV 702 so as to not interfere with the motion of its propellers and so as to not negatively impact the balance and equilibrium of the UAV 1702 when in flight and especially when attachments are added to the mounting device 1740. In addition, in certain embodiments (not shown), the mounting device can have one or more controllable aspects able to be controlled by the UAV 402 (and effectively by a remote controller 434 or computer 432 in operable communication with the UAV and/or by software or other control functions running on the UAV)

Referring again to FIG. 4, each respective emulation device 405a, 405b, is coupled to the UAV 402, via a respective connection 420b. As noted above, the connection 420b can be implemented in various ways, and advantageously the connection 420 is made using a material that is lightweight and that is substantially or mostly "invisible" or "transparent" to radar signals (or that absorbs radar energy) and that is capable of keeping the drone emulator devices 405a, 405b, at a desired distance or spacing from each other. For example, the connection 420 can be made using materials such as dielectric materials, wood, cloth/thread, fiberglass, certain plastics, etc., as is known in the art. The connection 420 also can comprise materials that are not transparent to radar, but which can be coated with radar absorbing paints or materials, to help minimize reflection of signals. Referring to FIGS. 2 and 3, the connection 220 of the example of FIG. 2 is made using a first relatively thicker and/or optionally rigid portion 209 (e.g., made from a rod or tube of wood, plastic, or fiberglass) coupled to a more flexible portion 208a (e.g., made from a sufficiently strong piece of twine, cloth/fabric, rope, plastic strip, plastic tether, string, a fishing line, etc.). As will be appreciated, the rigidity required to maintain a certain spacing between a UAV and an emulator device (e.g., a target body surrogate) during flight will be a function of the weight of the emulator device as well as the cruise speed capability of the UAV, especially under the influence of possible drag forces caused by the emulation devices. A very lightweight UAV which flies at slow speeds would likely have reduced rigidity requirements than would a group 3+ drone which can handle 10s to 100s of pounds of payload and can fly at higher speeds.

Figure 9A:
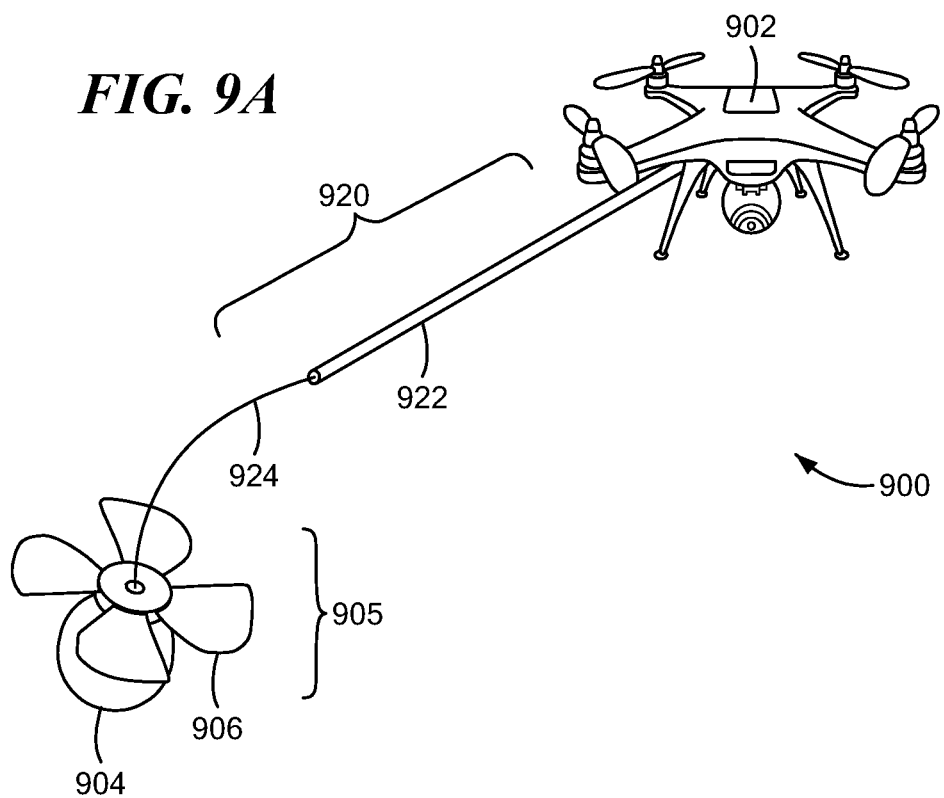
FIGS. 9A-9B are exemplary illustrations of a first type of connection and a second type of connection, respectively, between a UAV and an emulation device, in accordance with one embodiment.

Referring briefly to FIG. 9A, FIG. 9A is an exemplary illustration of a first type 900 of connection 920 between a drone/UAV 902 and an exemplary emulation device 905. The exemplary illustration of FIG. 9A shows only one such connection 920, for clarity, though it is appreciated that in some embodiments, the UAV 902 can have multiple UAV emulator devices 905 connected to it, via multiple respective connections 920, where it can be seen that the connection 920 comprises a first thicker portion 922 (e.g., made from a length, such as a tube, cylinder, elongated rectangular piece, etc., of a first radar-transparent material like wood, plastic, or fiberglass) and a second less thick, thinner flexible portion 924, made from a length of a second radar-transparent material (e.g., a thin strand or string of plastic, twine, cord, etc.). The first thicker portion 922, in some embodiments, has a structure that is thick enough to hold its shape and maintain a defined or predetermined distance between the UAV emulator device 905 and the UAV 902. Some flexibility is allowable in the first thicker portion 922, so long as the UAV emulator device 905 is able to be sufficiently distanced from the UAV 902, such that, if desired, a target detection system will recognize the UAV simulator 905 as being a separate object from the UAV 902. In further embodiments, the first thicker portion 922 (or indeed the entire connector 920) can be configured to have a length/spacing such that the UAV emulator device 905 and UAV device 902, will be viewed by the target detection system as a single UAV. This can help to evaluate, for example, how certain UAV "swarms" can be flown or spaced to achieve different objectives, such as having them appear to be one object or multiple objects, on a target detection system, as will be appreciated.

Figure 8A:
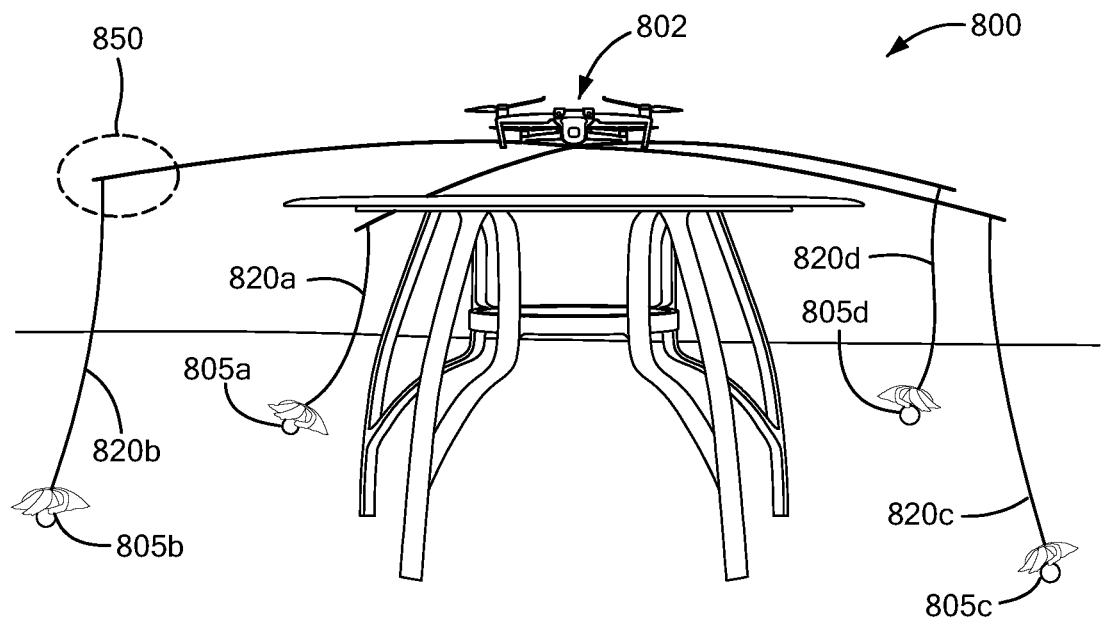
FIG. 8A is an illustration of the system of FIG. 5, when not in flight, in accordance with one embodiment.
Figure 8B:
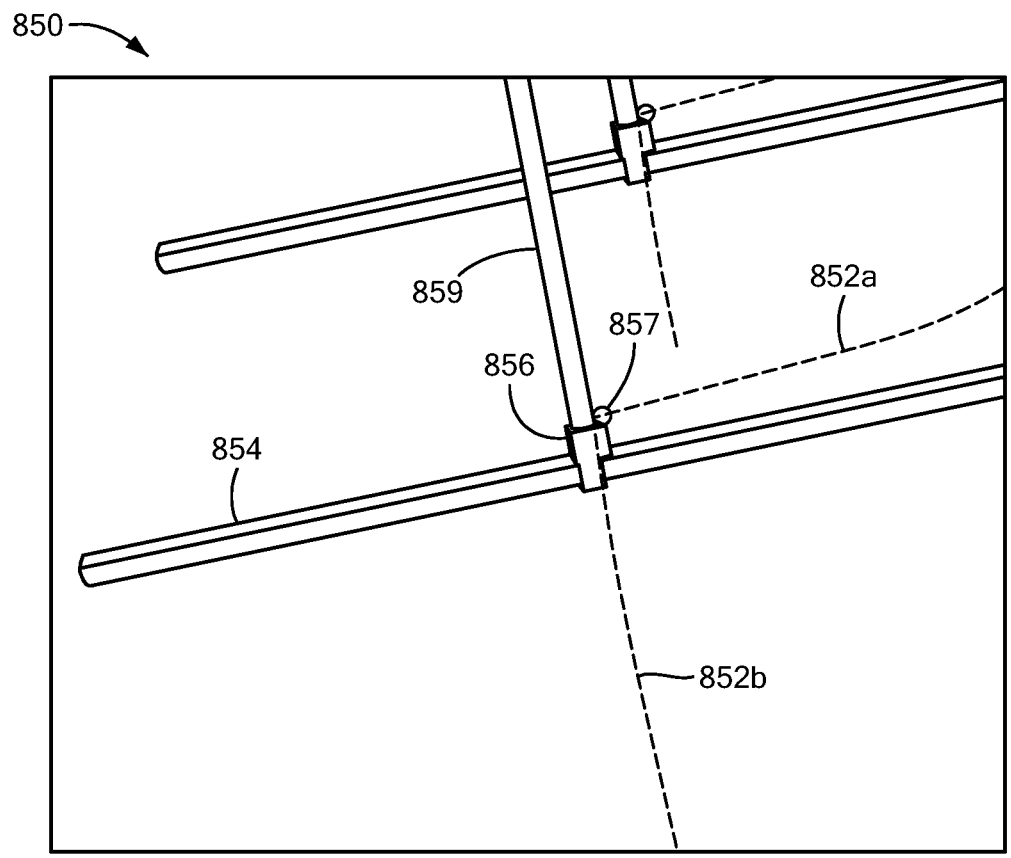
FIG. 8B is an enlarged view of one portion of the system of FIG. 5, in accordance with one embodiment.

Referring briefly to FIGS. 8A-8B, FIG. 8A is an illustration 800 of the system of FIG. 5, when not in flight, in accordance with one embodiment, and FIG. 8B is an enlarged view 850 of one portion of the system of FIG. 5, in accordance with one embodiment. These illustrations help to show, for one embodiment, how the thicker connection 922 and thinner connection 924 of FIG. 9A, are connected together, in one exemplary embodiment. Referring to FIG. 8A, the system of FIG. 5 includes a UAV 802 coupled to four emulation devices 805a-805d, where the thicker portion 922 and thinner portion 924 of FIG. 9A, can be seen in further detail in the close up view 850 of FIG. 8B. In FIG. 8B, it can be seen that the thicker portion 922 is made using a wooden dowel 854 and the thinner portion 852 (shown in first segment 852a and second segment 852b) is made of a thin length of fishing line, which is routed through an eye hole 857 attached to a coupling 856, and further secured in place by a plastic tie wrap 859. Of course, this example attachment is exemplary and not limiting, but is given to show how lightweight and simple an actual implementation can be, in accordance with one embodiment.

Figure 9B:
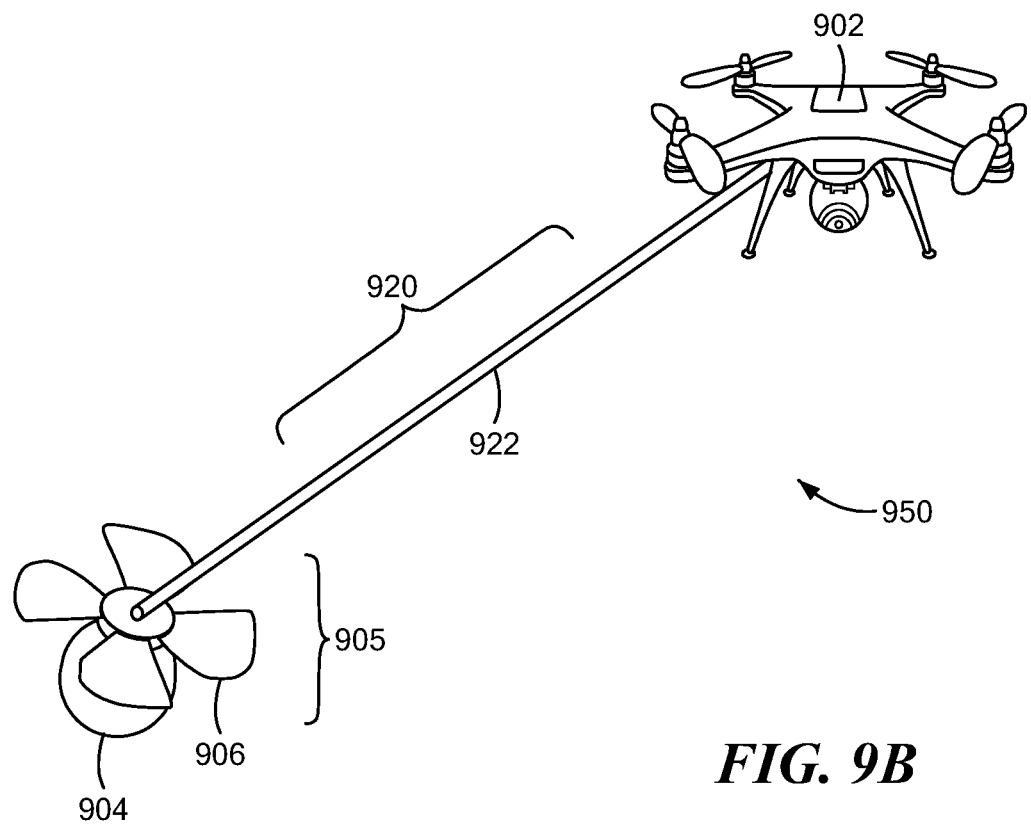

Referring briefly to FIG. 9B, FIG. 9B is an exemplary illustration of a second type 950 of connection 920, wherein the connection 920 is made up of only the thicker portion 922, which is directly coupled to the UAV emulator device 905, in accordance with one embodiment. As with FIG. 9A, the connection 920 is configured, in certain embodiments, to be thick enough to have a structure that enables the UAV emulator device 905 to be sufficiently distanced from the UAV 902, such that a target detection system will recognize the emulation device 905 as being a separate object from the UAV 902. In certain other embodiments, as with FIG. 9A, the size of the connection 920 can alternately be configured to have a length/size so that a target detection system will view the emulation device 905 and the UAV 902 as being the "same" object.

Referring to FIGS. 9A-9B, in certain embodiments, the thicker portion 922 can be substantially or semi rigid, to further help to maintain a separation of the UAV emulator device 905 from the UAV 902, as would happen in an actual swarm, and also helps to keep the more flexible portion 924 from becoming entangled in the propellers of the drone 902. The more flexible portion 924 helps to allow some relative freedom of movement of the drone emulator device 205 once the system 900 is in flight. As will be appreciated, in certain embodiments, the spacing between the UAV and the emulator device is not intended to be perfect and exactly the same in all conditions. Environmental factors and differences across the span of am emulated (or even actual) swarm (e.g., wind) or even turbulence experienced by some swarm members that are following or disposed near other swarm members, can impact spacing and movement. In some embodiments (e.g., as shown in FIGS. 7A-7C and 10, discussed further herein), the connection 920 comprises only a flexible portion 924. In some embodiments (e.g., as shown at 1965 in FIG. 19), the connection 920 can be configured to be collapsible, hinged, and/or spring loaded, and/or otherwise arranged so that, before deployment, it can be folded or compressed so as to fit into, e.g., a launch tube, cannister, or other launching mechanism. Such a movable connection 920 could be deployed automatically or under remote control, or even on demand, in certain embodiments. In some embodiments, by enabling the connection 920 to be controllably extended and pulled back remotely, a target detection system can perform detection and tracking and make observations with the connection(s) 920 collapsed, and then an operator (or other entity) could send a control signal to the UAV 905 to cause the UAV 905 to expand the connection 920 at a given time, to enable observations and tracking, etc., with the expanded configuration.

Although not shown in the Figures, the UAV 905 also can be configured to have one or more fixed or movable mechanical "stops" to keep the connections 920 from going too high or too close together and/or to help keep the connections 920 in a desired or predetermined alignment. The mechanical stops also can keep the connections 920 from interfering with any of the UAV propellers.

Figure 10:
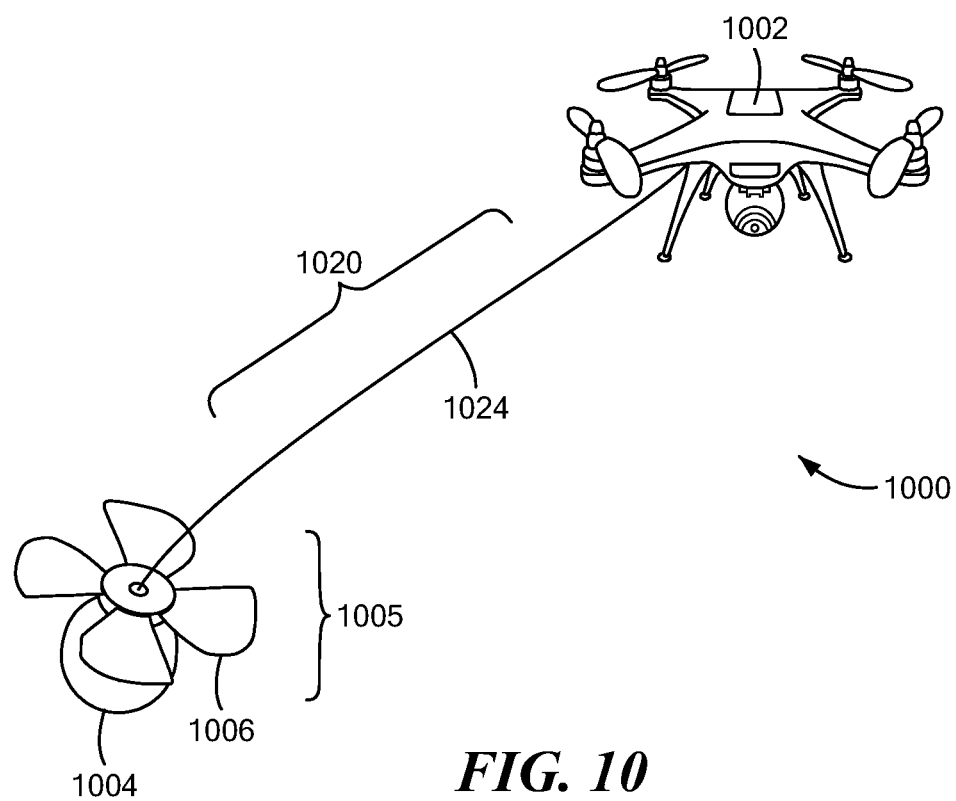
FIG. 10 is an illustration of a third type of connection between a UAV and an emulation device, in accordance with one embodiment.

FIG. 10 is an illustration 1000 of a third type of connection between a UAV 1005 and an emulation device 1005, in accordance with one embodiment. The arrangement of FIG. 10 is similar to that of FIGS. 9A and 9B, except that the connection 1020 is made entirely of the so-called "thinner" connecting material 1024.

The various systems shown herein (e.g., in FIGS. 2-10) are depicted showing one to four emulation devices, for clarity, but it will be appreciated that embodiments can include just one emulation device, if desired, or can have as many emulation devices as the actual UAV is able to carry during flight and for a desired flight time, altitude, etc. As noted previously, the specific sizes and arrangements herein are illustrated using UAVs in the aforementioned FAA Group 1-3 range, but it is envisioned that the arrangements and embodiments herein are adaptable and modifiable for use with UAVs of virtually any size. In addition, as noted elsewhere, the use of RF modulation devices as part of the emulation devices, is optional and not required for any embodiments.

Figure 18:
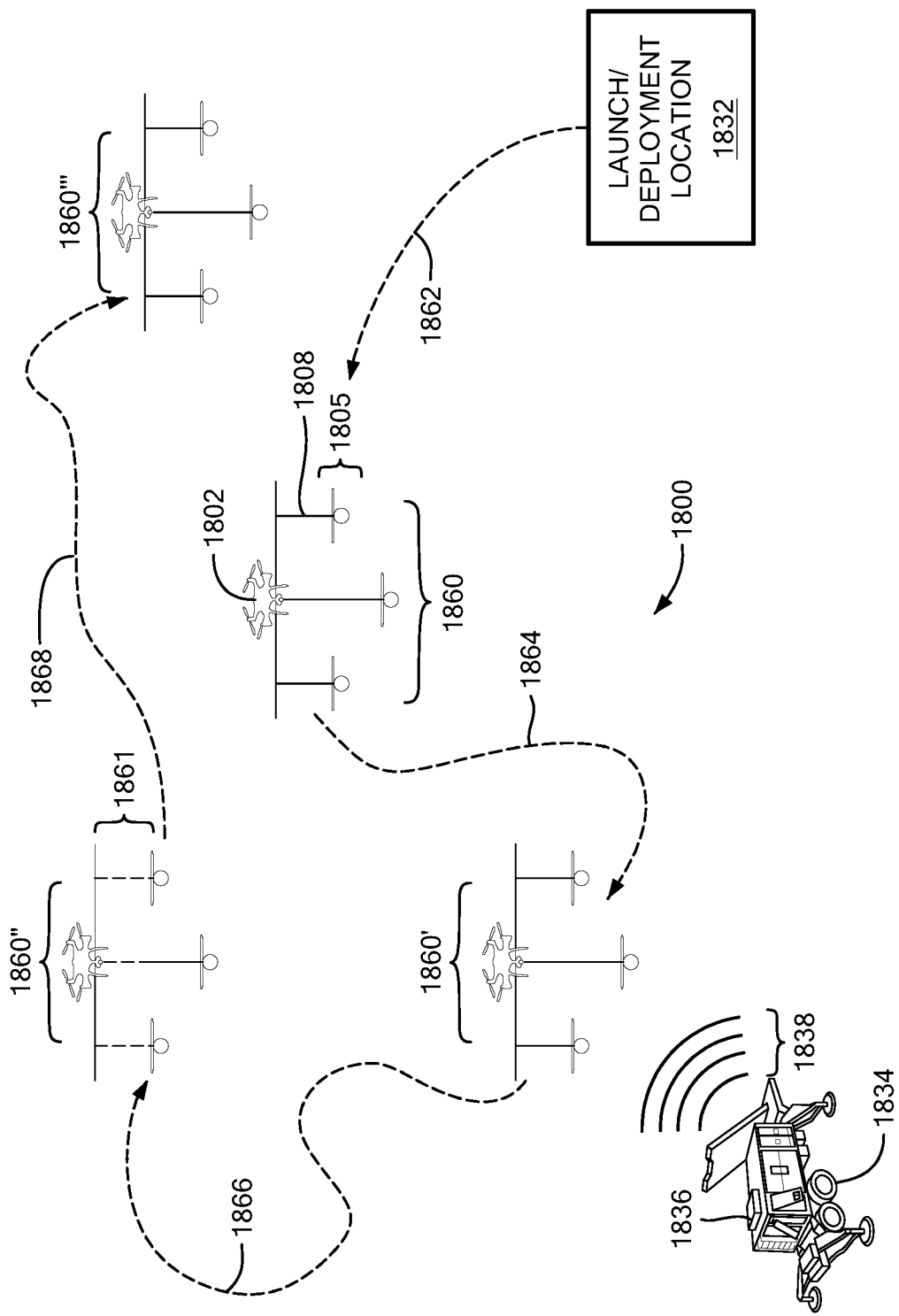
FIG. 18 is a first example illustration showing a first example of a simulation system, such as the system of FIG. 4 during use, in accordance with one embodiment.

FIG. 18 is a first example illustration showing a first example use of an emulation simulation system, such as the system 400 of FIG. 4, in accordance with one embodiment, in an environment 1800 that includes an exemplary target detection system 1834, which for illustrative purposes is shown to be a radar system 1834 (e.g., the Raytheon Patriot radar system) having an antenna 1836 (e.g., a combination of phased array and/or linear array antennas) configured to send and receive RF radar signals 1838. In the system 1800, the emulation system, (e.g., UAV SSA) 1860 is put into the air from a launch/deployment location 1832. This launch/deployment location 1832 can be virtually any location capable of initially holding or storing the emulation system 1860, and the location could be on land (e.g., as depicted in FIG. 8A, or from any location on ground, elevated above ground, below ground, from a moving vehicle, etc.), at sea (e.g., on a vessel or watercraft of any kind), or in the air (e.g., launched from an airplane, a helicopter, a glider, or even launched from another UAV or drone aircraft). Depending on the application, the launch/deployment location 1832 can make use of launching canisters or devices, as shown and discussed further in connection with FIG. 19. In addition, those of skill in the art will appreciate that many types of UAVs are inherently capable of various types of take-offs, including but not limited to vertical take-off, horizontal take-off, even a manual throwing or "sling shot" type of take-off.

Referring again to FIG. 18, after being put into flight, the UAV SSA 1860 travels the various paths, 1862-1868 as it is detected, tracked, and monitored by the target detection system 1834. As the target detection system 1834 processes the radar returns corresponding to the UAV SSA, as noted previously, the target detection system 1834 can communicate information to the entity in charge of the remote control (not shown in FIG. 18 but depicted in FIG. 4) that is controlling the UAV SSA 1860. For example, in the illustration of FIG. 18, the target detection system 1834, after processing the radar returns for when target detection system 1834 has tracked the UAV SSA 1860 through the paths 1862 and 1864, communicates that the operator/entity controlling the remote control, should change the length/spacing of the thinner connectors 1808 that couple the emulator assembly 1805 to the UAV 1802 (or otherwise change spacing as discussed herein in connection with FIGS. 6B-6H). Thus, by the time the UAV SSA 1860 finishes traveling the path 1866, the remote control has extended the length of the thinner connector 1808 by a length 1861, as shown with UAV SSA 1860". This could be done, for example, to see if the target detection system 1834 can better differentiate between and/or identify the multiple devices in the UAV SSA 1860". After the target detection system 1864 has processed the information associated with the arrangement at UAV SSA 1860", the UAV SSA 1860" is then remotely commanded to retract the length of the thinner connector 1808 back to its original length, such that by the time UAV SSA 1860" has traveled the path 1868 and reached the location UAV SSA 1860'", the length of the thinner connector 1808 has been retracted back to its original length. This scenario is merely illustrative and not limiting.

Figure 19:
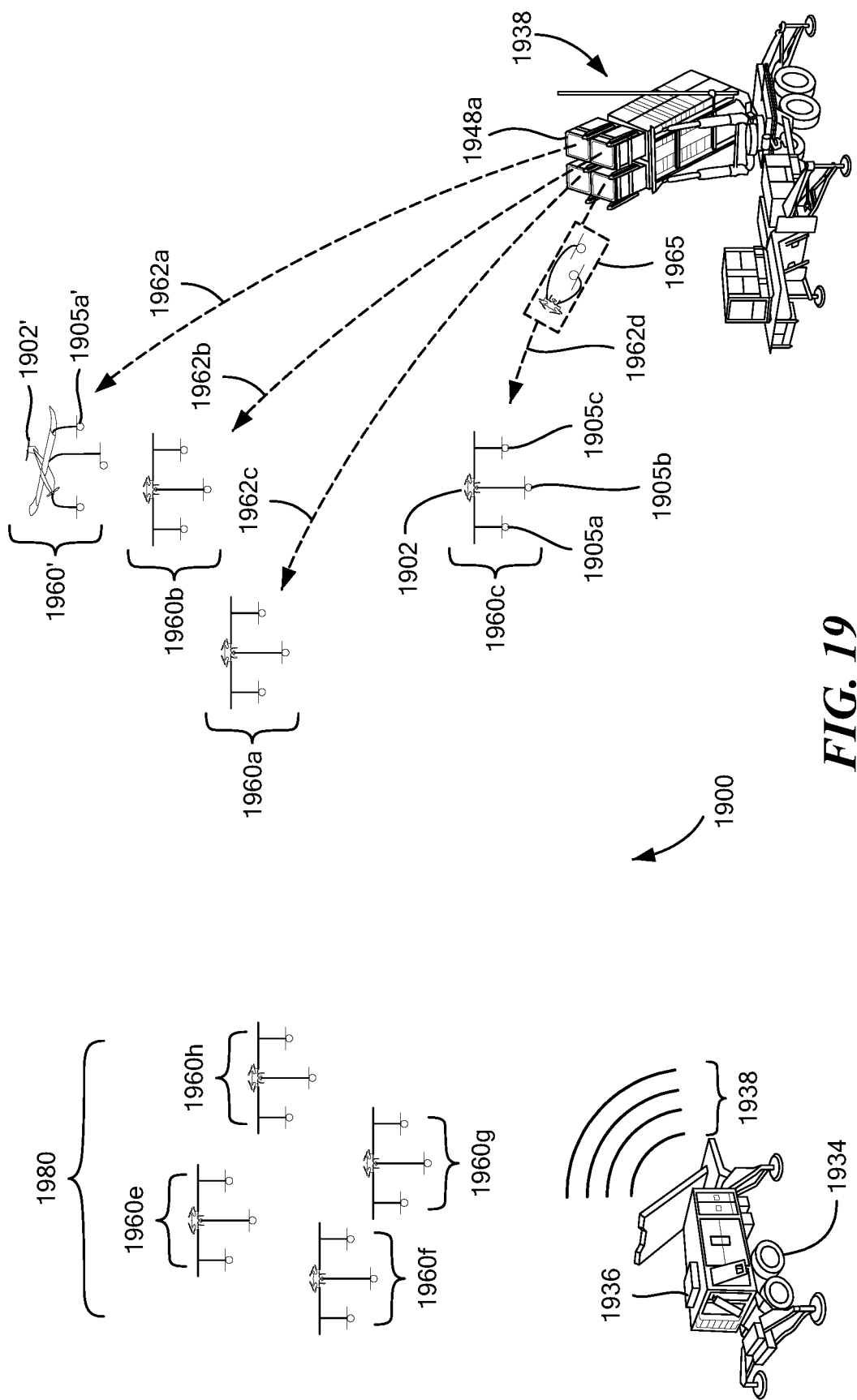
FIG. 19 is a second example illustration showing a second example use of a simulation system, such as the system of FIG. 4 during use, in accordance with one embodiment.

FIG. 19 is a second example illustration showing a second example use 1900 of a UAV simulation system, such as the system of FIG. 4 during use, in accordance with one embodiment. In FIG. 19, the UAV SSA's 1960, 1960' are launched from a launch assembly 1938 having one or more launch sections 1948, wherein each launch section is configured to hold an entire UAV SSA assembly 1960, 1962, when folded or compressed (as described previously) into a structure 1965 that fits into the launch openings 1948. In FIG. 19, the UAV SSA's shown are two different arrangements: a first arrangement 1960a-1960c, which is similar to the UAV SSA 1860 of FIG. 18, and a second UAV SSA arrangement 1960', wherein the second UAV SSA arrangement 1960' is similar to the arrangement shown in FIG. 7A (note that this could be implemented using a UAV 1902' having folding wings, such as the emulation devices shown in FIGS. 15A_2 through FIG. 15A-5). In FIG. 19, each respective UAV SSA 1960, 1960' has its own respective path 1962a-1962d, after launch.

As FIG. 19 illustrates, even larger swarms can be simulated by flying multiple UAV SSA assemblies 1960, 1960'. In FIG. 19, a first swarm 1980 is configured to simulate a dozen UAVs using just four actual UAVs, through the use of four UAV SSA's 1960. UAS system). The additional UAV SSA's 1960, 1960' shown as emerging from the launcher 1938 can, in a first embodiment, join the swarm 1980 or can, in a second embodiment, form a second swarm. Many other operations and arrangements are, of course possible.

It will be appreciated that the systems shown in FIGS. 18 and 19 each provide a simplified representation of a system in which the disclosed UAV SSA can operate, and that, for the target detection systems and/or launching subsystems shown in these drawings, that various electronics subsystems and other components (e.g., amplifiers, local oscillators mixers, power supplies, feed horns) that are known and understood by those in the art, are (for simplification) not depicted in FIGS. 18-19 or elsewhere herein. This is likewise true for the internals of the various UAV devices depicted herein in FIGS. 1-19.

Figure 20:
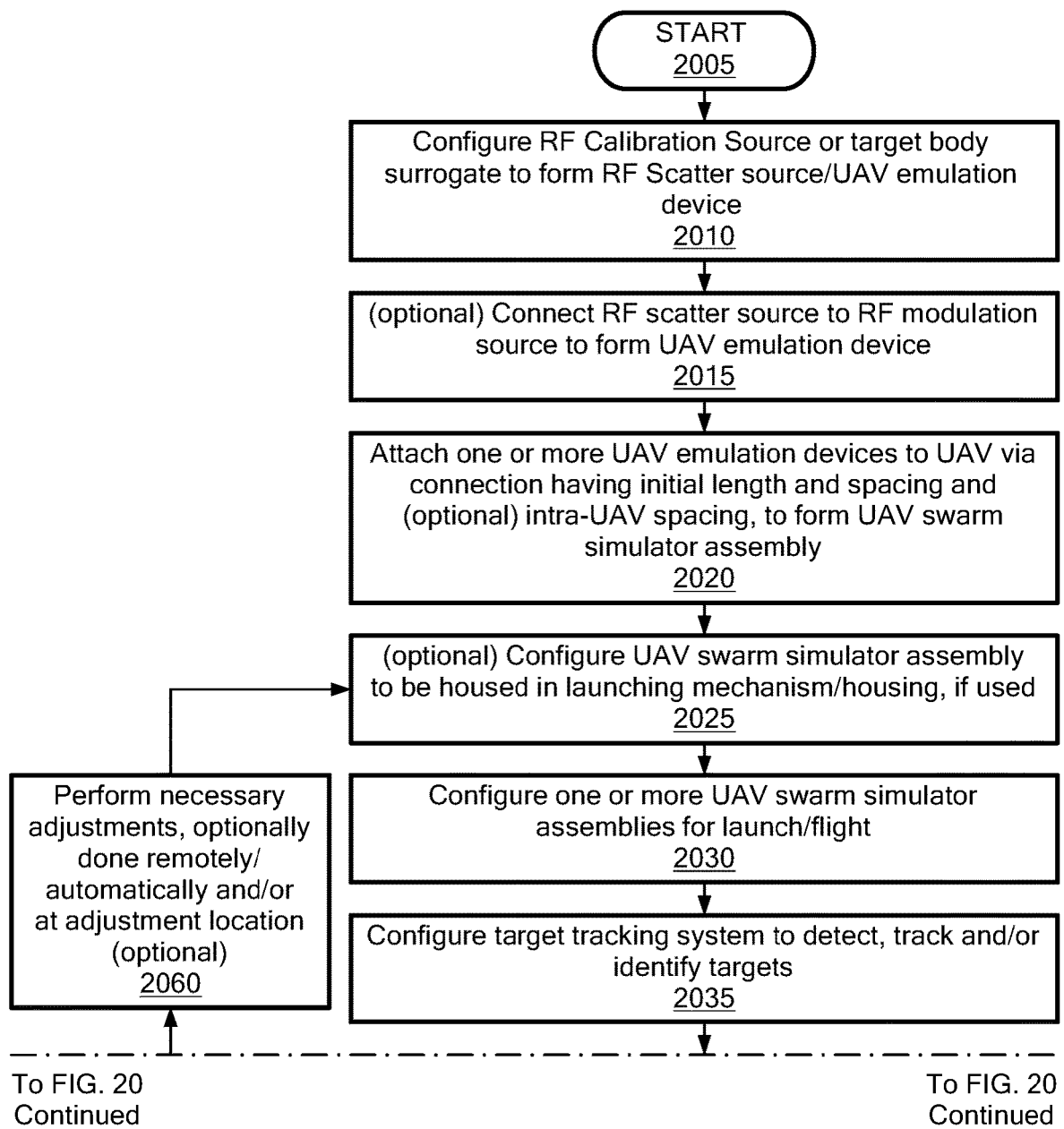
FIG. 20 is a method for evaluating performance a target tracking system against a grouping of UAVs, in accordance with one embodiment.
Figure 20:
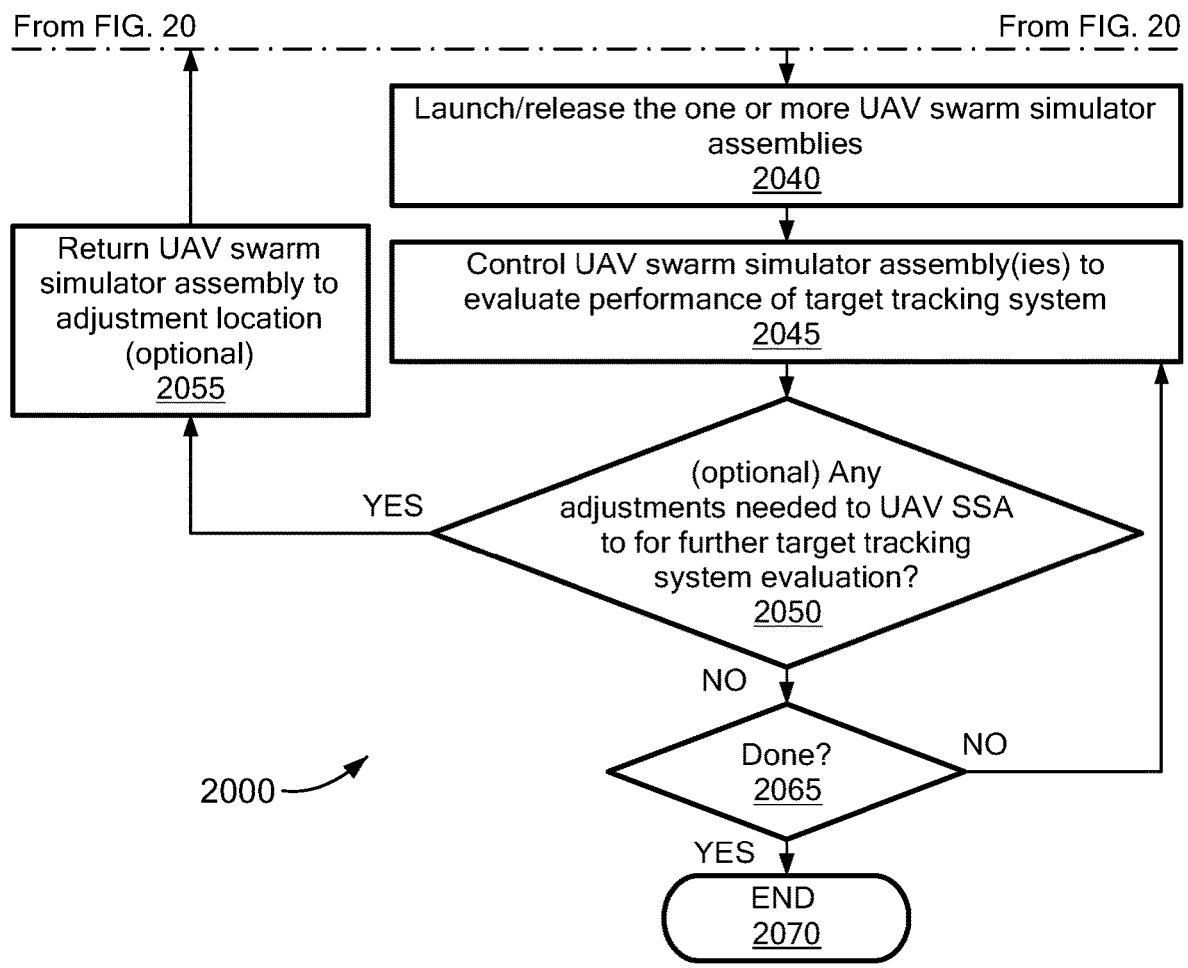

FIG. 20 is a method 2000 for evaluating performance a target tracking system against a grouping of UAVs, in accordance with one embodiment. The method 2000 during operation is shown during the aforementioned scenario described above in connection with FIG. 19, in one embodiment. Referring to FIG. 2000, at the start (block 2005), a first emulation component (which in this example is RF calibration source or a target body surrogate, but that is not limiting) is configured, as described herein to form an RF scatter source (block 2010). In at least some embodiments, the RF scatter source, alone, is an emulation component that is sufficient to form an emulation device. Optionally, in other embodiments, the RF scatter source is connected to a second emulation component, such as an RF modulation source to form an emulation device (block 2015) (as noted previously, the RF modulation source is not required to be an emulation component in all embodiments). One or more emulation devices are attached to a UAV via a connection having an initial length and spacing and an optional intra-UAV spacing (e.g., the second connection 318 of FIG. 3) to form a UAV Swarm Simulator Assembly (UAV SSA) (block 2020).

In block 2025, optionally, if the UAV SSA is to be launched or housed in a launching mechanism, the UAV SSA is configured (e.g., folded or compressed) to fit into the housing or assembly. Then one or more UAV SSA's are configured for launch or flight (block 2030). A target tracking system (e.g., a radar) is configured to detect, track and/or identify targets (block 2035), and then the one or more UAV SSAs are launched/released or otherwise put into flight (block 2040). During flight, the UAV SSA is controlled to help evaluate performance of the target tracking system (block 2045).

Optionally, in certain embodiments, a check is made to determine if any adjustments to the UAV SSA are needed to further evaluate the target tracking system (block 2050). If the answer at block 2050 is "Yes" then, optionally, at block 2055, the UAV SSA is returned to an adjustment location for manual adjustment (if necessary, to perform the adjustment). In block 2060, the necessary adjustments are performed, whether at the remote location or, in certain embodiments, remotely or automatically. For example, one type of adjustment could be to adjust the connection length and/or spacing between the UAV and the one or more emulation devices. In some embodiments, for example, one or more remotely operated servo motors on the UAV can be configured to be remotely controlled to wind/unwind tensioner lines coupled to the UAV emulator devices, to help implement adjustments as needed (e.g., as described in connection with FIGS. 6B-6H, herein). When the adjustments (if needed) are complete, the processing returns at block 2025.

Referring again to the decision block 2050, if the answer at block 2050 is "NO" (no adjustments needed to the UAV SSA at this time), then a check is made at block 2065 to determine if the method/process of FIG. 20 is done. If the answer at block 2065 is "NO", then the control and evaluation of the UAV SSA and target detection system resumes at block 2045. If the answer at block 2065 is "YES" (the method/process of FIG. 20 is complete), then processing ends (block 2070).

It is envisioned that any or all of the embodiments described herein and/or illustrated in FIGS. 1-20 herein could be combined with and/or adapted to work with the technologies described in one or more of the commonly assigned U.S. patent applications and patents, including but not limited to:

U.S. Pat. No. 10,962,335 entitled, "Directed energy delivery systems capable of disrupting air-based predatory threats," issued on Mar. 30, 2021;

U.S. Pat. No. 10,690,772 entitled, "LIDAR site model to aid counter drone system," issued on Jun. 23, 2020;

U.S. Patent Publication No. 2021008862, entitled, "DETECTING AN UNMANNED AERIAL VEHICLE USING PASSIVE RADAR," published on Mar. 25, 2021; and U.S. Patent Publication No. 20170261613, entitled, "COUNTER DRONE SYSTEM," published on Sep. 14, 2017.

The contents of the above-listed patents and published patent applications are hereby incorporated by reference.

Figure 21:
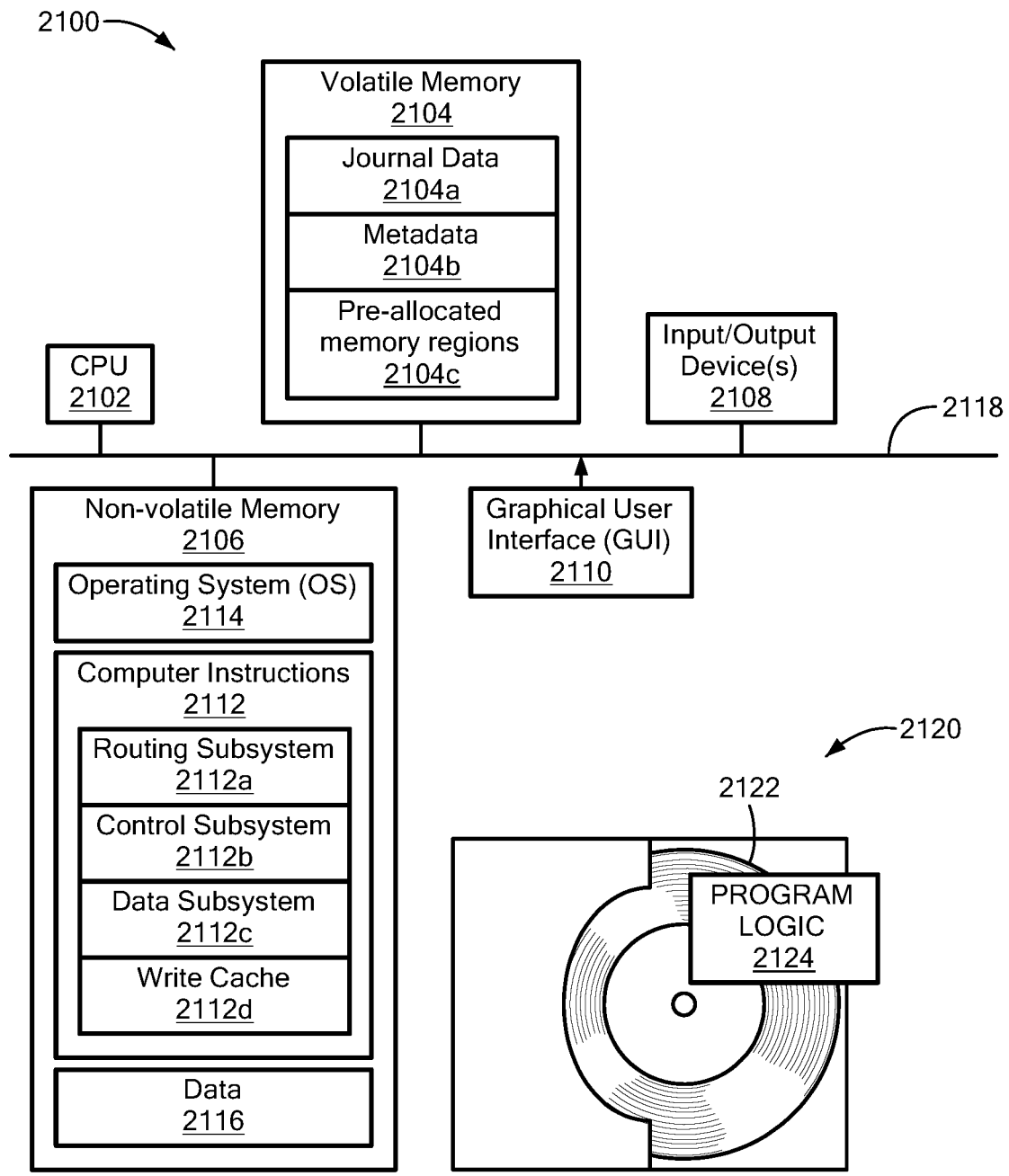
FIG. 21 is a block diagram of an exemplary computer system usable with at least some of the systems and methods of FIGS. 1-20, in accordance with one embodiment.

FIG. 21 is a block diagram of an exemplary computer system usable with at least some of the systems and methods of FIGS. 1-20, in accordance with one embodiment. In some embodiments, the computer system 2100 of FIG. 21 can be usable as the computer 452 of FIG. 4 that is used for remote control. In some embodiments, the computer system 2100 of FIG. 21 is used to help implement at least a portion of the method of FIG. 20. In some embodiments, the computer system 21 of FIG. 21 is used as part of the processing taking place at the target tracking system (e.g., the target tracking system 1834 of FIG. 18 and 1934 of FIG. 19. In some embodiments, the computer system 21 of FIG. 21 is used as part of the launch control system 1938 of FIG. 19.

Reference is made briefly to FIG. 21, which shows a block diagram of a computer system 50 usable with at least some embodiments, including at least the communications link of FIG. 2 the methods of FIGS. 10-13, and the system block diagrams of FIGS. 1A-1C, in accordance with one embodiment. For example, the computer system 50 can be used to implement the controller/processor 50A and/or the controller processor 50B of FIGS. 1A-1C. The computer system 50 also can be used to implement all or part of any of the methods, equations, and/or calculations described herein.

As shown in FIG. 21, computer 2100 may include processor/CPU 2102, volatile memory 2104 (e.g., RAM), non-volatile memory 2106 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 2110 (e.g., a touchscreen, a display, and so forth) and input and/or output (I/O) device 2108 (e.g., a mouse, a keyboard, etc.). Non-volatile memory 2104 stores, e.g., journal data 2104a, metadata 2104b, and pre-allocated memory regions 2104c. The non-volatile memory, 2106 can include, in some embodiments, an operating system 2114, and computer instructions 2112, and data 2116. In certain embodiments, the computer instructions 2112 are configured to provide several subsystems, including a routing subsystem 2112A, a control subsystem 2112b, a data subsystem 2112c, and a write cache 2112d. In certain embodiments, the computer instructions 2112 are executed by the processor/CPU 2102 out of volatile memory 2104 to implement and/or perform at least a portion of the systems and processes shown in FIGS. 1-15. Program code also may be applied to data entered using an input device or GUI 2110 or received from I/O device 2108.

The systems, architectures, flowcharts, and processes of FIGS. 1-20 are not limited to use with the hardware and software described and illustrated herein and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 21, which is useful for carrying out a method described with reference to embodiments shown in, for example, FIG. 20. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor 2102 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 21, the machine becomes an apparatus for practicing one or more of the described embodiments. When implemented on one or more general-purpose processors, the program code combines with such a processor to provide a unique apparatus that operates analogously to specific logic circuits. As such a general-purpose digital machine can be transformed into a special purpose digital machine. FIG. 21 shows Program Logic 2124 embodied on a computer-readable medium 2120 as shown, and wherein the Logic is encoded in computer-executable code configured for carrying out the reservation service process of this invention and thereby forming a Computer Program Product 2122. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiments, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Throughout the present disclosure, absent a clear indication to the contrary from the context, it should be understood individual elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, and/or or a data signal. Within the drawings, like or related elements have like or related alpha, numeric or alphanumeric designators (e.g., a component labeled as "204" in FIG. 2 may be similar to a component labeled "404" in FIG. 4, etc.).

Further, while the disclosed embodiments have been discussed in the context of implementations using discrete components, including some components that include one or more integrated circuit chips), the functions of any component or circuit may alternatively be implemented using one or more appropriately programmed processors, depending upon the signal frequencies or data rates to be processed and/or the functions being accomplished.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the invention must comprise more than one of that element, nor is it intended by illustrating a single element that the invention is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments. Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety.

What is claimed is:

1. An assembly configured for connection to a single unmanned aerial vehicle (UAV), the assembly comprising:
  a plurality of emulator devices each configured for attachment to a single UAV, each respective emulator device comprising a first emulation component, the first emulation component configured to provide, to a target detection system, a detectable feature that represents a first characteristic associated with a respective type of airborne object being emulated, the detectable feature comprising at least one of a scattering pattern of the airborne object and a signal return associated with one or more moving parts at or in the airborne object; and a plurality of respective first connection tethers each configured to operably couple a respective one of the plurality of emulator devices to the single UAV at a desired respective spacing from the single UAV and configured to allow the single UAV to fly freely when the single UAV is connected to the assembly, each respective first connection tether formed such that at least a portion of each respective connection tether comprises a respective material that is configured so that it does not substantially reflect RF energy;

wherein each of the plurality of respective first connection tethers associated with the plurality of respective emulator devices, is constructed and arranged so that, after coupling the assembly to the single UAV, each of the plurality of respective emulator devices maintains the desired respective spacing from the single UAV when the single UAV is flying freely while towing the assembly and wherein at least one of the plurality of respective first connection tethers is configured to have a respective length that is dynamically adjustable, while the UAV is airborne and flying freely, so as to increase and decrease the desired respective spacing between the single UAV and a corresponding emulator device that is operably coupled to the single UAV via the at least one of the plurality of respective first connection tethers;

wherein the assembly is configured so that, when it is connected to the single UAV, the assembly does not constrain the single UAV from becoming airborne and flying freely while towing the assembly, wherein, during a flight of the single UAV that is connected to the assembly, the single UAV is not physically connected to any entities other than the assembly and wherein the assembly is not physically connected to any entities other than the single UAV; and wherein the assembly, when connected to the single UAV, is configured so that each respective emulator device emulates the first characteristic to the target detection system, such that, during the flight of the single UAV while towing the assembly, the assembly presents, to the target detection system, a plurality of first characteristics that together emulate a grouping comprising a plurality of airborne objects that are each flying individually; and wherein the increase and decrease of the desired respective spacing between the single UAV and the corresponding emulator device is configured to simulate a change in one or more detectable features of the grouping of airborne objects.

2. The assembly of claim 1, wherein the airborne object comprises at least one of a drone, unmanned aerial vehicle (UAV), unmanned aerial system (UAS), unmanned aircraft (UA), remotely piloted aircraft (RPA), remotely piloted aircraft systems (RPAS), remotely piloted vehicles (RPV), balloon, airborne weapon, airborne munition, cluster of airborne reflective materials, bird, insect, and bat.

3. The assembly of claim 1, wherein the target detection system comprises at least one of a radar system, a heat sensor, a light sensor, an infrared sensor, an optical sensor, a Lidar system, and a camera.

4. The assembly of claim 1, wherein the first characteristic comprises at least one characteristic selected from a list of characteristics that comprises a radar cross section (RCS), a heat signature, a physical appearance, a shape, a pattern of motion, a proximity to other airborne objects, a reflectivity, a frequency pattern, a sound, an RF transmission pattern, a moving part, and a physical appearance.

5. The assembly of claim 1, wherein the first emulation component comprises at least one of: an RF scatter source configured to simulate an RF scattering pattern associated with one or more of airborne objects; a passive RF scatterer; an RF calibration source; an RF object surrogate scatterer; a target body surrogate; a source of RF modulation; an RF reflecting element; a visual object surrogate, an RF transmission source; a heat source; and a light source.

6. The assembly of claim 1, further comprising at least one second connection tether, the second connection tether being distinct from the first connection tether, wherein the second connection tether is configured to connect between two or more of the plurality of emulator devices, wherein the second connection tether is configured to maintain, during flight of the single UAV, an intra-emulator device spacing between at least two or more of the plurality of emulator devices.

7. The assembly of claim 4, wherein at least a respective one of the plurality of emulator devices further comprises a second emulation component, the second emulation component configured to provide, to the target detection system, a second characteristic associated with the respective type of airborne object, wherein the second emulation component is operably coupled to first emulation component and wherein the second characteristic is selected from the list of characteristics but is different than the first characteristic provided by the first emulation component.

8. A method for simulating, for a target tracking system, a first behavior characteristic associated with one or more of a plurality of airborne objects, the method comprising:

configuring each of a plurality of respective emulator devices, in an assembly, for individual attachment to a single unmanned aerial vehicle (UAV), each respective emulator device comprising a first emulation component configured to provide, to a target detection system, a detectable feature that represents a first characteristic associated with a respective type of airborne object being emulated, the detectable feature comprising at least one of a scattering pattern of the airborne object and a signal return associated with one or more moving parts at or in the airborne object;

coupling, to each of the plurality of respective emulator devices, a plurality of respective first connection tethers, each respective first connection tether configured to operably couple a respective one of the plurality of respective emulator devices to the single UAV at a desired respective spacing from the single UAV, each respective first connection tether configured to allow the single UAV to fly freely when the single UAV is connected to the assembly, each respective first connection tether formed such that at least a portion of each respective first connection tether comprises a first material that is configured so that it does not substantially reflect RF energy;

coupling the plurality of respective emulation devices to the single UAV via the plurality of respective first connection tethers so that each of the plurality of respective emulator devices maintains at least the desired respective spacing from the single UAV when the single UAV is flying freely while towing the assembly, wherein, the assembly is configured so that, when it is coupled to the single UAV, the assembly does not constrain the single UAV from becoming airborne and flying while towing the assembly, wherein, during a flight of the single UAV when connected to the assembly, the single UAV is not physically connected to any entities other than the assembly and wherein the assembly is not physically connected to any entities other than the single UAV;

configuring at least one of the plurality of respective first connection tethers to have a respective length that is dynamically adjustable, while the UAV is airborne and flying freely, so as to increase and decrease the desired respective spacing between the single UAV and a corresponding emulator device that is operably coupled to the single UAV via the at least one of the plurality of respective first connection tethers;

configuring the single UAV for flying with the plurality of respective emulation devices attached to the single UAV via the plurality of respective first connection tethers; and flying the single UAV, with the plurality of respective emulation devices attached, within range of the target tracking system, wherein, during a flight of the single UAV that is connected to the assembly, each respective emulator device is configured to emulate the first characteristic to the target detection system, such that the assembly presents, to the target detection system, a plurality of first characteristics that together emulate a grouping comprising a plurality of airborne objects that are each flying individually, wherein the increase and decrease of the desired respective spacing between the single UAV and the corresponding emulator device is configured to simulate a change in one or more detectable features of the grouping of airborne objects.

9. The method of claim 8, wherein the plurality of airborne objects comprises at least one airborne object that comprises at least one of a drone, unmanned aerial vehicle (UAV), unmanned aerial system (UAS), unmanned aircraft (UA), remotely piloted aircraft (RPA), remotely piloted aircraft systems (RPAS), remotely piloted vehicles (RPV), balloon, airborne weapon, airborne munition, cluster of airborne reflective materials, bird, insect, and bat.

10. The method of claim 8, wherein the target detection system comprises at least one of a radar system, a heat sensor, a light sensor, an infrared sensor, an optical sensor, a Lidar system, and a camera.

11. The method of claim 8, wherein the dynamic adjustment of the desired respective spacing is configured to modify the first characteristic.

12. The method of claim 9, further comprising:
operably coupling a second emulation component to at least one respective emulation device in the plurality of respective emulation devices, the second emulation component configured to emulate a second characteristic of the UAV that is different than the first characteristic.

13. The method of claim 12, wherein at least one of the first characteristic and the second characteristic comprises at least one of: a radar cross section (RCS), a heat signature, a physical appearance, a shape, a pattern of motion, a proximity to other airborne objects, a reflectivity, a frequency pattern, an RF transmission pattern, a moving part, and a physical appearance.

14. A system, comprising:
a single unmanned aerial vehicle (UAV);
a plurality of emulator devices connected in an assembly, each emulator device operably coupled to the UAV, each respective emulator device comprising a first emulation component configured to provide, to a target detection system, a detectable feature that represents a first characteristic associated with a respective type of airborne object being emulated, the detectable feature comprising at least one of a scattering pattern of the airborne object and a signal return associated with one or more moving parts at or in the airborne object; and
a plurality of respective first connection tethers each configured to operably couple a respective one of the plurality of emulator devices to the UAV at a desired respective spacing from the UAV and configured to allow the single UAV to fly freely when the single UAV is connected to the assembly, each respective first connection tether formed such that at least a portion of each respective connection tether comprises a respective material that is configured so that it does not substantially reflect RF energy;

wherein each of the plurality of respective first connection tethers that is associated with the plurality of emulator devices, is constructed and arranged so that, after coupling the assembly to the single UAV, each of the plurality of emulator devices maintains the desired respective spacing from the UAV when the single UAV is flying freely while towing the assembly and wherein at least one of the plurality of respective first connection tethers is configured to have a respective length that is dynamically adjustable, while the UAV is airborne and flying freely, so as to increase and decrease the desired respective spacing between the single UAV and a corresponding emulator device that is operably coupled to the single UAV via the at least one of the plurality of respective first connection tethers; and wherein the assembly is configured so that, when it is connected to the single UAV, the assembly does not constrain the single UAV from becoming airborne and flying freely while towing the assembly, wherein, during a flight of the single UAV that is connected to the assembly, the single UAV is not physically connected to any entities other than the assembly and wherein the assembly is not physically connected to any entities other than the single UAV; and wherein the assembly, when connected to the single UAV, is configured so that each respective emulator device emulates the first characteristic to the target detection system, such that, during the flight of the single UAV while towing the assembly, the assembly presents, to the target detection system, a plurality of first characteristics that together emulate a grouping comprising a plurality of airborne objects that are each flying individually; and wherein the increase and decrease of the desired respective spacing between the single UAV and the corresponding emulator device is configured to simulate a change in one or more detectable features of the grouping of airborne objects.

15. The system of claim 14, wherein the first characteristic comprises at least one of a radar cross section (RCS), a heat signature, a physical appearance, a shape, a pattern of motion, a proximity to other airborne objects, a reflectivity, a frequency pattern, a sound, an RF transmission pattern, a moving part, and a physical appearance.

16. The system of claim 14, wherein the first emulation component comprises at least one of: an RF scatter source configured to simulate an RF scattering pattern associated with one or more of airborne objects; a passive RF scatterer; an RF calibration source; an RF object surrogate scatterer; a target body surrogate; a source of RF modulation; an RF reflecting element; a visual object surrogate, an RF transmission source; a heat source; and a light source.

17. The assembly of claim 1, wherein the grouping comprises a swarm of airborne objects and wherein the at least one of the plurality of respective first connection tethers is dynamically adjustable, while the UAV is airborne and flying freely, so as to simulate a change in one or more detectable features of the swarm of airborne objects.

18. The assembly of claim 6, wherein the second connection tether is dynamically adjustable, while the UAV is airborne and flying freely, to increase and decrease the intra-emulator device spacing; and
   wherein a combination of dynamic adjustment of the first connection tether and dynamic adjustment of the second connection tether is configured to increase and decrease intra-emulator spacing in at least three dimensions, while the UAV is airborne and flying freely.

19. The method of claim 8, further comprising:
   connecting a second connection tether between two or more of the plurality of emulator devices, wherein the second connection tether is distinct from the first connection tether, wherein the second connection tether is configured to maintain, during flight of the single UAV, an intra-emulator device spacing between at least two or more of the plurality of emulator devices, wherein the second connection tether is dynamically adjustable, while the UAV is airborne and flying freely, to increase and decrease the intra-emulator device spacing; and
   wherein a combination of dynamic adjustment of the first connection tether and dynamic adjustment of the second connection tether is configured to increase and decrease intra-emulator spacing in at least three dimensions, while the UAV is airborne and flying freely.

20. The system of claim 14, further comprising:
   a second connection tether configured to connect between two or more of the plurality of emulator devices, wherein the second connection tether is distinct from the first connection tether, and wherein the second connection tether is configured to maintain, during flight of the single UAV, an intra-emulator device spacing between at least two or more of the plurality of emulator devices, wherein the second connection tether is dynamically adjustable, while the UAV is airborne and flying freely, to increase and decrease the intra-emulator device spacing; and
   wherein a combination of dynamic adjustment of the first connection tether and dynamic adjustment of the second connection tether is configured to increase and decrease intra-emulator spacing in at least three dimensions, while the UAV is airborne and flying freely.

* * * * *